United States Patent
Burns et al.

(10) Patent No.: US 12,271,576 B2
(45) Date of Patent: *Apr. 8, 2025

(54) TIMELINE-VIDEO RELATIONSHIP PRESENTATION FOR ALERT EVENTS

(71) Applicant: Google LLC, Mountain View, CA (US)

(72) Inventors: Christopher Charles Burns, Santa Clara, CA (US); George Alban Heitz, III, Mountain View, CA (US); James Edward Stewart, Mountain View, CA (US); Cameron Hill, San Francisco, CA (US); Seungho Yang, Mountain View, CA (US); Joe Delone Venters, Alameda, CA (US); William Alex Finlayson, San Francisco, CA (US); Carsten Hinz, Sunnyvale, CA (US); Timothy Samuel Psiaki, Duvall, WA (US); Nathan Scott Klee, Kirkland, WA (US); Gregory Rourk Nelson, San Bruno, CA (US); Kevin James Avery, San Francisco, CA (US); Lawrence W. Neal, Oakland, CA (US); Martin Davidsson, Redwood City, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/585,524

(22) Filed: Feb. 23, 2024

(65) Prior Publication Data

US 2024/0192834 A1 Jun. 13, 2024

Related U.S. Application Data

(63) Continuation of application No. 18/184,088, filed on Mar. 15, 2023, now Pat. No. 11,947,780, which is a
(Continued)

(51) Int. Cl.
*G06F 3/0482* (2013.01)
*G05B 15/02* (2006.01)
(Continued)

(52) U.S. Cl.
CPC ........ *G06F 3/0482* (2013.01); *G06F 3/04817* (2013.01); *G06F 16/739* (2019.01);
(Continued)

(58) Field of Classification Search
CPC .. G06F 3/0482; G06F 3/04817; G06F 16/739; G06F 40/35; G11B 27/3081;
(Continued)

(56) References Cited

U.S. PATENT DOCUMENTS

| 5,625,410 A | 4/1997 | Washino et al. |
| 5,765,485 A | 6/1998 | Thoman et al. |

(Continued)

FOREIGN PATENT DOCUMENTS

| CN | 105681751 | 6/2016 |
| WO | 2006120596 | 11/2006 |
| WO | 2014137372 | 9/2014 |

OTHER PUBLICATIONS

"Foreign Office Action", EP Application No. 22186661.9, May 16, 2024, 7 pages.
(Continued)

*Primary Examiner* — Quoc A Tran
(74) *Attorney, Agent, or Firm* — Colby Nipper PLLC

(57) ABSTRACT

A method at an electronic device with a display includes: displaying a user interface having a first region and a second region; receiving, and displaying in the first region of the user interface, a live video stream of a physical environment captured by a remote video camera; displaying, in the second region, a timeline corresponding to a timespan for a first portion of a duration during which the live video stream
(Continued)

may have been recorded; in response to receiving a user interaction to move the timespan to a second portion of the duration, transitioning the displayed timeline to a new timeline that corresponds to the timespan for the second portion, and while transitioning, displaying, in the first region, a subset of video frames representing the first and/or second portion of the duration.

20 Claims, 50 Drawing Sheets

Related U.S. Application Data continuation of application No. 17/346,622, filed on Jun. 14, 2021, now Pat. No. 11,609,684, which is a continuation of application No. 16/536,255, filed on Aug. 8, 2019, now Pat. No. 11,036,361, which is a continuation of application No. 15/335,399, filed on Oct. 26, 2016, now Pat. No. 10,386,999.

(51) Int. Cl.

| | |
|---|---|
| G06F 3/04817 | (2022.01) |
| G06F 16/738 | (2019.01) |
| G06F 40/35 | (2020.01) |
| G11B 27/30 | (2006.01) |
| H04L 65/403 | (2022.01) |
| H04L 65/61 | (2022.01) |
| H04N 7/18 | (2006.01) |
| H04N 21/2387 | (2011.01) |
| H04N 21/4223 | (2011.01) |
| H04N 21/431 | (2011.01) |
| H04N 21/472 | (2011.01) |
| H04N 21/488 | (2011.01) |
| H04N 21/63 | (2011.01) |
| H04N 21/845 | (2011.01) |
| H04N 21/8549 | (2011.01) |
| H04N 21/858 | (2011.01) |

(52) U.S. Cl.
CPC .......... *G11B 27/3081* (2013.01); *H04L 65/61* (2022.05); *H04N 21/2387* (2013.01); *H04N 21/4223* (2013.01); *H04N 21/47217* (2013.01); *H04N 21/488* (2013.01); *H04N 21/8456* (2013.01); *H04N 21/8549* (2013.01); *H04N 21/858* (2013.01); *G05B 15/02* (2013.01); *G06F 40/35* (2020.01); *H04L 65/403* (2013.01); *H04N 7/186* (2013.01); *H04N 21/4312* (2013.01); *H04N 21/632* (2013.01)

(58) Field of Classification Search
CPC ... H04L 65/61; H04L 65/403; H04N 21/2387; H04N 21/4223; H04N 21/47217; H04N 21/8456; H04N 21/8549; H04N 7/186; H04N 21/4312; H04N 21/632; H04N 21/2187; H04N 21/431; H04N 21/4316; H04N 21/4334; G05B 15/02
See application file for complete search history.

(56) References Cited

U.S. PATENT DOCUMENTS

| | | |
|---|---|---|
| D403,313 S | 12/1998 | Peppel |
| D424,036 S | 5/2000 | Arora et al. |
| D456,293 S | 4/2002 | Tsumura et al. |
| 6,593,956 B1 | 7/2003 | Potts et al. |
| D500,047 S | 12/2004 | Sevedermish |
| 6,948,131 B1 | 9/2005 | Neven et al. |
| 6,954,498 B1 | 10/2005 | Lipton |
| D550,227 S | 9/2007 | Sato et al. |
| 7,382,244 B1 | 6/2008 | Donovan et al. |
| D590,416 S | 4/2009 | Kochackis |
| D597,864 S | 8/2009 | Sakuma et al. |
| D607,004 S | 12/2009 | Kordus et al. |
| D619,612 S | 7/2010 | Pueyo et al. |
| D621,730 S | 8/2010 | Driver et al. |
| D626,131 S | 10/2010 | Kruzeniski et al. |
| 7,877,708 B2 | 1/2011 | Zinn et al. |
| 7,884,855 B2 | 2/2011 | Ortiz |
| 7,903,115 B2 | 3/2011 | Platzer et al. |
| 7,996,771 B2 | 8/2011 | Girgensohn |
| D647,809 S | 11/2011 | Driver |
| D656,157 S | 3/2012 | Khan et al. |
| D658,674 S | 5/2012 | Shallcross et al. |
| 8,184,069 B1 | 5/2012 | Rhodes |
| D661,701 S | 6/2012 | Brown et al. |
| D662,508 S | 6/2012 | Kim |
| D664,966 S | 8/2012 | Shallcross et al. |
| D664,978 S | 8/2012 | Tanghe et al. |
| D672,364 S | 12/2012 | Reyna et al. |
| 8,340,654 B2 | 12/2012 | Bratton et al. |
| D677,269 S | 3/2013 | Scott et al. |
| D678,898 S | 3/2013 | Walsh et al. |
| 8,390,684 B2 | 3/2013 | Piran et al. |
| D681,653 S | 5/2013 | Bitran et al. |
| D681,660 S | 5/2013 | Matas |
| D684,164 S | 6/2013 | Friedlander et al. |
| D686,221 S | 7/2013 | Brinda et al. |
| D689,892 S | 9/2013 | Perry et al. |
| D689,895 S | 9/2013 | DeLuca |
| D692,450 S | 10/2013 | Convay et al. |
| D694,255 S | 11/2013 | Jones, Jr. |
| 8,589,374 B2 | 11/2013 | Chaudhri |
| D696,677 S | 12/2013 | Corcoran et al. |
| 8,615,511 B2 | 12/2013 | Jones |
| D697,930 S | 1/2014 | Crabtree et al. |
| D697,940 S | 1/2014 | Bitran et al. |
| 8,665,375 B2 | 3/2014 | Moore et al. |
| D702,700 S | 4/2014 | Thomspon |
| D702,704 S | 4/2014 | Santos et al. |
| D707,245 S | 6/2014 | Bruck et al. |
| D708,197 S | 7/2014 | Pasceri et al. |
| D708,204 S | 7/2014 | Pasceri et al. |
| D711,415 S | 8/2014 | Simister et al. |
| D712,928 S | 9/2014 | Brener et al. |
| D714,334 S | 9/2014 | Cojuangco et al. |
| 8,830,193 B2 | 9/2014 | Shah |
| 8,843,239 B2 | 9/2014 | Migdoll et al. |
| D715,835 S | 10/2014 | Montgomery et al. |
| D716,334 S | 10/2014 | Lee et al. |
| D717,809 S | 11/2014 | Tsuru et al. |
| D717,823 S | 11/2014 | Brotman et al. |
| 8,917,274 B2 | 12/2014 | Ma et al. |
| D720,765 S | 1/2015 | Xie et al. |
| D720,766 S | 1/2015 | Mandal et al. |
| D721,382 S | 1/2015 | Brinda et al. |
| D723,576 S | 3/2015 | Jones |
| D724,603 S | 3/2015 | Williams et al. |
| D725,666 S | 3/2015 | Tseng et al. |
| 8,984,436 B1 | 3/2015 | Tseng et al. |
| 8,988,232 B1 | 3/2015 | Sloo et al. |
| D726,735 S | 4/2015 | Asai |
| D727,336 S | 4/2015 | Allison et al. |
| D727,928 S | 4/2015 | Allison et al. |
| D736,223 S | 8/2015 | Park |
| D736,792 S | 8/2015 | Brinda et al. |
| D737,131 S | 8/2015 | Frandsen |
| D737,278 S | 8/2015 | Shin et al. |
| D737,283 S | 8/2015 | Scalisi |
| D739,429 S | 9/2015 | Veilleux et al. |
| D739,864 S | 9/2015 | Kang |
| 9,140,572 B2 | 9/2015 | Millington |
| D740,300 S | 10/2015 | Lee et al. |
| 9,158,974 B1 | 10/2015 | Laska et al. |
| 9,170,707 B1 | 10/2015 | Laska et al. |
| D745,527 S | 12/2015 | Wang |
| D746,828 S | 1/2016 | Arai et al. |

(56) References Cited

U.S. PATENT DOCUMENTS

| | | |
|---|---|---|
| D746,849 S | 1/2016 | Anzures et al. |
| D747,333 S | 1/2016 | Supino et al. |
| D748,666 S | 2/2016 | Heeter et al. |
| D749,620 S | 2/2016 | Jones |
| D751,090 S | 3/2016 | Hu et al. |
| D752,061 S | 3/2016 | Ahn et al. |
| D752,072 S | 3/2016 | Song |
| D752,107 S | 3/2016 | Yun |
| D752,605 S | 3/2016 | Wang et al. |
| D753,132 S | 4/2016 | Cuthbert et al. |
| D753,151 S | 4/2016 | Lee et al. |
| D753,703 S | 4/2016 | Villamor et al. |
| D753,708 S | 4/2016 | Yang et al. |
| D754,713 S | 4/2016 | Zhang et al. |
| D754,714 S | 4/2016 | Zhang et al. |
| D755,193 S | 5/2016 | Sun et al. |
| D756,379 S | 5/2016 | Apodaca et al. |
| D756,401 S | 5/2016 | Soldner et al. |
| D757,090 S | 5/2016 | Myung |
| D757,746 S | 5/2016 | Lee |
| D757,747 S | 5/2016 | Butcher et al. |
| D757,784 S | 5/2016 | Lee et al. |
| D758,386 S | 6/2016 | Zhang et al. |
| D758,422 S | 6/2016 | Zhao |
| D759,688 S | 6/2016 | Wu |
| 9,361,011 B1 | 6/2016 | Burns |
| 9,361,521 B1 | 6/2016 | McLean et al. |
| D760,769 S | 7/2016 | Ishii et al. |
| D760,792 S | 7/2016 | Liu et al. |
| D761,277 S | 7/2016 | Harvell |
| 9,386,230 B1 | 7/2016 | Duran |
| D762,655 S | 8/2016 | Kai |
| D763,271 S | 8/2016 | Everette et al. |
| D763,306 S | 8/2016 | Lee et al. |
| D763,308 S | 8/2016 | Wang et al. |
| D763,869 S | 8/2016 | Wang et al. |
| D763,888 S | 8/2016 | Patel |
| D763,895 S | 8/2016 | Chaudhri et al. |
| 9,417,637 B2 | 8/2016 | Matsuoka et al. |
| D765,674 S | 9/2016 | Kim |
| D765,678 S | 9/2016 | Goux |
| D766,958 S | 9/2016 | Salazar Cardozo et al. |
| 9,454,820 B1 | 9/2016 | Kirmani |
| D768,687 S | 10/2016 | Bae et al. |
| D769,897 S | 10/2016 | Li |
| D769,930 S | 10/2016 | Agrawal |
| 9,471,452 B2 | 10/2016 | Mcelhinney et al. |
| D112,250 S | 11/2016 | Kohan et al. |
| D770,517 S | 11/2016 | Peng et al. |
| D771,645 S | 11/2016 | Jewitt et al. |
| D772,257 S | 11/2016 | Furutani et al. |
| D772,894 S | 11/2016 | Zhao et al. |
| D773,531 S | 12/2016 | Toth et al. |
| D775,165 S | 12/2016 | Sun et al. |
| 9,513,642 B2 | 12/2016 | Rogers et al. |
| D775,658 S | 1/2017 | Luo et al. |
| D776,126 S | 1/2017 | Lai et al. |
| D776,130 S | 1/2017 | Contreras et al. |
| D776,680 S | 1/2017 | Bae et al. |
| D776,690 S | 1/2017 | Tsujimoto et al. |
| D776,702 S | 1/2017 | Huang et al. |
| D777,744 S | 1/2017 | Wang et al. |
| D779,504 S | 2/2017 | Cabrera et al. |
| D779,526 S | 2/2017 | Volovik |
| D779,533 S | 2/2017 | Liu |
| D781,299 S | 3/2017 | Yun et al. |
| D783,641 S | 4/2017 | Elston et al. |
| D783,652 S | 4/2017 | Guan et al. |
| D784,363 S | 4/2017 | Fleming et al. |
| D784,400 S | 4/2017 | Joi |
| 9,619,984 B2 | 4/2017 | Donovan et al. |
| D786,932 S | 5/2017 | Kim et al. |
| D795,927 S | 5/2017 | Bishchoff et al. |
| D790,581 S | 6/2017 | Chaudhri et al. |
| D791,806 S | 7/2017 | Brewington et al. |
| D794,047 S | 8/2017 | Gandhi et al. |
| D795,292 S | 8/2017 | Loosli et al. |
| D795,919 S | 8/2017 | Bischoff et al. |
| D796,540 S | 9/2017 | McLean et al. |
| D797,772 S | 9/2017 | Mizono et al. |
| D800,747 S | 10/2017 | Lee et al. |
| D800,752 S | 10/2017 | Hersh et al. |
| 9,778,830 B1 | 10/2017 | Dubin |
| D803,233 S | 11/2017 | Wilberding |
| D803,241 S | 11/2017 | Mizono et al. |
| D803,242 S | 11/2017 | Mizono et al. |
| D805,548 S | 12/2017 | King et al. |
| D806,114 S | 12/2017 | Kim et al. |
| 9,838,602 B2 | 12/2017 | Duran et al. |
| D807,376 S | 1/2018 | Mizono et al. |
| D809,522 S | 2/2018 | Mizono et al. |
| D810,116 S | 2/2018 | McLean et al. |
| 9,898,175 B2 | 2/2018 | Fiedler |
| D815,144 S | 4/2018 | Feng et al. |
| D817,337 S | 5/2018 | Wei |
| D817,357 S | 5/2018 | Barajas et al. |
| D818,000 S | 5/2018 | Lee et al. |
| D819,047 S | 5/2018 | Bates et al. |
| D819,075 S | 5/2018 | Tsuji et al. |
| 9,979,862 B1 | 5/2018 | Xiong et al. |
| D821,407 S | 6/2018 | Wilberding |
| D821,410 S | 6/2018 | Vinna et al. |
| D821,441 S | 6/2018 | Wilberding et al. |
| D821,443 S | 6/2018 | Jang et al. |
| D823,867 S | 7/2018 | Berlow |
| D823,891 S | 7/2018 | Lupei et al. |
| D824,416 S | 7/2018 | Memmelaar et al. |
| D824,926 S | 8/2018 | De La Garza |
| D831,673 S | 10/2018 | O'Rourke et al. |
| 10,133,443 B2 | 11/2018 | Von Dehsen et al. |
| 10,145,577 B2 | 12/2018 | Bruck et al. |
| D837,237 S | 1/2019 | Fraser et al. |
| D842,867 S | 3/2019 | Jedrzejowicz et al. |
| D842,874 S | 3/2019 | Tashiro et al. |
| D842,891 S | 3/2019 | MacLean et al. |
| D844,668 S | 4/2019 | Lee et al. |
| D849,030 S | 5/2019 | Shook et al. |
| 10,281,507 B2 | 5/2019 | Schuh et al. |
| 10,386,999 B2 | 8/2019 | Burns et al. |
| D900,834 S | 11/2020 | Yamazaki et al. |
| 10,871,890 B2 | 12/2020 | McLean et al. |
| 11,036,361 B2 | 6/2021 | Burns et al. |
| 11,609,684 B2 | 3/2023 | Burns et al. |
| 11,947,780 B2 | 4/2024 | Burns et al. |
| 12,033,389 B2 | 7/2024 | Burns et al. |
| 2002/0116120 A1 | 8/2002 | Ruiz et al. |
| 2004/0113770 A1 | 6/2004 | Falk et al. |
| 2004/0177149 A1 | 9/2004 | Zullo et al. |
| 2004/0260427 A1 | 12/2004 | Wimsatt |
| 2005/0046723 A1 | 3/2005 | Bean et al. |
| 2005/0104958 A1 | 5/2005 | Egnal et al. |
| 2005/0289615 A1 | 12/2005 | Nishitani |
| 2006/0288392 A1 | 12/2006 | Fleming |
| 2007/0024706 A1 | 2/2007 | Brannon |
| 2007/0025688 A1 | 2/2007 | Pejhan |
| 2007/0033632 A1 | 2/2007 | Baynger et al. |
| 2007/0237225 A1 | 10/2007 | Luo |
| 2008/0174570 A1 | 7/2008 | Jobs et al. |
| 2008/0181498 A1 | 7/2008 | Swenson et al. |
| 2008/0263468 A1 | 10/2008 | Cappione et al. |
| 2009/0002157 A1 | 1/2009 | Donavan et al. |
| 2009/0002492 A1 | 1/2009 | Velipasalar et al. |
| 2009/0021583 A1 | 1/2009 | Salgar et al. |
| 2009/0075694 A1 | 3/2009 | Kim et al. |
| 2009/0164439 A1 | 6/2009 | Nevins |
| 2009/0178007 A1 | 7/2009 | Matas et al. |
| 2009/0220206 A1 | 9/2009 | Kisliakov |
| 2009/0284601 A1 | 11/2009 | Eledath |
| 2009/0288011 A1 | 11/2009 | Piran et al. |
| 2010/0061446 A1 | 3/2010 | Hands et al. |
| 2010/0124274 A1 | 5/2010 | Cheok et al. |
| 2010/0131457 A1 | 5/2010 | Heimendinger |
| 2010/0321183 A1 | 12/2010 | Donovan et al. |
| 2011/0040760 A1 | 2/2011 | Fleishman et al. |

(56) References Cited

U.S. PATENT DOCUMENTS

| | | |
|---|---|---|
| 2011/0018526 A1 | 7/2011 | Finkelstein et al. |
| 2011/0316697 A1 | 12/2011 | Krahnstoever et al. |
| 2012/0006273 A1 | 1/2012 | Zhang |
| 2012/0036480 A1 | 2/2012 | Warner et al. |
| 2012/0062732 A1 | 3/2012 | Marman et al. |
| 2012/0066608 A1 | 3/2012 | Sundermeyer et al. |
| 2012/0130513 A1* | 5/2012 | Hao ............... G05B 15/02 700/90 |
| 2012/0317299 A1 | 12/2012 | Sathianathan et al. |
| 2012/0323930 A1 | 12/2012 | Kennberg et al. |
| 2013/0016122 A1 | 1/2013 | Bhatt et al. |
| 2013/0067365 A1 | 3/2013 | Shrufi et al. |
| 2013/0072308 A1 | 3/2013 | Peck et al. |
| 2013/0090767 A1 | 4/2013 | Bruck et al. |
| 2013/0091432 A1 | 4/2013 | Shet et al. |
| 2013/0129307 A1 | 5/2013 | Choe et al. |
| 2013/0132908 A1 | 5/2013 | Lee et al. |
| 2013/0145270 A1 | 6/2013 | Piran et al. |
| 2013/0173064 A1 | 7/2013 | Fadell et al. |
| 2013/0179836 A1 | 7/2013 | Han et al. |
| 2013/0185150 A1 | 7/2013 | Crum |
| 2013/0211783 A1 | 8/2013 | Fisher et al. |
| 2013/0251150 A1 | 9/2013 | Chassagne |
| 2013/0263034 A1 | 10/2013 | Bruck et al. |
| 2013/0268129 A1 | 10/2013 | Fadell et al. |
| 2013/0282421 A1 | 10/2013 | Graff et al. |
| 2013/0311909 A1 | 11/2013 | Howard et al. |
| 2013/0325332 A1 | 12/2013 | Rhee et al. |
| 2013/0328997 A1 | 12/2013 | Desi |
| 2013/0332886 A1 | 12/2013 | Cranfill et al. |
| 2014/0012574 A1 | 1/2014 | Pasupalak et al. |
| 2014/0013243 A1 | 1/2014 | Flynn, III et al. |
| 2014/0026061 A1 | 1/2014 | Kim et al. |
| 2014/0033071 A1 | 1/2014 | Gruber et al. |
| 2014/0043485 A1 | 2/2014 | Bateman et al. |
| 2014/0050455 A1 | 2/2014 | Ni et al. |
| 2014/0064738 A1 | 3/2014 | Chen et al. |
| 2014/0098247 A1 | 4/2014 | Rao et al. |
| 2014/0189518 A1 | 7/2014 | Kim et al. |
| 2014/0189586 A1 | 7/2014 | Waldman et al. |
| 2014/0218517 A1 | 8/2014 | Kim et al. |
| 2014/0222424 A1 | 8/2014 | Hartford et al. |
| 2014/0232873 A1* | 8/2014 | Meganathan .... G08B 13/19671 348/152 |
| 2014/0277795 A1 | 9/2014 | Matsuoka et al. |
| 2014/0313377 A1 | 10/2014 | Hampton |
| 2014/0359679 A1 | 12/2014 | Shivadas et al. |
| 2014/0365019 A1 | 12/2014 | Gourlay et al. |
| 2014/0375819 A1* | 12/2014 | Larsen .................. H04N 7/181 348/159 |
| 2015/0023650 A1 | 1/2015 | Austin et al. |
| 2015/0035987 A1 | 2/2015 | Fernandez |
| 2015/0058709 A1 | 2/2015 | Zaletel |
| 2015/0058730 A1 | 2/2015 | Dubin et al. |
| 2015/0097689 A1 | 4/2015 | Logue et al. |
| 2015/0113432 A1 | 4/2015 | Jung et al. |
| 2015/0113461 A1 | 4/2015 | Kasten et al. |
| 2015/0117513 A1 | 4/2015 | Sarafa et al. |
| 2015/0143239 A1 | 5/2015 | Birkbeck et al. |
| 2015/0173846 A1 | 6/2015 | Schneider et al. |
| 2015/0193127 A1 | 7/2015 | Chai et al. |
| 2015/0208205 A1 | 7/2015 | Chan et al. |
| 2015/0227196 A1 | 8/2015 | Fujii et al. |
| 2015/0242404 A1 | 8/2015 | Underwood, IV et al. |
| 2015/0248270 A1 | 9/2015 | Lang |
| 2015/0248275 A1 | 9/2015 | Gallo et al. |
| 2015/0269643 A1 | 9/2015 | Riley et al. |
| 2015/0287310 A1 | 10/2015 | Deiiuliis et al. |
| 2015/0310280 A1 | 10/2015 | Bentley et al. |
| 2015/0350265 A1 | 12/2015 | O'Brien |
| 2016/0004390 A1 | 1/2016 | Laska et al. |
| 2016/0005280 A1 | 1/2016 | Laska et al. |
| 2016/0026329 A1 | 1/2016 | Fadell et al. |
| 2016/0034574 A1 | 2/2016 | Kang |
| 2016/0041724 A1 | 2/2016 | Kirkby et al. |
| 2016/0043905 A1 | 2/2016 | Fiedler |
| 2016/0086038 A1 | 3/2016 | Scanlon et al. |
| 2016/0088326 A1* | 3/2016 | Solomon .............. H04N 21/254 725/12 |
| 2016/0105847 A1 | 4/2016 | Smith et al. |
| 2016/0110064 A1 | 4/2016 | Shapira |
| 2016/0139671 A1 | 5/2016 | Jun et al. |
| 2016/0139747 A1 | 5/2016 | Kocienda et al. |
| 2016/0147406 A1 | 5/2016 | Yi |
| 2016/0155315 A1 | 6/2016 | McElhinney et al. |
| 2016/0220743 A1 | 8/2016 | Guthrie et al. |
| 2016/0260414 A1 | 9/2016 | Yang |
| 2016/0283795 A1 | 9/2016 | Laska et al. |
| 2016/0335139 A1 | 11/2016 | Hurley et al. |
| 2016/0358436 A1 | 12/2016 | Wautier et al. |
| 2016/0364114 A1 | 12/2016 | Von Dehsen et al. |
| 2017/0003720 A1 | 1/2017 | Robinson et al. |
| 2017/0010790 A1 | 1/2017 | Glover et al. |
| 2017/0017376 A1 | 1/2017 | Han et al. |
| 2017/0017384 A1 | 1/2017 | Lee |
| 2017/0017392 A1 | 1/2017 | Castaneda et al. |
| 2017/0034430 A1 | 2/2017 | Fu et al. |
| 2017/0060399 A1 | 3/2017 | Hough et al. |
| 2017/0089739 A1 | 3/2017 | Gallo |
| 2017/0126975 A1 | 5/2017 | Duran et al. |
| 2017/0186079 A1 | 6/2017 | Kim et al. |
| 2017/0201850 A1 | 7/2017 | Raleigh et al. |
| 2017/0206761 A1 | 7/2017 | Li et al. |
| 2017/0207949 A1 | 7/2017 | Donaovan et al. |
| 2017/0286913 A1 | 10/2017 | Liu et al. |
| 2017/0308390 A1 | 10/2017 | Venis et al. |
| 2017/0329511 A1 | 11/2017 | Ueno et al. |
| 2017/0336920 A1 | 11/2017 | Chan et al. |
| 2017/0357439 A1 | 12/2017 | Lemay et al. |
| 2018/0018081 A1 | 1/2018 | Dattilo-Green et al. |
| 2018/0019889 A1 | 1/2018 | Burns et al. |
| 2018/0048819 A1 | 2/2018 | Duran et al. |
| 2018/0101297 A1 | 4/2018 | Yang et al. |
| 2018/0113577 A1 | 4/2018 | Burns et al. |
| 2018/0115788 A1 | 4/2018 | Burns et al. |
| 2018/0129380 A1 | 5/2018 | Suh et al. |
| 2018/0136819 A1 | 5/2018 | Lee et al. |
| 2018/0144615 A1 | 5/2018 | Kinney et al. |
| 2018/0187954 A1 | 7/2018 | Yang et al. |
| 2018/0311582 A1 | 11/2018 | Gerhard et al. |
| 2019/0361577 A1 | 11/2019 | Burns et al. |
| 2022/0215664 A1 | 7/2022 | Burns et al. |
| 2023/0214092 A1 | 7/2023 | Burns et al. |

OTHER PUBLICATIONS

"Notice of Allowance", U.S. Appl. No. 17/649,285, filed Mar. 20, 2024, 7 pages.

"Advisory Action", U.S. Appl. No. 15/335,396, filed May 11, 2020, 7 pages.

"AppCrawlr, ipCam FC—IP camera surveillance (ios)", Retrieved at: appcrawlr.com/ios/ipcam-fc-ip-camera-surveillance—on Jul. 16, 2015, 2 pages.

"Arlo on the App Store on iTunes", Retrieved at: https://apps.apple.com/us/app/arlo/id925911312—on Jul. 15, 2015, 2 pages.

"Bluetooth-conrrolled Pan/Tilt Servo Platform Using Android as Remote", Retrieved at: www.techbitar.com/bluetooth-controlled-pan-tilt-servo.html—on Nov. 19, 2020, 8 pages.

"D-Link Corporation, mydlink App", Retrieved at: www.mydlink.com/apps—on Jul. 15, 2015, 4 pages.

"D-Link Corporation, mydlink Lite", downloaded Jul. 15, 2015 from: itunes.apple.com/us/app/mydlink-lite/id372571229?mt=8, 2 pages.

"D-Link Corporation, mydlink+,", downloaded Jul. 15, 2015, From: itunes.apple.com/us/app/mydlink/id479832296?mt=8, 2 pages.

"Dropcam", Retrieved from: https://play.google.com/store/apps/details?id=com.dropcam.android, Aug. 20, 2015, 3 pages.

"Extended European Search Report", EP Application No. 17198499.0, Jun. 12, 2017, 10 pages.

"Extended European Search Report", EP Application No. 22186661.9, Oct. 6, 2022, 10 pages.

(56) References Cited

OTHER PUBLICATIONS

"Features> Button Bars", Available from Internet: http://insiteout.brinkster.net/Website%20New/buttonbars.asp, May 8, 2011, 6 pages.
"Final Office Action", U.S. Appl. No. 15/335,396, filed Jul. 11, 2019, 21 pages.
"Final Office Action", U.S. Appl. No. 15/335,396, filed Feb. 6, 2020, 23 pages.
"First Action Interview Office Action", U.S. Appl. No. 15/335,396, filed Aug. 22, 2019, 25 pages.
"Foreign Office Action", EP Application No. 17198499.0, Mar. 6, 2019, 8 pages.
"Foto de archivo", Retrieved at: https://es.123rf.com/photo_37507296_diseno-transparente-plantilla-de-interfaz-de-usuario-movil-disposicion-para-el-movil-pagina-web-il.html, Apr. 23, 2015, 3 pages.
"International Search Report and Written Opinion", Application No. PCT/US2018/020919, Jun. 11, 2018, 26 pages.
"Metal Fence on a dark background", Retrieved at: https://stockfresh.com/image/2626471/metal-fence-on-a-dark-background, Feb. 28, 2013, 1 page.
"Mini UI toolkit PSD Download", www.freepsds123.com/2014/06/21/mini-ui-toolkit-psd-download/, Jun. 21, 2014, 1 page.
"Netgear, Home Security Systems/ Security Cameras/ Arlo", http://www.arlo.com/en-us/, Jul. 16, 2015, 6 pages.
"Non-Final Office Action", U.S. Appl. No. 17/346,622, filed Oct. 16, 2020, 10 pages.
"Non-Final Office Action", U.S. Appl. No. 17/346,622, filed Sep. 23, 2022, 11 pages.
"Non-Final Office Action", U.S. Appl. No. 15/335,396, filed Mar. 29, 2021, 33 pages.
"Notice of Allowance", U.S. Appl. No. 17/346,622, filed Oct. 19, 2022, 10 pages.
"Notice of Allowance", U.S. Appl. No. 18/184,088, filed Nov. 29, 2023, 11 pages.
"Notice of Allowance", U.S. Appl. No. 17/346,622, filed Feb. 3, 2021, 13 pages.
"Notice of Allowance", U.S. Appl. No. 29/678,942, filed Jan. 14, 2021, 8 pages.
"Notice of Allowance", U.S. Appl. No. 15/335,396, filed Sep. 20, 2021, 8 pages.
"Octopussy (1983)—Cancelled", https://www.mi6-hq.com/sections/games/octopussy_1983, Oct. 2, 2014, 2 pages.
"Pre-Interview First Office Action", U.S. Appl. No. 15/335,396, filed Dec. 3, 2018, 25 pages.
"Pulsating Animation", Retrieved at: https://dribbble.com/shots/3218158-Pulsating-animation, Jan. 15, 2017, 1 page.
"Simi, ipCamFC—IP camera surveillance", Retrieved at: itunes.apple.com/us/app/ipcam-fc-ip-camera-surveillance/id548480721?mt=8—on Jul. 15, 2015, 2 pages.
"Stock Vector—Web Site Interface Icons // Button Bar Series", https://www.alamy.com/web-site-interface-icons-button-bar-series-image64003090.html, Aug. 2010, 1 page.
"Summons to Attend Oral Proceedings", EP Application No. 17198499.0, Mar. 17, 2021, 12 pages.
"Vector Video Player", Retrieved at: https://www.shutterstock.com/fr/image-vector/vector-audio-video-player-web-101573365, Aug. 21, 2014, 4 pages.
"Viewer For D-Link Cams IOS Version 3.1.2, 2013", Retrieved at: http://www.eyespyfx.com/dlink.php—on Jul. 15, 2015, 19 pages.
Ahmed, Nafees, "5 Best Video Editing Apps for Android Devices", Retrieved at: http://techbuzzes.com/2013/03/best-video-editing-apps-for-android/, 10 pages.
Baer, Drake, "Apple Has Reportedly Reversed The Ban On This Mindfulness App From the App Store", , Apr. 12, 2017, 2 pages.
Blatner, "WiCam: Wireless iPhone Camera, Rochester Institute of Technology", Retrieved at: www.ce/rit/edu/research/projects/2010-spring/WICam/index.html—on Jul. 15, 2015.
Fitzner, Michael, "Editing Effects Software to Make Your Video Sing", , May 1, 2012, 7 pages.
Hoang, Le, "YouTube: How to Find Previously Watched Videos", Retrieved at: https://www.tech-recipes.com/rx/11104/youtube-how-to-find-all-the-previously-watched-videos/, 2 pages.
Lipton, U A, et al., "Moving Target Classification and Tracking from Real-Time Video", , Oct. 1998, 7 pages.
Mooji, Andre, "Tap to Begin", Available at: https://dribbble.com/shots/3113672-Tap-to-Begin, 2 pages.
Nunal, Paul, "Best Android apps for videographers and video editors", , May 3, 2012, 12 pages.
Raiz, Greg, "Wireframe toolkit for Keynote and Powerpoint", , Jun. 29, 2011, 7 pages.
Russel, Holly, "Nest Aware, and why the Nest Cam subscription makes sense", https://www.androidcentral.com/nest-aware-and-why-nest-cam-subscription-makes-sense, 5 pages.
Tenon, Biff, "Abstract background with animation of flicker and moving patterns from clear colorful circles. Animation of seamless loop", Retrieved at: https://www.shutterstock.com/fr/video/clip-24321839-abstract-background-animation-flicker-moving-patterns-clear—on Nov. 2020, 3 pages.
Viola, Paul, et al., "Rapid Object Detection Using a Boosted Cascade of Simple Features", , Feb. 2001, 11 pages.
Msavadia, Jay, "i0S7 Wireframe", https://dribbble.com/shots/1352315-i0S7-Wireframe, 1 page.
Wollerton, Megan, "Netgear Arlo Smart Home Security review: Netgear's Arlo defies typical security camera limitations", www.cnet.com/products/netgear-arlo-smart-home-security-kit, 5 pages.
Wollerton, Megan, "Turn your old iPod into a security camera for free, CNET,", https://www.cnet.com/how-to/turn-your-old-ipod-into-a-security-camera-for-free/, 3 pages.

* cited by examiner

TIMELINE-VIDEO RELATIONSHIP PRESENTATION FOR ALERT EVENTS

RELATED APPLICATIONS

This application is a continuation of and claims priority to U.S. Non-Provisional patent application Ser. No. 18/184,088, filed on Mar. 15, 2023, which in turn is a continuation of and claims priority to U.S. Non-Provisional patent application Ser. No. 17/346,622, filed on Jun. 14, 2021, now U.S. Pat. No. 11,609,684, issued on Mar. 21, 2023, which in turn is a continuation of and claims priority to U.S. Non-Provisional patent application Ser. No. 16/536,255, filed on Aug. 8, 2019, now U.S. Pat. No. 11,036,361, issued on Jun. 15, 2021, which in turn is a continuation of and claims priority to U.S. Non-Provisional patent application Ser. No. 15/335,399, filed Oct. 26, 2016, now U.S. Pat. No. 10,386,999, issued on Aug. 20, 2019, the disclosures of which are incorporated by reference herein in their entireties.

This application is related to the following applications, which are hereby incorporated by reference in their entirety: U.S. Non-Provisional patent application Ser. No. 15/335,396, filed Oct. 26, 2016; U.S. Non-Provisional patent application Ser. No. 15/208,578, filed Jul. 12, 2016; and U.S. Non-Provisional patent application Ser. No. 15/208,585, filed Jul. 12, 2016.

TECHNICAL FIELD

The disclosed implementations relate generally to video monitoring, including, but not limited to, monitoring and reviewing video feeds, events, and corresponding timelines.

BACKGROUND

The advancement of internet and mobile technologies has enabled the adoption of remote video surveillance by users. Users can now monitor an area under video surveillance using a website or a mobile application. Such websites or mobile apps typically allow a user to view live video and/or saved video recordings, but otherwise provide little or no additional information regarding the videos. Furthermore, the user interfaces for viewing these live or saved videos have a user control flow that does not provide adequate context or information to the user. Thus, more efficient, informative, and user-friendly presentations of live and saved video surveillance are needed.

SUMMARY

Accordingly, there is a need for presentations of live and/or saved video with a more efficient user control flow and more useful information. Such methods optionally complement or replace conventional methods for presenting live and/or saved video from video streams.

In accordance with some implementations, a method includes, at an electronic device having a display, one or more processors, and memory storing one or more programs for execution by the one or more processors: displaying, via the display of the electronic device, a user interface having a first region and a second region; receiving, and displaying in the first region of the user interface, a live video stream of a physical environment captured by a video camera located remotely from the electronic device, wherein at least some of the live video stream is recorded at a remote server; displaying, in the second region of the user interface, a timeline corresponding to a timespan for a first portion of a duration during which the live video stream may have been recorded; in response to receiving a user interaction indicating a desire to move the timespan to a second portion of the duration during which the live video stream may have been recorded, transitioning the displayed timeline to a new timeline that corresponds to the timespan for the second portion, and while transitioning the displayed timeline to the new timeline, displaying, in the first region of the user interface, a subset of video frames representing the first and/or second portion of the duration during which the live video stream may have been recorded.

In accordance with some implementations, an electronic device includes a display, one or more processors, and memory storing one or more programs to be executed by the one or more processors. The one or more programs include instructions for: displaying, via the display of the electronic device, a user interface having a first region and a second region; receiving, and displaying in the first region of the user interface, a live video stream of a physical environment captured by a video camera located remotely from the electronic device, wherein at least some of the live video stream is recorded at a remote server; displaying, in the second region of the user interface, a timeline corresponding to a timespan for a first portion of a duration during which the live video stream may have been recorded; in response to receiving a user interaction indicating a desire to move the timespan to a second portion of the duration during which the live video stream may have been recorded, transitioning the displayed timeline to a new timeline that corresponds to the timespan for the second portion, and while transitioning the displayed timeline to the new timeline, displaying, in the first region of the user interface, a subset of video frames representing the first and/or second portion of the duration during which the live video stream may have been recorded.

In accordance with some implementations, a non-transitory computer readable storage medium stores one or more programs. The one or more programs include instructions, which, when executed by an electronic device with a display and one or more processors, cause the electronic device to perform operations including: displaying, via the display of the electronic device, a user interface having a first region and a second region; receiving, and displaying in the first region of the user interface, a live video stream of a physical environment captured by a video camera located remotely from the electronic device, wherein at least some of the live video stream is recorded at a remote server; displaying, in the second region of the user interface, a timeline corresponding to a timespan for a first portion of a duration during which the live video stream may have been recorded; in response to receiving a user interaction indicating a desire to move the timespan to a second portion of the duration during which the live video stream may have been recorded, transitioning the displayed timeline to a new timeline that corresponds to the timespan for the second portion, and while transitioning the displayed timeline to the new timeline, displaying, in the first region of the user interface, a subset of video frames representing the first and/or second portion of the duration during which the live video stream may have been recorded.

In accordance with some implementations, a method includes, at a server system: receiving a video stream from a remote video camera, wherein the video stream comprises a plurality of video frames; selecting a plurality of non-contiguous frames from the video stream, the plurality of non-contiguous frames being associated with a predetermined time interval; encoding the plurality of non-contiguous frames as a compressed video segment associated with the time interval; receiving a request from an application running on a client device to review video from the remote video camera for the time interval; and in response to the request, transmitting the video segment to the client device for viewing in the application.

In accordance with some implementations, a computer system includes one or more processors and memory storing one or more programs to be executed by the one or more processors. The one or more programs include instructions for: receiving a video stream from a remote video camera, wherein the video stream comprises a plurality of video frames; selecting a plurality of non-contiguous frames from the video stream, the plurality of non-contiguous frames being associated with a predetermined time interval; encoding the plurality of non-contiguous frames as a compressed video segment associated with the time interval; receiving a request from an application running on a client device to review video from the remote video camera for the time interval; and in response to the request, transmitting the video segment to the client device for viewing in the application.

In accordance with some implementations, a non-transitory computer readable storage medium stores one or more programs. The one or more programs include instructions, which, when executed by a computer system with one or more processors, cause the computer system to perform operations including: receiving a video stream from a remote video camera, wherein the video stream comprises a plurality of video frames; selecting a plurality of non-contiguous frames from the video stream, the plurality of non-contiguous frames being associated with a predetermined time interval; encoding the plurality of non-contiguous frames as a compressed video segment associated with the time interval; receiving a request from an application running on a client device to review video from the remote video camera for the time interval; and in response to the request, transmitting the video segment to the client device for viewing in the application.

Thus, computing systems are provided with more efficient methods for presenting live and/or saved video and related information, thereby increasing the effectiveness, efficiency, and user satisfaction with such systems. Such methods may complement or replace conventional methods for presenting live and/or saved video.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 1:
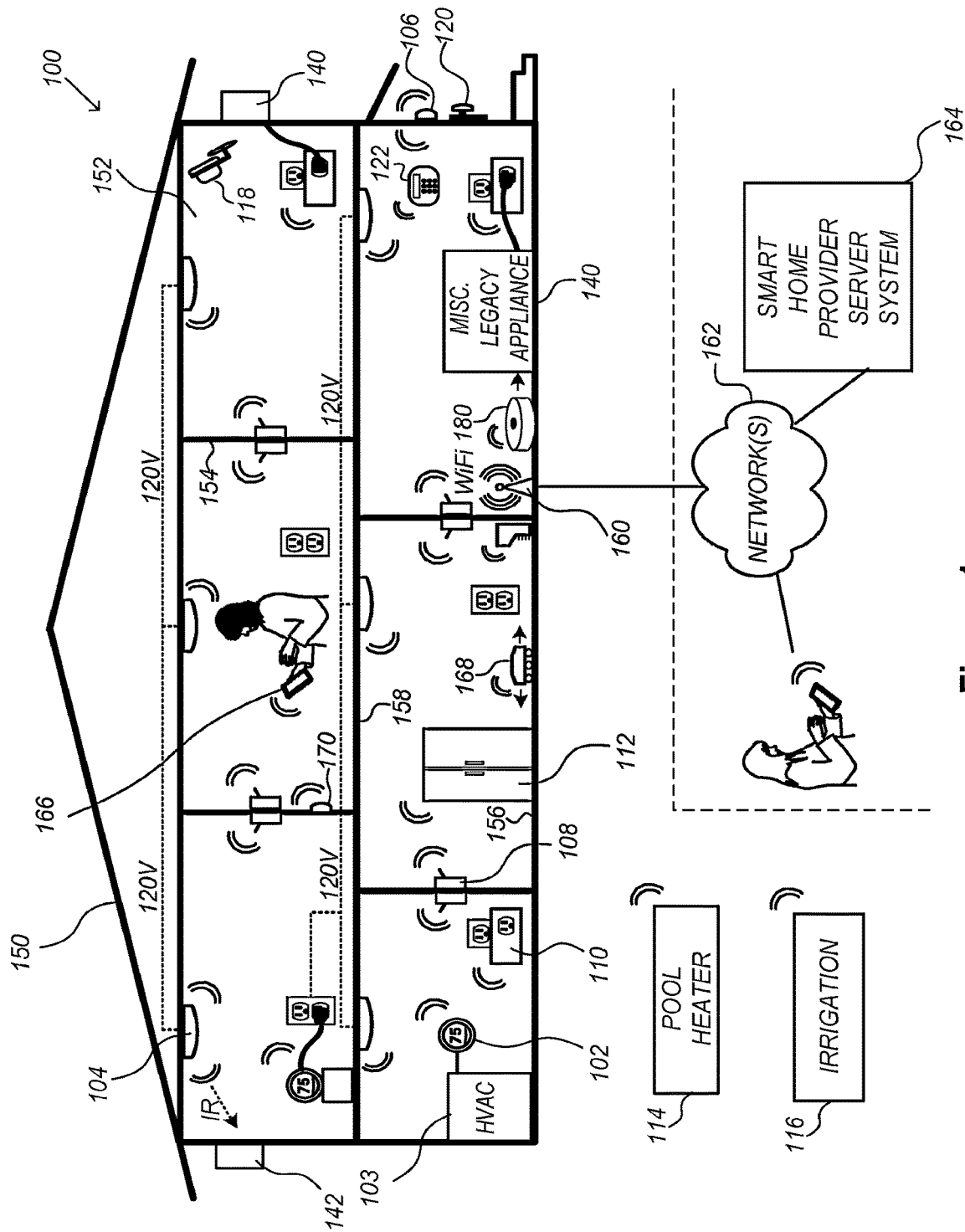
FIG. 1 is an example smart home environment, in accordance with some implementations.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, one or more devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. In some implementations, cameras 118 also capture video when other conditions or hazards are detected, in order to provide visual monitoring of the smart home environment 100 when those conditions or hazards occur. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). For example, cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may include one or more sound and/or vibration sensors for detecting abnormal sounds and/or vibrations. These sensors may be integrated with any of the devices described above. The sound sensors detect sound above a decibel threshold. The vibration sensors detect vibration above a threshold directed at a particular area (e.g., vibration on a particular window when a force is applied to break the window).

Conditions detected by the devices described above (e.g., motion, sound, vibrations, hazards) may be referred to collectively as alert events.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device (s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network (s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device.

Figure 2:
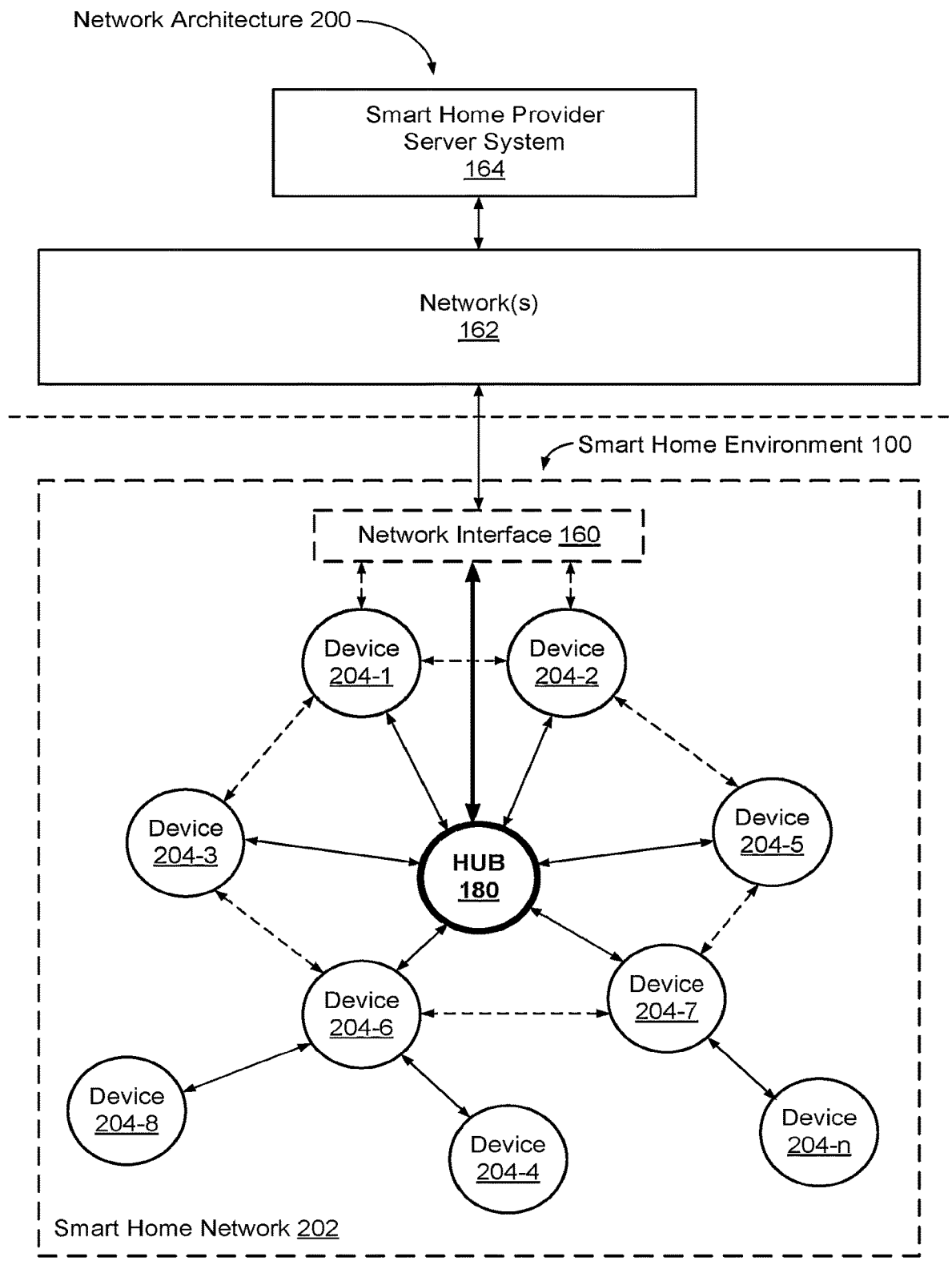
FIG. 2 is a block diagram illustrating an example network architecture that includes a smart home network, in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In some implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
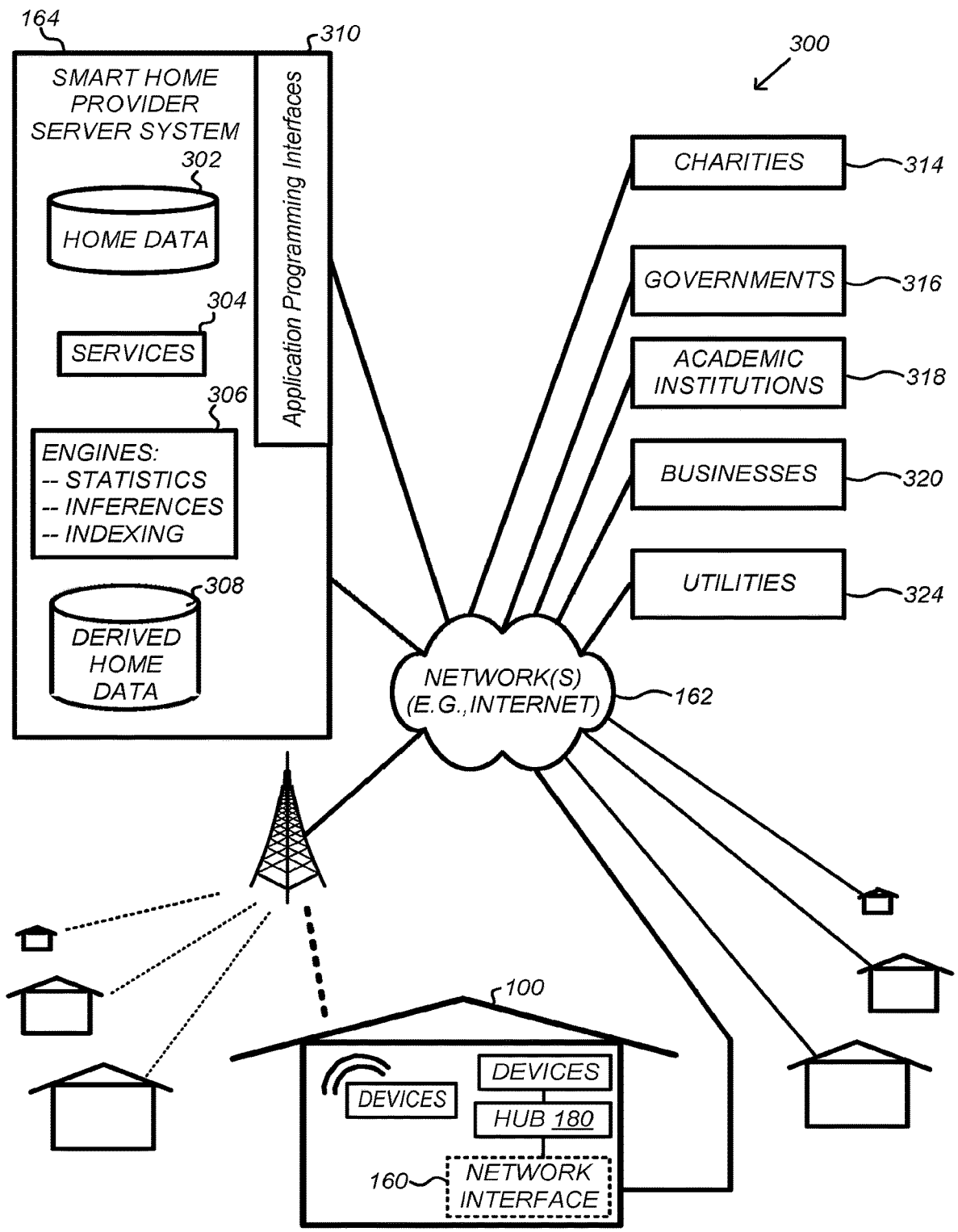
FIG. 3 illustrates a network-level view of an extensible devices and services platform with which the smart home environment of FIG. 1 is integrated, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, usage statistics, usage statistics relative to use of other devices, usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
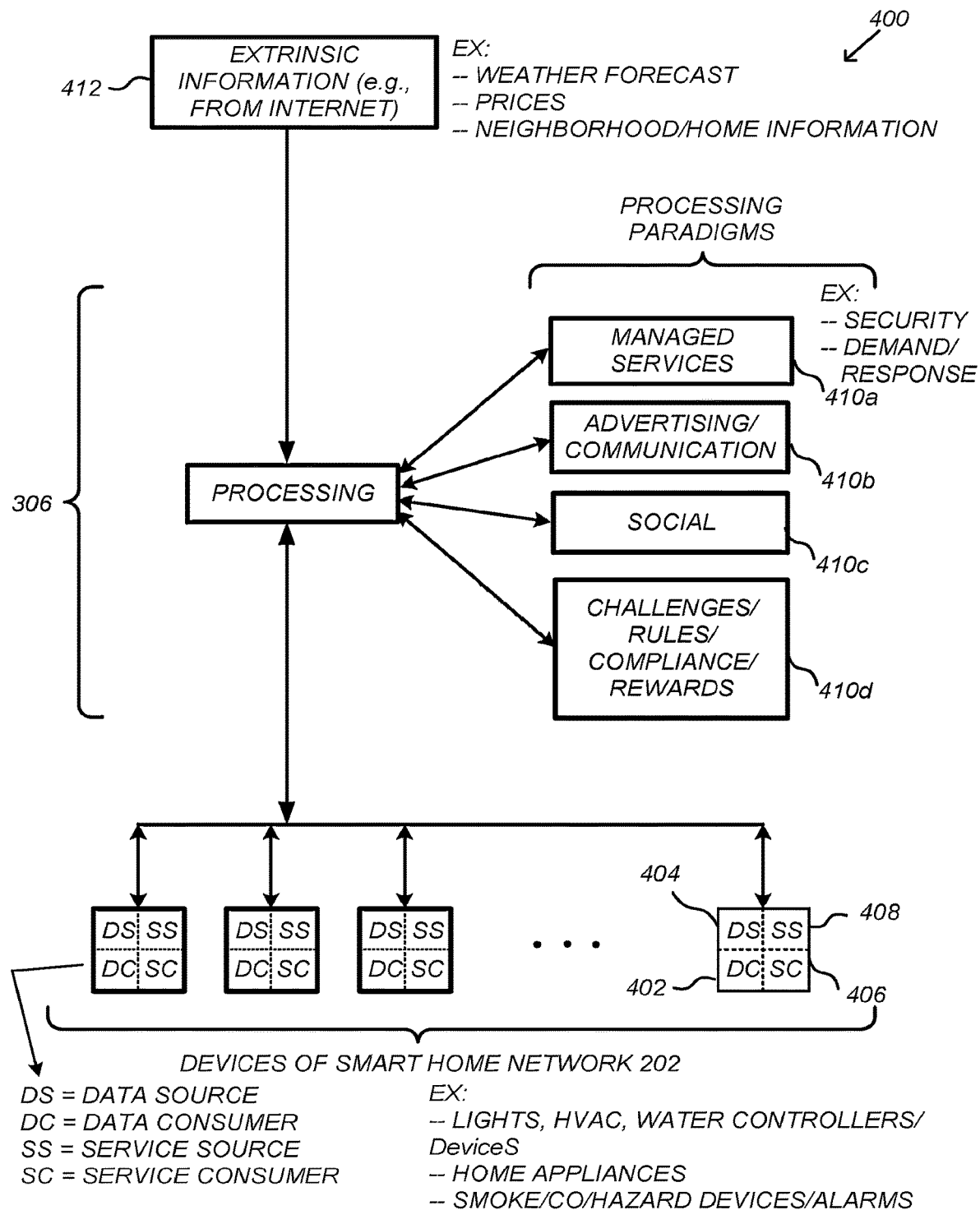
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5A:
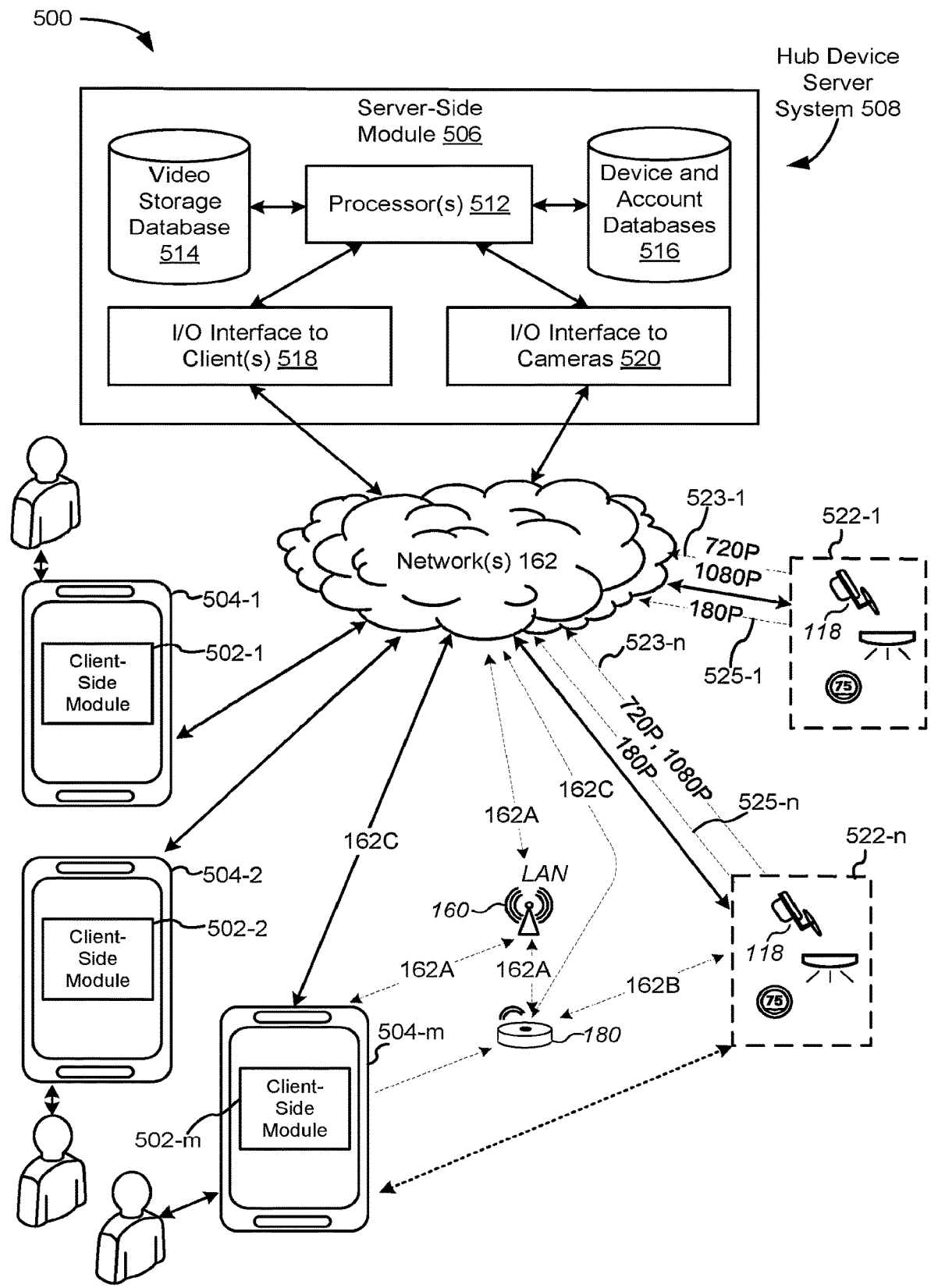
FIG. 5A is a representative operating environment in which a hub device server system interacts with client devices and hub devices communicatively coupled to local smart devices, in accordance with some implementations.

FIG. 5A illustrates a representative operating environment 500 in which a hub device server system 508 provides data processing for monitoring and facilitating review of alert events (e.g., motion events) in video streams captured by video cameras 118. As shown in FIG. 5A, the hub device server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more user (e.g., reviewer) accounts, and the hub device server system 508 provides video monitoring data for the video source 522 to client devices 504 associated with the reviewer accounts. For example, the portable electronic device 166 is an example of a client device 504.

In some implementations, the smart home provider server system 164 or a component thereof serves as the hub device server system 508; the hub device server system 508 is a part or component of the smart home provider server system 164. In some implementations, the hub device server system 508 is a dedicated video processing server that provides video processing services to video sources and client devices 504 independent of other services provided by the hub device server system 508. An example of a video processing server is described below with reference to FIG. 5B.

In some implementations, each of the video sources 522 includes one or more video cameras 118 that capture video and send the captured video to the hub device server system 508 substantially in real-time. In some implementations, each of the video sources 522 optionally includes a controller device (not shown) that serves as an intermediary between the one or more cameras 118 and the hub device server system 508. The controller device receives the video data from the one or more cameras 118, optionally performs some preliminary processing on the video data, and sends the video data to the hub device server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the hub device server system 508.

In some implementations, a camera 118 of a video source 522 captures video at a first resolution (e.g., 720 P and/or 1080 P) and/or a first frame rate (24 frames per second), and sends the captured video to the hub device server system 508 at both the first resolution (e.g., the original capture resolution(s), the high-quality resolution(s) such as 1080 P and/or 720 P) and the first frame rate, and at a second, different resolution (e.g., 180 P) and/or a second frame rate (e.g., 5 frames per second or 10 frames per second). For example, the camera 118 captures a video 523-1 at 720 P and/or 1080 P resolution (the camera 118 may capture a video at 1080 P and create a downscaled 720 P version, or capture at both 720 P and 1080 P). The video source 522 creates a second (or third), rescaled (and optionally at a different frame rate than the version 523-1) version 525-1 of the captured video at 180 P resolution, and transmits both the original captured version 523-1 (i.e., 1080 P and/or 720 P) and the rescaled version 525-1 (i.e., the 180 P version) to the hub device server system 508 for storage. In some implementations, the rescaled version has a lower resolution, and optionally a lower frame rate, than the original captured video. The hub device server system 508 transmits the original captured version or the rescaled version to a client 504, depending on the context. For example, the hub device server system 508 transmits the rescaled version when transmitting multiple videos to the same client device 504 for concurrent monitoring by the user, and transmits the original captured version in other contexts. In some implementations, the hub device server system 508 downscales the original captured version to a lower resolution, and transmits the downscaled version.

In some implementations, a camera 118 of a video source 522 captures video at a first resolution (e.g., 720 P and/or 1080 P) and/or a first frame rate, and sends the captured video to the hub device server system 508 at the first resolution (e.g., the original capture resolution(s); the high-quality resolution(s) such as 1080 P and/or 720 P) and first frame rate for storage. When the hub device server system 508 transmits the video to a client device, the hub device server system 508 may downscale the video to a second, lower resolution (e.g., 180 P) and/or second, lower frame rate for the transmission, depending on the context. For example, the hub device server system 508 transmits the downscaled version when transmitting multiple videos to the same client device 504 for concurrent monitoring by the user, and transmits the original captured version in other contexts.

As shown in FIG. 5A, in accordance with some implementations, each of the client devices 504 includes a client-side module 502. The client-side module 502 communicates with a server-side module 506 executed on the hub device server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. In some implementations, the I/O interface to clients 518 or a transcoding proxy computer (not shown) rescales (e.g., downscales) and/or changes the frame rate of video for transmission to a client 504. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account. The video storage database 514 also includes in some implementations a collection of curated and condensed video frames (e.g., extracted-frames video, described further below) covering hours or days of stored raw video to facilitate fast, seamless user review/scrubbing using a client side module 502 through key events/cuepoints that occurred in those hours and days of stored video without needing to download to or review on a client device 504 the raw video directly.

In some implementations, the server-side module 506 receives information regarding alert events detected by other smart devices 204 (e.g., hazards, sound, vibration, motion). In accordance with the alert event information, the server-side module 506 instructs one or more video sources 522 in the smart home environment 100 where the alert event is detected to capture video and/or associate with the alert event video, received from the video sources 522 in the same smart home environment 100, that is contemporaneous or proximate in time with the alert event.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices. For example, client devices 504-1, 504-2, and 504-*m* are a smart phone, a tablet computer, and a laptop computer, respectively.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol.

In some implementations, the hub device server system 508 is implemented on one or more standalone data processing apparatuses or a distributed network of computers. In some implementations, the hub device server system 508 also employs various virtual devices and/or services of third party service providers (e.g., third-party cloud service providers) to provide the underlying computing resources and/or infrastructure resources of the hub device server system 508. In some implementations, the hub device server system 508 includes, but is not limited to, a handheld computer, a tablet computer, a laptop computer, a desktop computer, or a combination of any two or more of these data processing devices or other data processing devices.

The server-client environment 500 shown in FIG. 5A includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the hub device server system 508 can vary in different implementations. For example, in some implementations, client-side module 502 is a thin-client that provides only user-facing input and output processing functions, and delegates all other data processing functionalities to a backend server (e.g., the hub device server system 508). Similarly, in some implementations, a respective one of the video sources 522 is a simple video capturing device that continuously captures and streams video data to the hub device server system 508 with no or limited local preliminary processing on the video data. Although many aspects of the present technology are described from the perspective of the hub device server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the hub device server system 508, the client device 504, and the video sources 522 cooperatively.

It should be understood that operating environment 500 that involves the hub device server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-*m*) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-*n* exchange data with the hub device 180. Alternatively, in some situations, some of the electronic devices of the video sources 522-*n* communicate with the network interface device 160 directly via the same sub-network 162A that couples devices 160, 180 and 504-*m*. In some implementations (e.g., in the network 162C), both the client device 504-*m* and the electronic devices of the video sources 522-*n* communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-*n*. As explained above, the network interface device 160 and the hub device 180 optionally communicate with each other via a sub-network 162A.

In some implementations, the hub device 180 is omitted, and the functionality of the hub device 180 is performed by the hub device server system 508, video server system 552, or smart home provider server system 164.

Figure 5B:
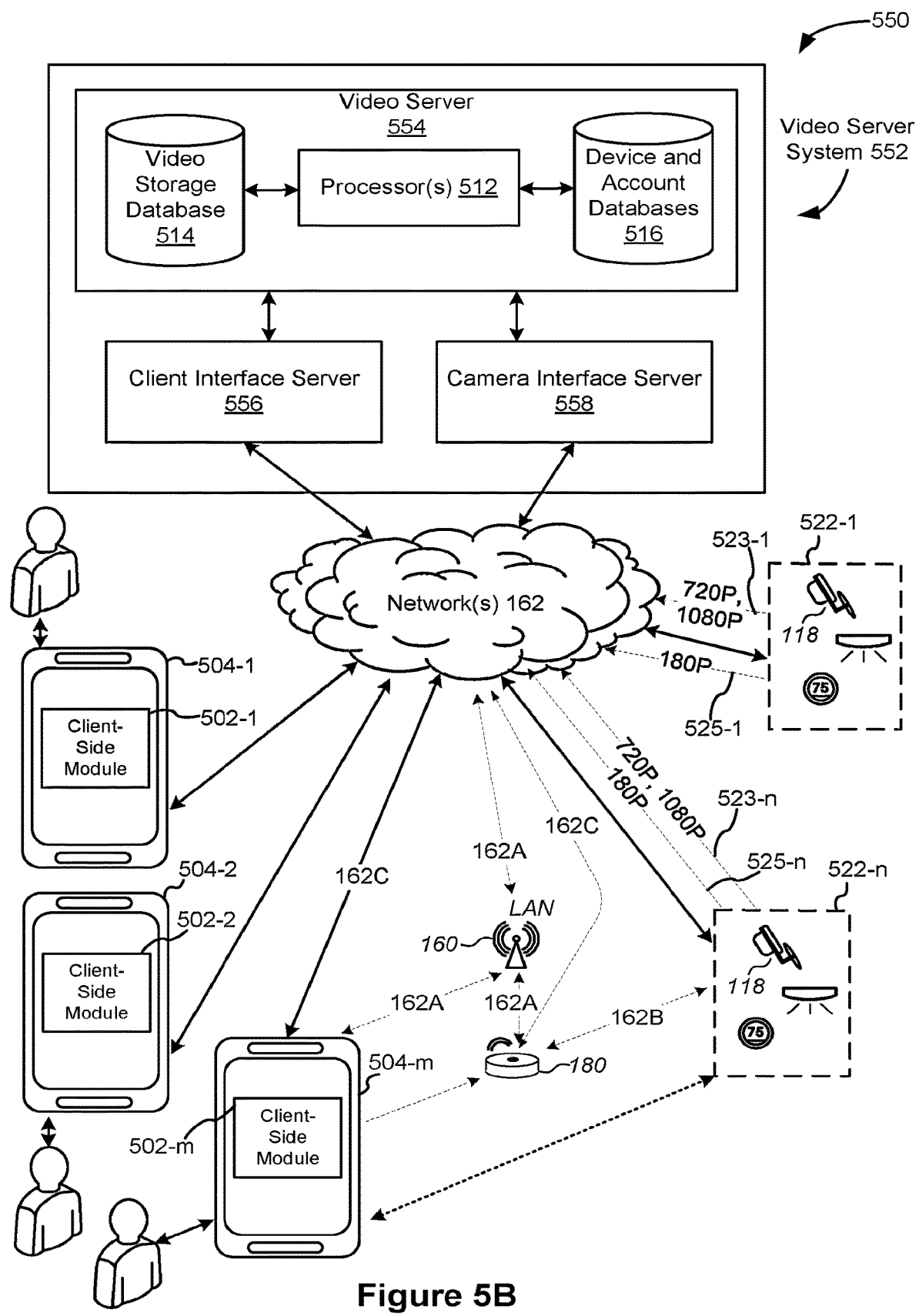
FIG. 5B is a representative operating environment in which a video server system interacts with client devices and hub devices communicatively coupled to local smart devices, in accordance with some implementations.

In some implementations, the hub device server system 508 is, or includes, a dedicated video processing server. FIG. 5B illustrates a representative operating environment 550 in which a video server system 552 serves as a dedicated video processing server and provides data processing for monitoring and facilitating review of alert events (e.g., motion events) in video streams captured by video cameras 118. As shown in FIG. 5B, the video server system 552 receives video data from video sources 522 (including cameras 118) located at various physical locations (e.g., inside homes, restaurants, stores, streets, parking lots, and/or the smart home environments 100 of FIG. 1). Each video source 522 may be bound to one or more user (e.g., reviewer) accounts, and the video server system 552 provides video monitoring data for the video source 522 to client devices 504 associated with the reviewer accounts. For example, the portable electronic device 166 is an example of the client device 504.

In some implementations, the smart home provider server system 164 or a component thereof serves as the video server system 552; the video server system 552 is a part or component of the smart home provider server system 164. In some implementations, the video server system 552 is separate from the smart home provider server system 164, and provides video processing services to video sources 522 and client devices 504 independent of other services provided by the smart home provider server system 164. In some implementations, the smart home provider server system 164 and the video server system 552 are separate but communicate information with each other to provide functionality to users. For example, a detection of a hazard may be communicated by the smart home provider server system 164 to the video server system 552, and the video server system 552, in accordance with the communication regarding the detection of the hazard, records, processes, and/or provides video associated with the detected hazard.

In some implementations, each of the video sources 522 includes one or more video cameras 118 that capture video and send the captured video to the video server system 552 substantially in real-time. In some implementations, each of the video sources 522 optionally includes a controller device (not shown) that serves as an intermediary between the one or more cameras 118 and the video server system 552. The controller device receives the video data from the one or more cameras 118, optionally, performs some preliminary processing on the video data, and sends the video data to the video server system 552 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the video server system 552.

In some implementations, a camera 118 of a video source 522 captures video at a first resolution (e.g., 720 P and/or 1080 P) and/or a first frame rate (24 frames per second), and sends the captured video to the video server system 552 at both the first resolution (e.g., the original capture resolution(s), the high-quality resolution(s)) and the first frame rate, and a second, different resolution (e.g., 180 P) and/or a second frame rate (e.g., 5 frames per second or 10 frames per second). For example, the camera 118 captures a video 523-1 at 720 P and/or 1080 P resolution (the camera 118 may capture a video at 1080 P and create a downscaled 720 P version, or capture at both 720 P and 1080 P). The video source 522 creates a second (or third), rescaled (and optionally at a different frame rate than the version 523-1) version 525-1 of the captured video at 180 P resolution, and transmits both the original captured version 523-1 (i.e., 1080 P and/or 720 P) and the rescaled version 525-1 (i.e., the 180 P version) to the video server system 552 for storage. In some implementations, the rescaled version has a lower resolution, and optionally a lower frame rate, than the original captured video. The video server system 552 transmits the original captured version or the rescaled version to a client 504, depending on the context. For example, the video server system 552 transmits the rescaled version when transmitting multiple videos to the same client device 504 for concurrent monitoring by the user, and transmits the original captured version in other contexts. In some implementations, the video server system 552 downscales the original captured version to a lower resolution, and transmits the downscaled version.

In some implementations, a camera 118 of a video source 522 captures video at a first resolution (e.g., 720 P and/or 1080 P)) and/or a first frame rate, and sends the captured video to the video server system 552 at the first resolution (e.g., the original capture resolution(s), the high-quality resolution(s) such as 1080 P and/or 720 P) and the first fame rate for storage. When the video server system 552 transmits the video to a client device, the video server system 552 may downscale the video to a second, lower resolution (e.g., 180 P) and/or second, lower frame rate for the transmission, depending on the context. For example, the video server system 552 transmits the downscaled version when transmitting multiple videos to the same client device 504 for concurrent monitoring by the user, and transmits the original captured version in other contexts.

As shown in FIG. 5B, in accordance with some implementations, each of the client devices 504 includes a client-side module 502. The client-side module 502 communicates with the video server system 552 through the one or more networks 162. In some implementations, the video server system 552 includes a video server 552, a client interface server 556, and a camera interface server 558. In some implementations, the video server 552 includes the server-side module 506 and its components and modules (FIG. 5A) or one or more respective components and/or modules of the server-side module 506. The client-side module 502 provides client-side functionalities for the event monitoring and review processing and communications with the video server system 552. The video server system 552 provides server-side functionalities for event monitoring and review processing for any number of client-side modules 502 each residing on a respective client device 504. The video server system 556 also provides server-side functionalities for video processing and camera control for any number of the video sources 522, including any number of control devices and the cameras 118.

In some implementations, the video server 554 includes one or more processors 512, a video storage database 514, and device and account databases 516. In some implementations, the video server system 552 also includes a client interface server 556 and a camera interface server 558. The client interface server 556 provides an I/O interface to one or more client devices 504, and the camera interface server 558 provides an I/O interface to one or more video sources 520. The client interface server 556 facilitates the client-facing input and output processing for the video server system 552. For example, the client interface server 556 generates web pages for reviewing and monitoring video captured by the video sources 522 in a web browser application at a client 504. In some implementations, the client interface server 556 or a transcoding proxy computer rescales (e.g., downscales) and/or changes the frame rate of video for transmission to a client 504. In some implementations, the client interface server 504 also serves as the transcoding proxy. The databases 516 store a plurality of profiles for reviewer accounts registered with the video processing server, where a respective user profile includes account credentials for a respective reviewer account, and one or more video sources linked to the respective reviewer account. The camera interface server 558 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, event masks, alert events, and camera histories, for use in data processing for event monitoring and review for each reviewer account.

In some implementations, the video server system 552 receives information regarding alert events detected by other smart devices 204 (e.g., hazards, sound, vibration, motion. In accordance with the alert event information, the video server system 552 instructs one or more video sources 522 in the smart home environment 100 where the alert event is detected to capture video and/or associate with the alert event video, received from the video sources 522 in the same smart home environment 100, that is contemporaneous or proximate in time with the alert event.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices. For example, client devices 504-1, 504-2, and 504-m are a smart phone, a tablet computer, and a laptop computer, respectively.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol.

In some implementations, the video server system 552 is implemented on one or more standalone data processing apparatuses or a distributed network of computers. In some implementations, the video server 554, the client interface server 556, and the camera interface server 558 are each respectively implemented on one or more standalone data processing apparatuses or a distributed network of computers. In some implementations, the video server system 552 also employs various virtual devices and/or services of third party service providers (e.g., third-party cloud service providers) to provide the underlying computing resources and/or infrastructure resources of the video server system 552. In some implementations, the video server system 552 includes, but is not limited to, a handheld computer, a tablet computer, a laptop computer, a desktop computer, or a combination of any two or more of these data processing devices or other data processing devices.

The server-client environment 550 shown in FIG. 5B includes both a client-side portion (e.g., the client-side module 502) and a server-side portion (e.g., the components and modules in the video server system 552). The division of functionalities between the client and server portions of operating environment 550 can vary in different implementations. Similarly, the division of functionalities between the video source 522 and the video server system 552 can vary in different implementations. For example, in some implementations, client-side module 502 is a thin-client that provides only user-facing input and output processing functions, and delegates all other data processing functionalities to a backend server (e.g., the video server system 552). Similarly, in some implementations, a respective one of the video sources 522 is a simple video capturing device that continuously captures and streams video data to the video server system 552 with no or limited local preliminary processing on the video data. Although many aspects of the present technology are described from the perspective of the video server system 552, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the video server system 552, the client device 504, and the video sources 522 cooperatively.

It should be understood that operating environment 550 that involves the video server system 552, the video sources 522 and the video cameras 118 is merely an example. Many aspects of operating environment 550 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-m) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-n exchange data with the hub device 180. Alternatively, in some situations, some of the electronic devices of the video sources 522-n communicate with the network interface device 160 directly via the same sub-network 162A that couples devices 160, 180 and 504-m. In some implementations (e.g., in the network 162C), both the client device 504-m and the electronic devices of the video sources 522-n communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-n. As explained above, the network interface device 160 and the hub device 180 optionally communicate with each other via a sub-network 162A.

In some implementations, a video source 522 may be private (e.g., its captured videos and history are accessible only to the associated user/account), public (e.g., its captured videos and history are accessible by anyone), or shared (e.g., its captured videos and history are accessible only to the associated user/account and other specific users/accounts with whom the associated user has authorized access (e.g., by sharing with the other specific users)). Whether a video source 522 is private, public, or shared is configurable by the associated user.

In some implementations, the camera 118 also performs preliminary motion detection on video captured by the camera 118. For example, the camera 118 analyzes the captured video for significant changes in pixels. When motion is detected by the preliminary motion detection, the camera 118 transmits information to the hub device server system 508 or video server system 552 informing the server system of the preliminary detected motion. The hub device server system 508 or video server system 552, in accordance with the information of the detected motion, may activate sending of a motion detection notification to a client device 504, log the preliminary detected motion as an alert event, and/or perform additional analysis of the captured video to confirm and/or classify the preliminary detected motion.

Figure 6:
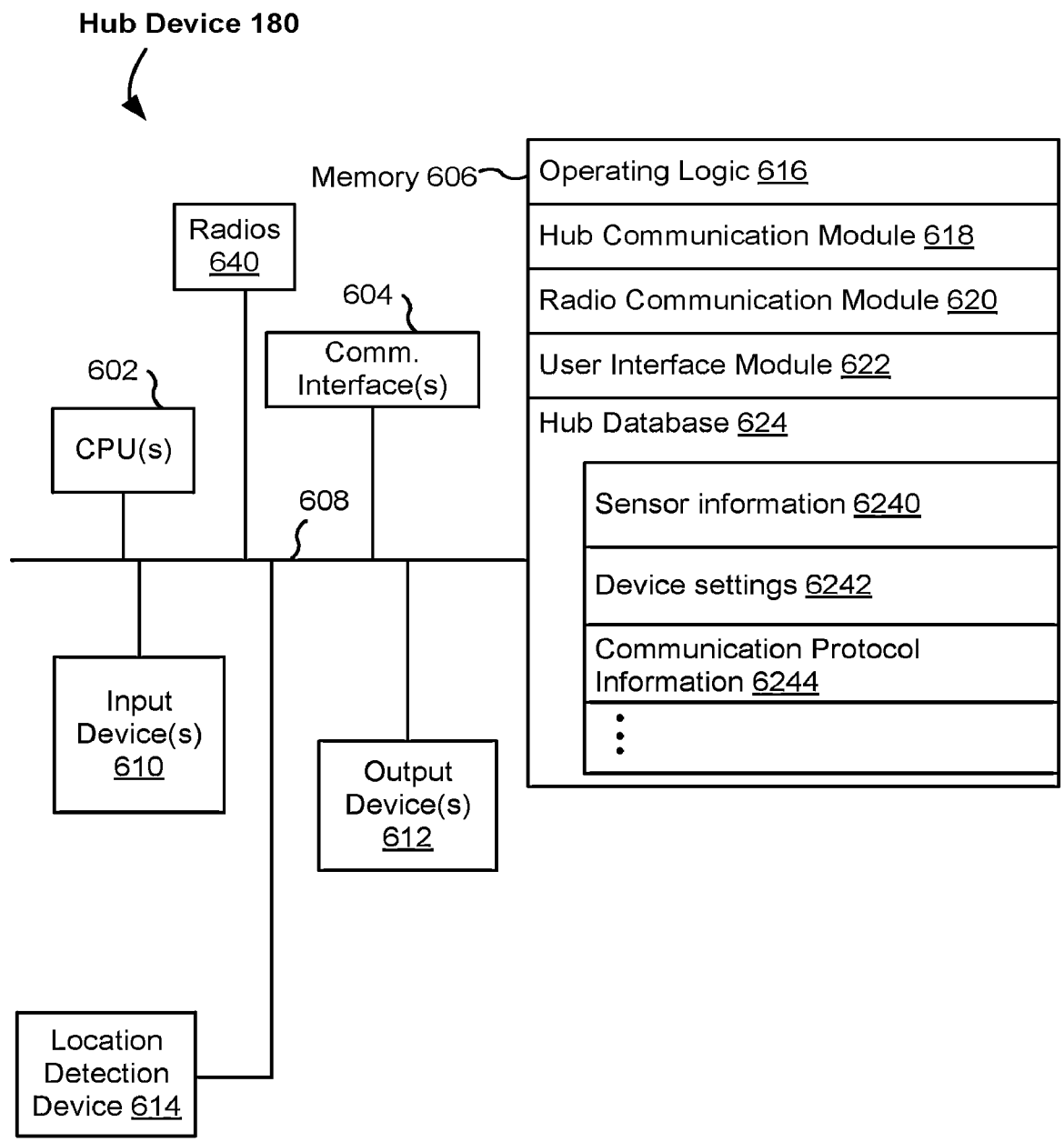
FIG. 6 is a block diagram illustrating a representative hub device, in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, and one or more communication buses 608 for interconnecting these components (sometimes called a chipset). In some implementations, the hub device 180 includes one or more input devices 610 such as one or more buttons for receiving input. In some implementations, the hub device 180 includes one or more output devices 612 such as one or more indicator lights, a sound card, a speaker, a small display for displaying textual information and error codes, etc. Furthermore, in some implementations, the hub device 180 uses a microphone and voice recognition or a camera and gesture recognition to supplement or replace the keyboard. In some implementations, the hub device 180 includes a location detection device 614, such as a GPS (global positioning satellite) or other geo-location receiver, for determining the location of the hub device 180.

The hub device 180 optionally includes one or more built-in sensors (not shown), including, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 640 enables one or more radio communication networks in the smart home environments, and allows a hub device to communicate with smart devices. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 604 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

- Operating logic 616 including procedures for handling various basic system services and for performing hardware dependent tasks;
- Hub device communication module 618 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);
- Radio Communication Module 620 for connecting the hub device 180 to other devices (e.g., controller devices, smart devices 204 in smart home environment 100, client devices 504) via one or more radio communication devices (e.g., radios 640);
- User interface module 622 for providing and displaying a user interface in which settings, captured data, and/or other data for one or more devices (e.g., smart devices 204 in smart home environment 100) can be configured and/or viewed; and
- Hub device database 624, including but not limited to:
    - Sensor information 6240 for storing and managing data received, detected, and/or transmitted by one or more sensors of the hub device 180 and/or one or more other devices (e.g., smart devices 204 in smart home environment 100);
    - Device settings 6242 for storing operational settings for one or more devices (e.g., coupled smart devices 204 in smart home environment 100); and
    - Communication protocol information 6244 for storing and managing protocol information for one or more protocols (e.g., standard wireless protocols, such as ZigBee, Z-Wave, etc., and/or custom or standard wired protocols, such as Ethernet).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7A:
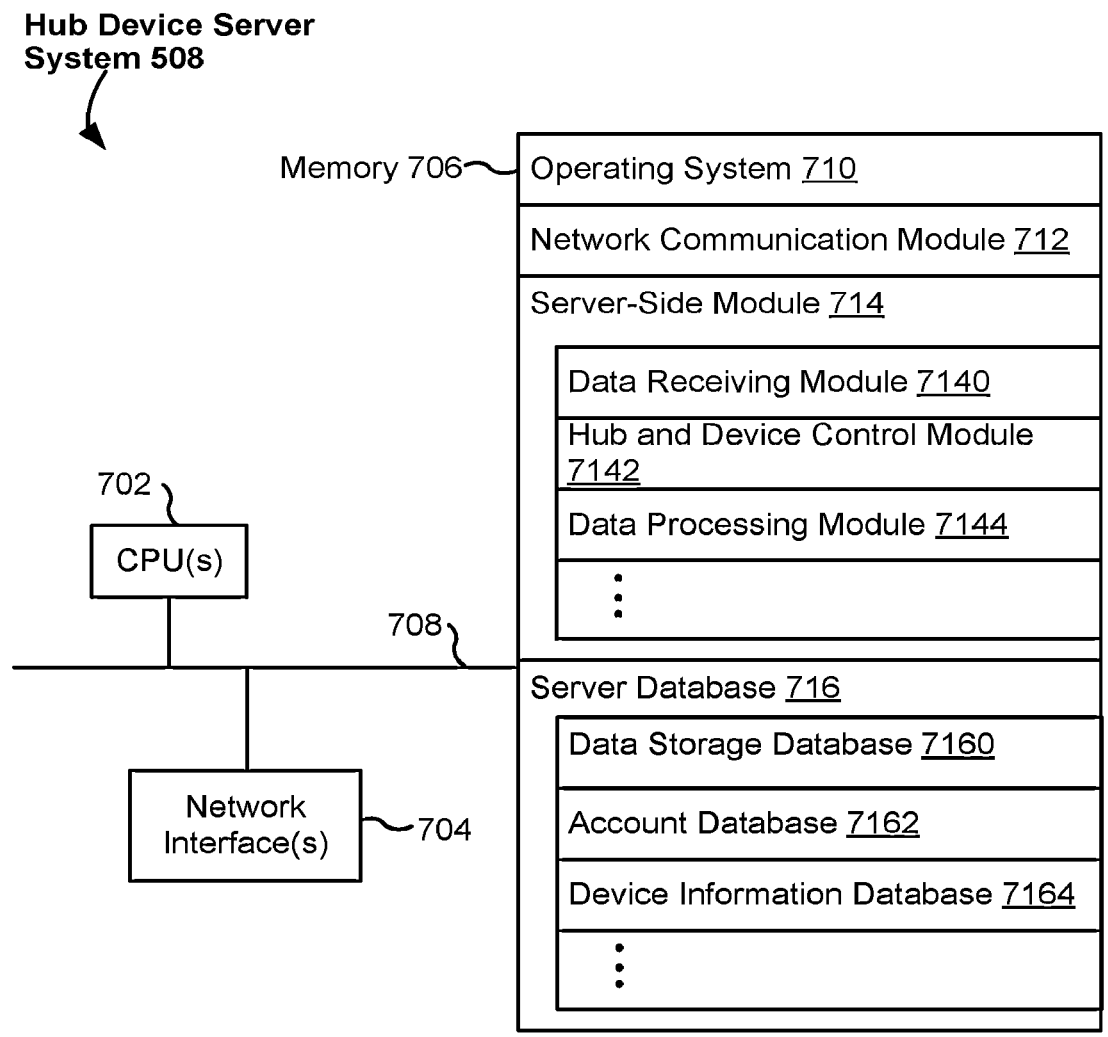
FIG. 7A is a block diagram illustrating a representative hub device server system, in accordance with some implementations.

FIG. 7A is a block diagram illustrating the hub device server system 508 in accordance with some implementations. The hub device server system 508, typically, includes one or more processing units (CPUs) 702, one or more network interfaces 704 (e.g., including an I/O interface to one or more client devices and an I/O interface to one or more electronic devices), memory 706, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

- Operating system 710 including procedures for handling various basic system services and for performing hardware dependent tasks;
- Network communication module 712 for connecting the hub device server system 508 to other systems and devices (e.g., client devices, electronic devices, and systems connected to one or more networks 162, FIGS. 1-5B) via one or more network interfaces 704 (wired or wireless);
- Server-side module 714, which provides server-side functionalities for device control, data processing and data review, including but not limited to:
  - Data receiving module 7140 for receiving data from electronic devices (e.g., video data from a camera 118, FIG. 1) via the hub device 180, and preparing the received data for further processing and storage in the data storage database 7160;
  - Hub and device control module 7142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;
  - Data processing module 7144 for processing the data provided by the electronic devices, and/or preparing and sending processed data to a device for review (e.g., client devices 504 for review by a user); and
- Server database 716, including but not limited to:
  - Data storage database 7160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the hub device 180 or smart devices are stored securely;
  - Account database 7162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles; and
  - Device Information Database 7164 for storing device information related to one or more hub devices, e.g., device identifiers and hub device specific secrets, independently of whether the corresponding hub devices have been associated with any user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 7B:
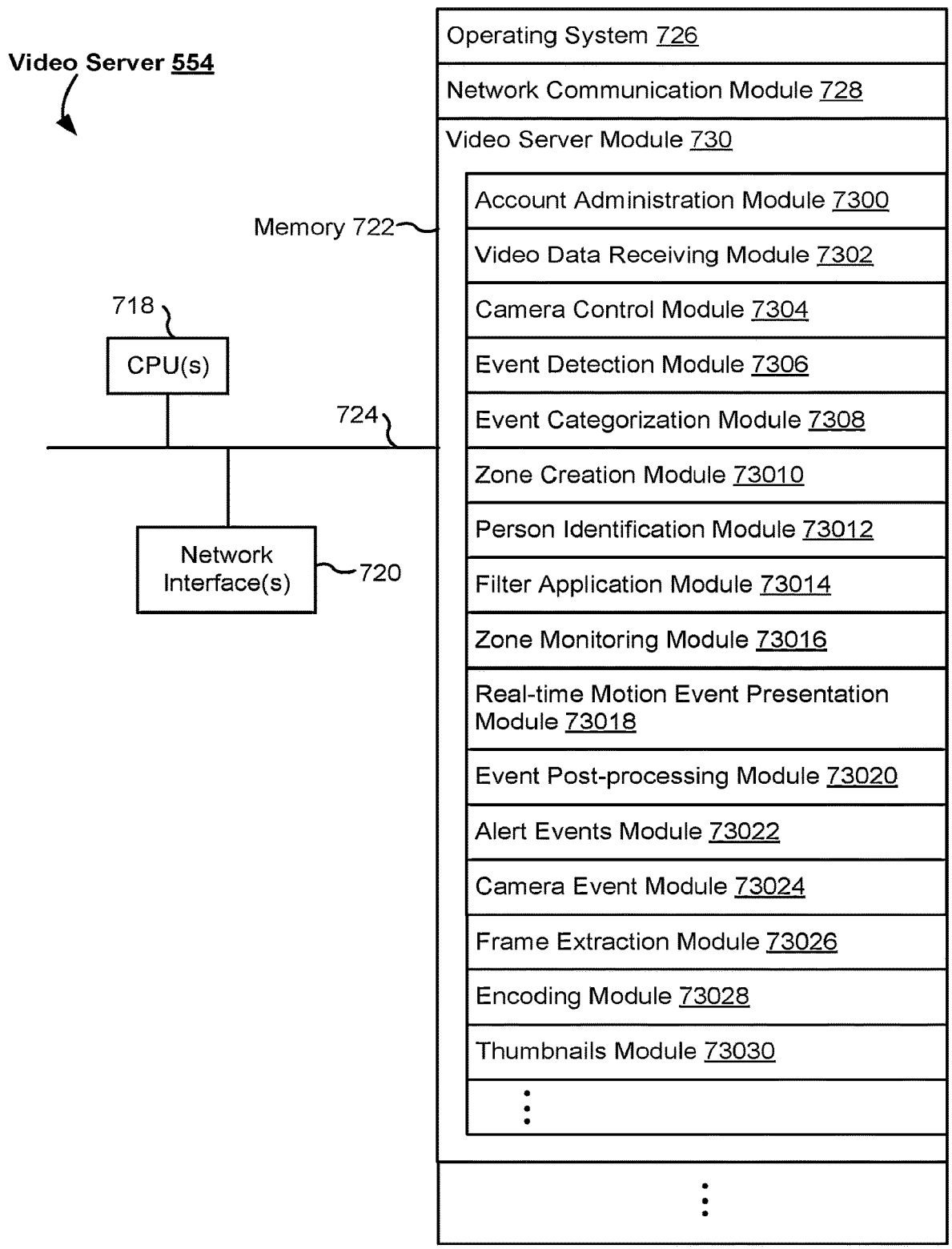
FIGS. 7B-7C are block diagrams illustrating a representative video server system, in accordance with some implementations.
Figure 7C:
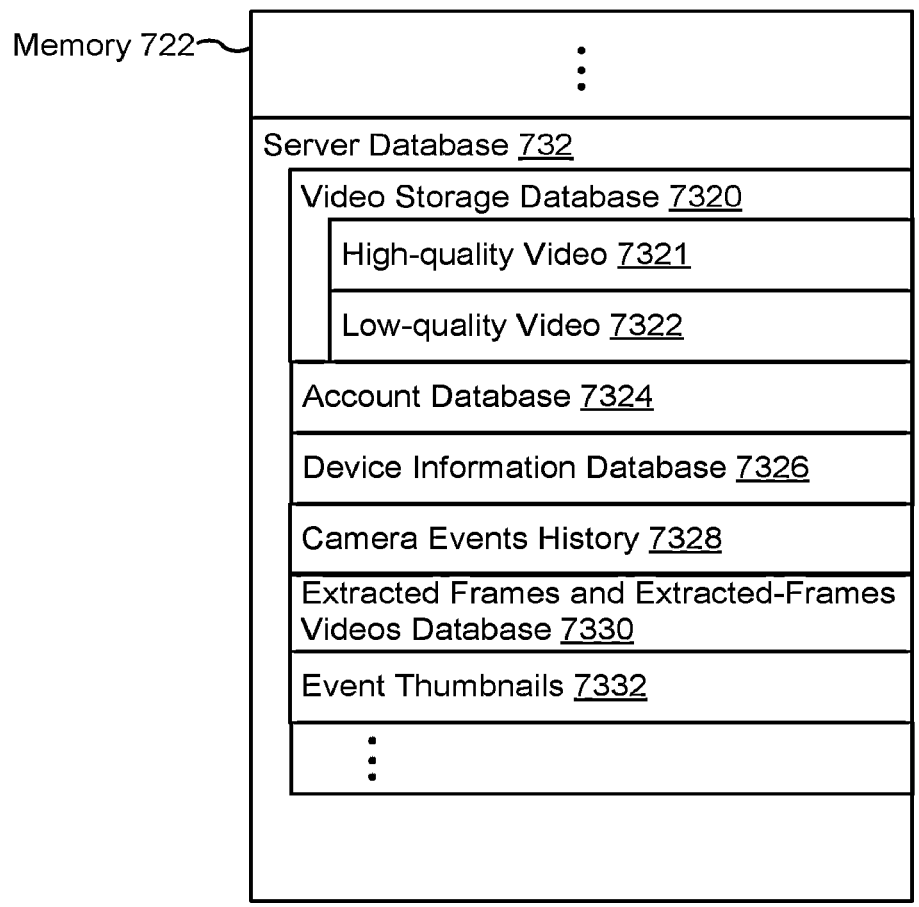

FIGS. 7B-7C are block diagrams illustrating the video server 554 in accordance with some implementations. The video server 554, typically, includes one or more processing units (CPUs) 718, one or more network interfaces 720, memory 722, and one or more communication buses 724 for interconnecting these components (sometimes called a chipset). Memory 722 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 722, optionally, includes one or more storage devices remotely located from one or more processing units 718. Memory 722, or alternatively the non-volatile memory within memory 722, includes a non-transitory computer readable storage medium. In some implementations, memory 722, or the non-transitory computer readable storage medium of memory 722, stores the following programs, modules, and data structures, or a subset or superset thereof:

- Operating system 726 including procedures for handling various basic system services and for performing hardware dependent tasks;
- Network communication module 728 for connecting the video server 554 to other systems and devices (e.g., client devices, electronic devices, and systems connected to one or more networks 162, FIGS. 1-5B) via one or more network interfaces 720 (wired or wireless);
- Video server module 730, which provides server-side data processing and functionalities for video and event monitoring and review, including but not limited to:
  - Account administration module 7300 for creating reviewer accounts, performing camera registration processing to establish associations between video sources to their respective reviewer accounts, and providing account login-services to the client devices 504;
  - Video data receiving module 7302 for receiving raw video data from the video sources 522, and preparing the received video data for event processing and long-term storage in the video storage database 514;

Camera control module 7304 for generating and sending server-initiated control commands to modify the operation modes of the video sources, and/or receiving and forwarding user-initiated control commands to modify the operation modes of the video sources 522;

Event detection module 7306 for detecting motion event candidates in video streams from each of the video sources 522, including motion track identification, false positive suppression, and event mask generation and caching;

Event categorization module 7308 for categorizing motion events detected in received video streams;

Zone creation module 73010 for generating zones of interest in accordance with user input;

Person identification module 73012 for identifying characteristics associated with presence of humans in the received video streams;

Filter application module 73014 for selecting event filters (e.g., event categories, zones of interest, a human filter, etc.) and applying the selected event filter to past and new motion events detected in the video streams;

Zone monitoring module 73016 for monitoring motions within selected zones of interest and generating notifications for new motion events detected within the selected zones of interest, where the zone monitoring takes into account changes in surrounding context of the zones and is not confined within the selected zones of interest;

Real-time motion event presentation module 73018 for dynamically changing characteristics of event indicators displayed in user interfaces as new event filters, such as new event categories or new zones of interest, are created, and for providing real-time notifications as new motion events are detected in the video streams; and Event post-processing module 3020 for providing summary time-lapse for past motion events detected in video streams, and providing event and category editing functions to user for revising past event categorization results;

Alert events module 73022 for receiving information on alert events (e.g., detected hazards, detected sounds, etc.), instructing cameras 118 to capture video in accordance with alert event information, and determining chronologies of alert events;

Camera events module 73024 for associating captured video with alert events, from the same smart home environment 100, that are proximate or contemporaneous in time, and logging camera histories of camera events;

Frame extraction module 73026 for extracting frames from raw video data from the video sources 522;

Encoding module 73028 for encoding extracted-frames video using frames extracted by the frame extraction module 73026; and Thumbnails module 73030 for selecting frames for and generating thumbnails for respective portions of video corresponding to events or alerts; and Server database 732, including but not limited to:

Video storage database 7320 storing raw video data associated with each of the video sources 522 (each including one or more cameras 118) of each reviewer account, as well as event categorization models (e.g., event clusters, categorization criteria, etc.), event categorization results (e.g., recognized event categories, and assignment of past motion events to the recognized event categories, representative events for each recognized event category, etc.), event masks for past motion events, video segments for each past motion event, preview video (e.g., sprites) of past motion events, and other relevant metadata (e.g., names of event categories, location of the cameras 118, creation time, duration, etc.) associated with the motion events;

Account database 7324 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;

Device Information Database 7326 for storing device information related to one or more hub devices, e.g., device identifiers and hub device specific secrets, independently of whether the corresponding hub devices have been associated with any user account;

Camera events history 7328 for storing per-camera histories of camera events, including alert events, chronologies of alert events, and references to associated videos in the video storage database 7320;

Extracted frames and extracted-frames videos database 7330 for storing frames extracted from videos received from cameras 118 (e.g., extracted from high quality videos 7321) and for storing extracted-frames video generated by encoding module 73028 by encoding (e.g., in H.264 encoding format) series of extracted frames; and Event thumbnails 7332 for storing thumbnails representative of portions of videos corresponding to events or alerts.

Video data stored in the video storage database 7320 includes high-quality versions 7321 and low-quality versions 7322 of videos associated with each of the video sources 522. High-quality video 7321 includes video in relatively high resolutions (e.g., 720 P and/or 1080 P) and relatively high frame rates (e.g., 24 frames per second). Low-quality video 7322 includes video in relatively low resolutions (e.g., 180 P) and relatively low frame rates (e.g., 5 frames per second, 10 frames per second).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 722, optionally, stores a subset of the modules and data structures identified above. Furthermore, memory 722, optionally, stores additional modules and data structures not described above.

Figure 7D:
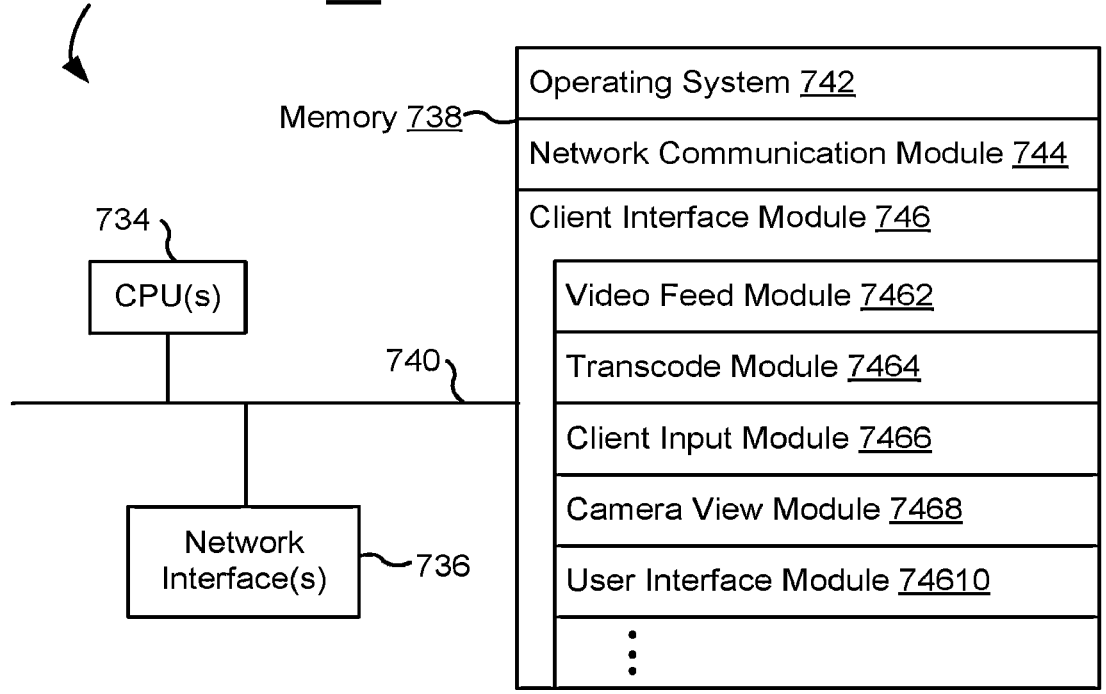
FIG. 7D is a block diagram illustrating a representative client interface server, in accordance with some implementations.

FIG. 7D is a block diagram illustrating the client interface server 556 in accordance with some implementations. The client interface server 556, typically, includes one or more processing units (CPUs) 734, one or more network interfaces 736, memory 738, and one or more communication buses 740 for interconnecting these components (sometimes called a chipset). Memory 738 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 738, optionally, includes one or more storage devices remotely located from one or more processing units 734. Memory 738, or alternatively the non-volatile memory within memory 738, includes a non-transitory computer readable storage medium. In some implementations, memory 738, or the non-transitory computer readable storage medium of memory 738, stores the following programs, modules, and data structures, or a subset or superset thereof:

Operating system 742 including procedures for handling various basic system services and for performing hardware dependent tasks;

Network communication module 744 for connecting the client interface server 556 to other systems and devices (e.g., client devices, video server 554, and systems connected to one or more networks 162, FIGS. 1-5B) via one or more network interfaces 740 (wired or wireless);

Client interface module 746, which provides an I/O interface between client devices 504 and the video server 554, including but not limited to:

Video feed module 7462 for transmitting videos from the video server system, or images extracted from same videos, to client devices as video streams or periodically refreshed images, and optionally transmitting particular views of videos or images from videos;

(Transcode module 7464 for rescaling (e.g., downscaling from 720 P to 180 P) video for transmission to client devices 504;

Client input module 7466 for receiving and processing input commands from client devices (e.g., client device 504) 504 to change the video view being transmitted or controlling a video source 522;

Camera view module 7468 for determining which views of videos or images from videos are to be transmitted to client devices; and User interface module 74610 for generating user interfaces (e.g., web pages), transmitted to client devices 504, for viewing video feeds and corresponding event histories.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 738, optionally, stores a subset of the modules and data structures identified above. Furthermore, memory 738, optionally, stores additional modules and data structures not described above.

Figure 7E:
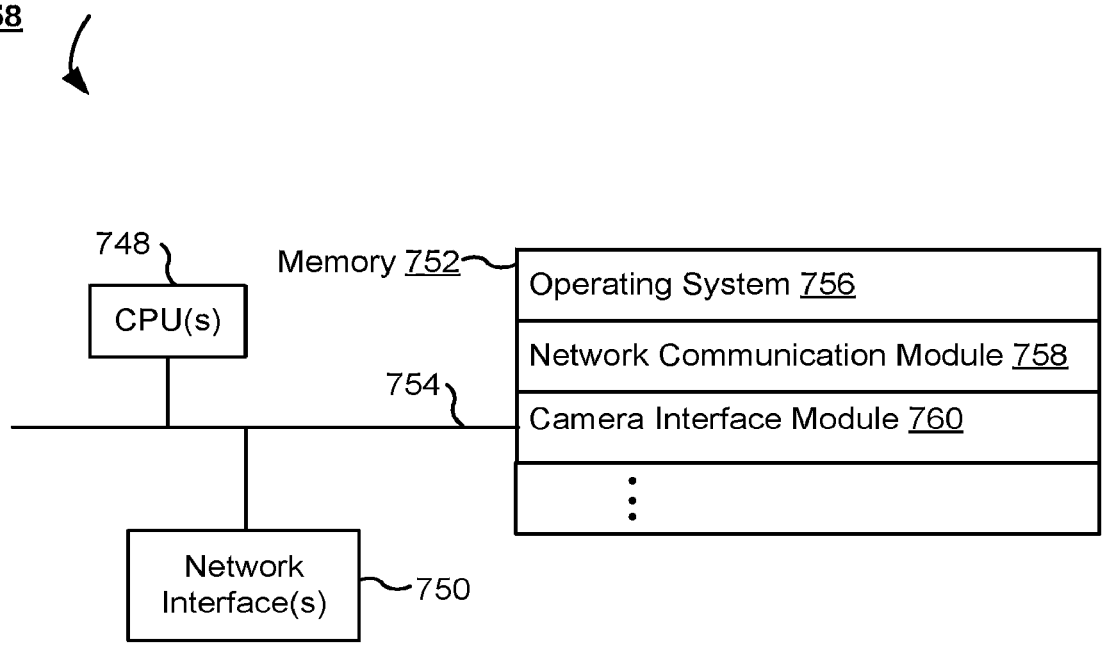
FIG. 7E is a block diagram illustrating a representative camera interface server, in accordance with some implementations.

FIG. 7E is a block diagram illustrating the camera interface server 558 in accordance with some implementations. The camera interface server 558, typically, includes one or more processing units (CPUs) 748, one or more network interfaces 750, memory 752, and one or more communication buses 754 for interconnecting these components (sometimes called a chipset). Memory 752 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 752, optionally, includes one or more storage devices remotely located from one or more processing units 748. Memory 752, or alternatively the non-volatile memory within memory 752, includes a non-transitory computer readable storage medium. In some implementations, memory 752, or the non-transitory computer readable storage medium of memory 752, stores the following programs, modules, and data structures, or a subset or superset thereof:

Operating system 756 including procedures for handling various basic system services and for performing hardware dependent tasks;

Network communication module 758 for connecting the camera interface server 558 to other systems and devices (e.g., client devices, video server 554, and systems connected to one or more networks 162, Figures I-5B) via one or more network interfaces 754 (wired or wireless); and Camera interface module 760 for providing an I/O interface between video sources 522 and the video server 554.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 752, optionally, stores a subset of the modules and data structures identified above. Furthermore, memory 752, optionally, stores additional modules and data structures not described above.

In some implementations, at least some of the functions of the video server 554, client interface server 556, and camera interface server 558 are performed by the hub device server system 508, and the corresponding modules and sub-modules of these functions may be included in the hub device server system 508. In some implementations, at least some of the functions of the hub device server system 508 are performed by the video server 554, client interface server 556, and/or camera interface server 558, and the corresponding modules and sub-modules of these functions may be included in the video server 554, client interface server 556, and/or camera interface server 558.

Figure 8A:
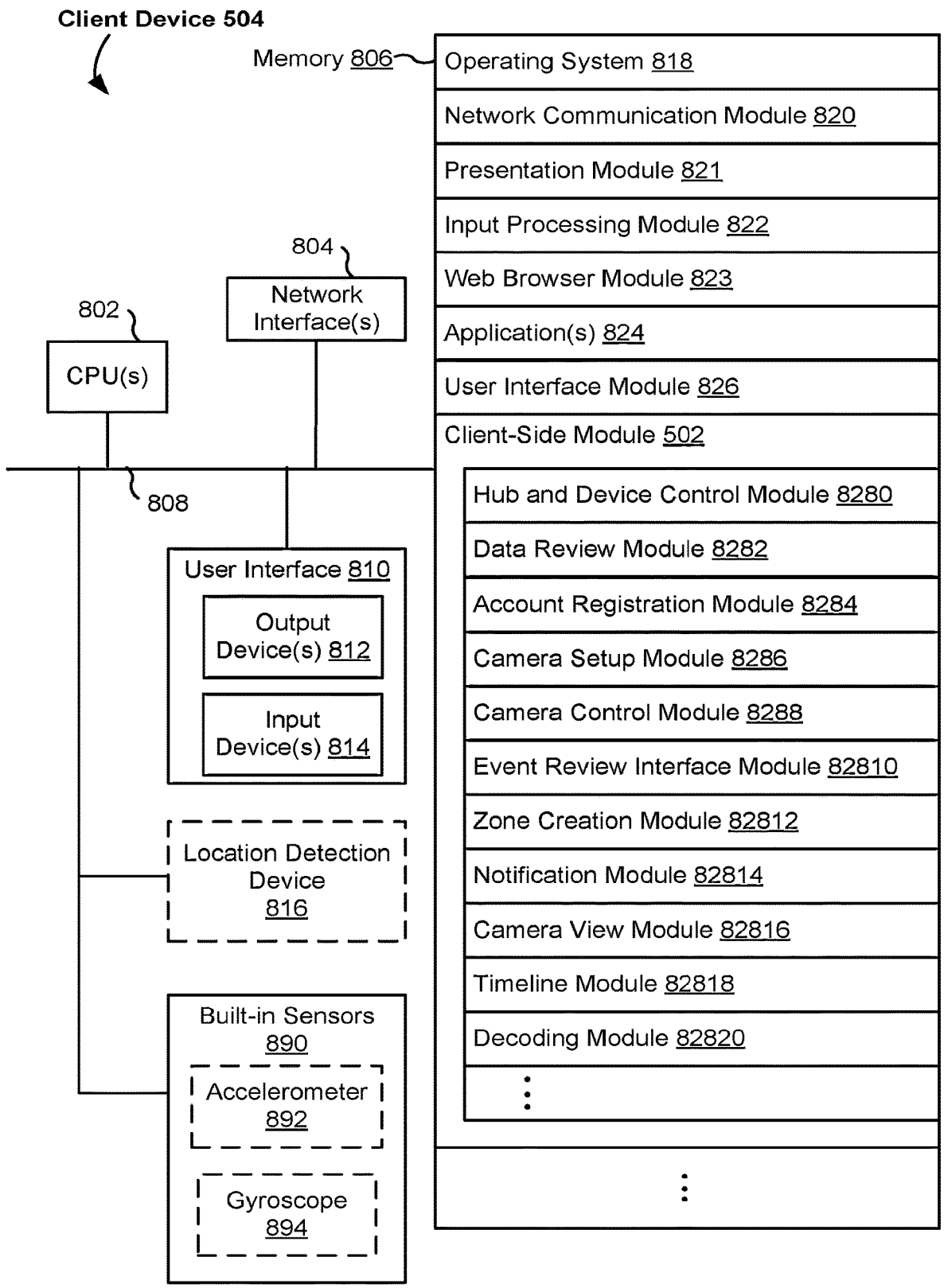
FIG. 8A-8B are block diagrams illustrating a representative client device associated with a user account, in accordance with some implementations.
Figure 8B:
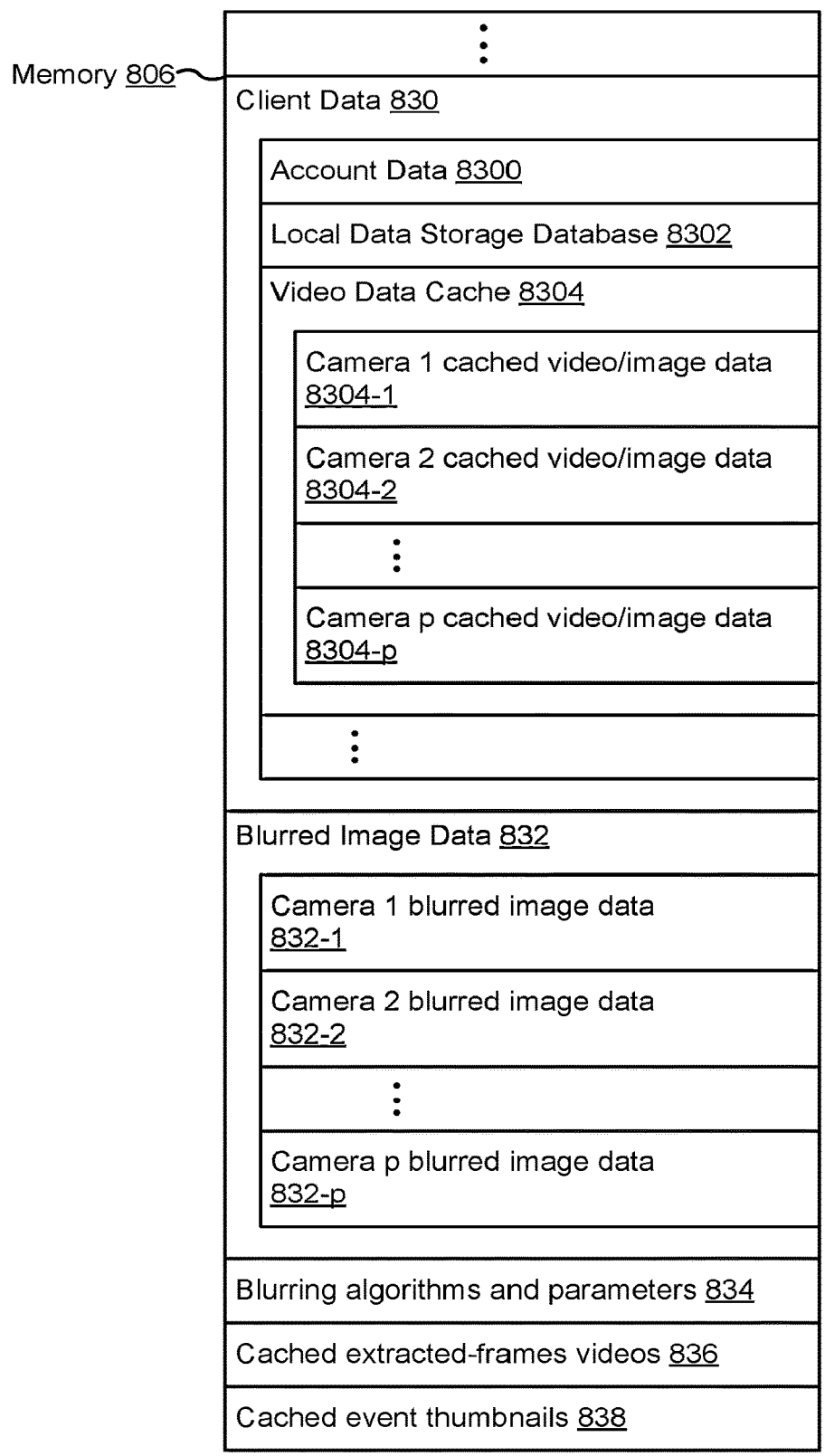

FIGS. 8A-8B are block diagrams illustrating a representative client device 504 associated with a user (e.g., reviewer) account in accordance with some implementations. The client device 504, typically, includes one or more processing units (CPUs) 802, one or more network interfaces 804, memory 806, and one or more communication buses 808 for interconnecting these components (sometimes called a chipset). The client device also includes a user interface 810 and one or more built-in sensors 890 (e.g., accelerometer 892 and gyroscope 894). User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls.

Furthermore, the client device 504 optionally uses a microphone and voice recognition or a camera and gesture recognition to supplement or replace the keyboard. Further, the client device 504 optionally uses the accelerometer to detect changes in the orientation of the client device 504, and in particular applications and contexts interpret the change in orientation detected by the accelerometer as user input. In some implementations, the client device 504 includes one or more cameras, scanners, or photo sensor units for capturing images (not shown). In some implementations, the client device 504 optionally includes a location detection device 816, such as a GPS (global positioning satellite) or other geo-location receiver, for determining the location of the client device 504.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

- Operating system 818 including procedures for handling various basic system services and for performing hardware dependent tasks;
- Network communication module 820 for connecting the client device 504 to other systems and devices (e.g., hub device server system 508, video server system 552, video sources 522) connected to one or more networks 162 via one or more network interfaces 804 (wired or wireless);
- Presentation module 821 for enabling presentation of information (e.g., user interfaces for application(s) 824 and web browser module 823 or the client-side module 502, widgets, websites and web pages thereof, and/or games, audio and/or video content, text, etc.) at the client device 504 via the one or more output devices 812 (e.g., displays, speakers, etc.) associated with the user interface 810;
- Input processing module 822 for detecting one or more user inputs or interactions from one of the one or more input devices 814 and optionally the accelerometer 892 and interpreting the detected input or interaction;
- Web browser module 823 for navigating, requesting (e.g., via HTTP), and displaying websites and web pages thereof, including a web interface for logging into a reviewer account, controlling the video sources associated with the reviewer account, establishing and selecting event filters, and editing and reviewing motion events detected in the video streams of the video sources;
- One or more applications 824 for execution by the client device 504 (e.g., games, social network applications, smart home applications, and/or other web or non-web based applications), for controlling devices (e.g., sending commands, configuring settings, etc. to hub devices and/or other client or electronic devices), and for reviewing data captured by the devices (e.g., device status and settings, captured data, or other information regarding the hub device or other connected devices);
- User interface module 826 for providing and displaying a user interface in which settings, captured data, and/or other data for one or more devices (e.g., smart devices 204 in smart home environment 100) can be configured and/or viewed;
- Client-side module 502, which provides client-side data processing and functionalities for device control, data processing, data review, and monitoring and reviewing videos from one or more video sources and camera events, including but not limited to:
  - Hub device and device control module 8280 for generating control commands for modifying an operating mode of the hub device or the electronic devices in accordance with user inputs; and
  - Data review module 8282 for providing user interfaces for reviewing data processed by the hub device server system 508 or video server system 552;
  - Account registration module 8284 for establishing a reviewer account and registering one or more video sources with the hub device server system 508 or video server system 552;
  - Camera setup module 8286 for setting up one or more video sources within a local area network, and enabling the one or more video sources to access the hub device server system 508 or video server system 552 on the Internet through the local area network;
  - Camera control module 8288 for generating control commands for modifying an operating mode of the one or more video sources in accordance with user input;
  - Event review interface module 82810 for providing user interfaces for reviewing event timelines, camera histories with camera events, editing event categorization results, selecting event filters, presenting real-time filtered motion events based on existing and newly created event filters (e.g., event categories, zones of interest, a human filter, etc.), presenting real-time notifications (e.g., pop-ups) for newly detected motion events, and presenting smart time-lapse of selected motion events;
  - Zone creation module 82814 for providing a user interface for creating zones of interest for each video stream in accordance with user input, and sending the definitions of the zones of interest to the hub device server system 508 or video server system 552;
  - Notification module 82814 for generating real-time notifications for all or selected alert events or motion events on the client device 504 outside of the event review user interface;
  - Camera view module 82816 for generating control commands for modifying a view of a video transmitted to the client device 504 in accordance with user input;
  - Timeline module 82818 for presenting information corresponding to video transmitted to the client device 504 in a timeline format, facilitating user manipulation of the information displayed in timeline format, and facilitating manipulation of display of the video in accordance with user manipulation of the information, including requesting additional video from the hub device server system 508 or video server system 552 in accordance with the user manipulation; and
  - Decoding module 82820 for decoding extracted-frames video;

Client data 830 storing data associated with the user account, electronic devices, and video sources 522, including, but is not limited to:

Account data 8300 storing information related to both user accounts loaded on the client device 504 and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.;

Local data storage database 8302 for selectively storing raw or processed data associated with electronic devices (e.g., of the video sources 522, such as a camera 118); and Video data cache 8304 for caching video and image data from video feeds;

Blurred image data 832;

Blurring algorithms and parameters 834, for generating blurred image data 832 from video/image data in video data cache 8304;

Cached extracted-frames videos 836 for storing or caching extracted-frames videos received from the video server 554; and Cached event thumbnails 838 for storing or caching event thumbnails received from the video server 554.

Video data cache 8304 includes cached video/image data for respective cameras associated with a user of the client device 804. For example, as shown in FIG. 8B, the video data cache 8304 includes cached video/image data 8304-1 for a first camera, cached video/image data 8304-2 for a second camera, up to cached video/image data 8304-p for a p-th camera. At a given moment, video data cache 8304 may not have cached video/image data for a given camera (e.g., due to the camera being newly associated with the user, due to the cache being cleared, due to the cached video/image data being expired and removed from the cache).

Blurred image data 832 includes sets of progressively blurred images for respective cameras. For example, as shown in FIG. 8B, the blurred image data 832 includes blurred image data (e.g., a set of progressively blurred images) 832-1 for the first camera, blurred image data 832-2 for the second camera, up to blurred image data 832-p for the p-th camera.

In some implementations, the client device 504 caches camera history as well as video data 8304. For example, whenever the client device 504 receives camera events history 7328 data from the video server 554, the most recent camera events history (e.g., history from the past two hours, the most recent 20 events) is cached at the client device (e.g., in client data 830). This cached history data may be accessed for quick display of camera history information.

In some implementations, the client-side module 502 and user interface module 826 are parts, modules, or components of a particular application 824 (e.g., a smart home management application).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

In some implementations, at least some of the functions of the hub device server system 508 or the video server system 552 are performed by the client device 504, and the corresponding sub-modules of these functions may be located within the client device 504 rather than the hub device server system 508 or video server system 552. In some implementations, at least some of the functions of the client device 504 are performed by the hub device server system 508 or video server system 552, and the corresponding sub-modules of these functions may be located within the hub device server system 508 or video server system 552 rather than the client device 504. The client device 504 and the hub device server system 508 or video server system 552 shown in FIGS. 7A-8, respectively, are merely illustrative, and different configurations of the modules for implementing the functions described herein are possible in various implementations.

Figure 9A:
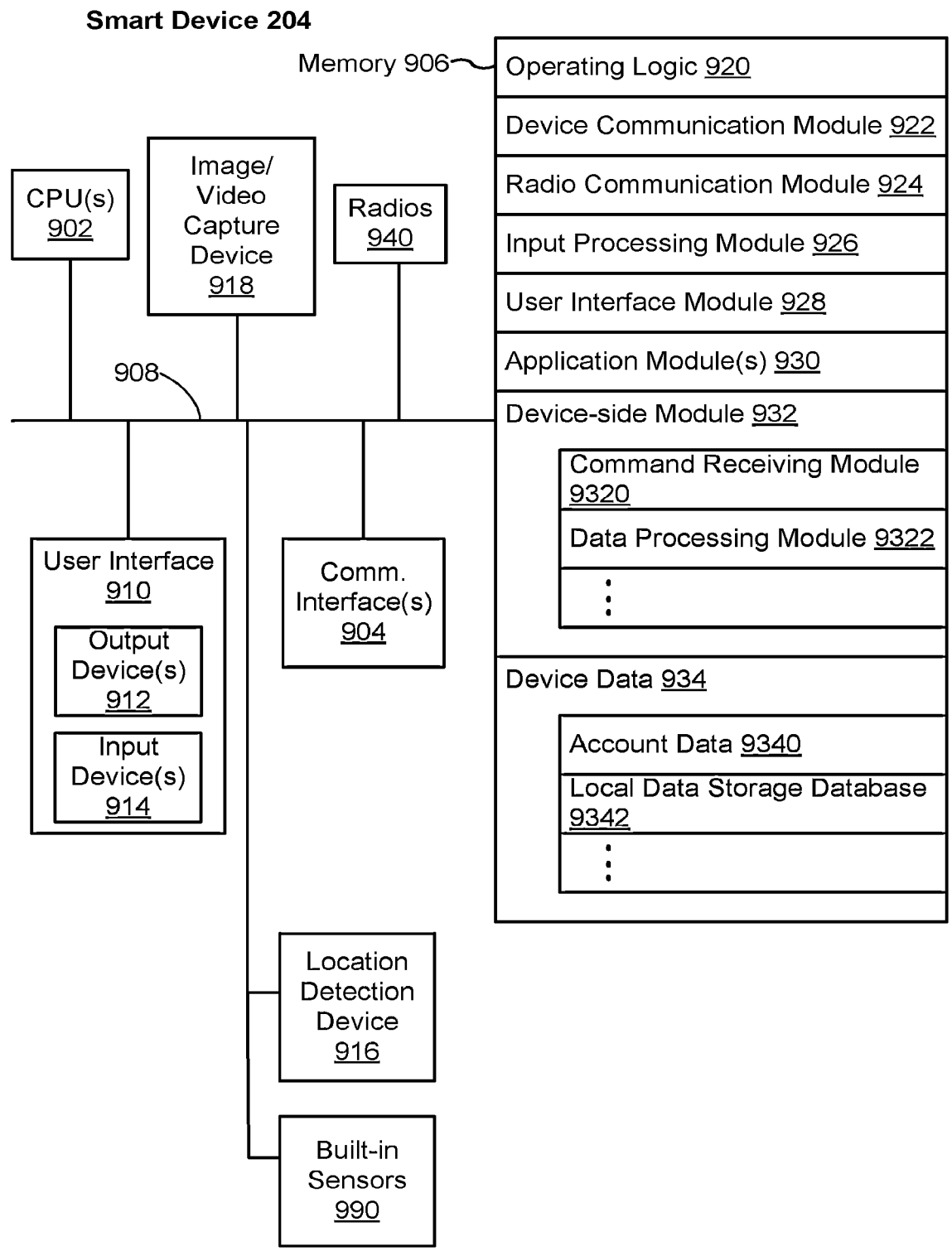
FIG. 9A is a block diagram illustrating a representative smart device, in accordance with some implementations.

FIG. 9A is a block diagram illustrating a representative smart device 204 in accordance with some implementations. In some implementations, the smart device 204 (e.g., any devices of a smart home environment 100, FIGS. 1 and 2) includes one or more processing units (e.g., CPUs, ASICS, FPGAs, microprocessors, and the like) 902, one or more communication interfaces 904, memory 906, radios 940, and one or more communication buses 908 for interconnecting these components (sometimes called a chipset). In some implementations, user interface 910 includes one or more output devices 912 that enable presentation of media content, including one or more speakers and/or one or more visual displays. In some implementations, user interface 910 also includes one or more input devices 914, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 918 (e.g., cameras, video cameras, scanners, photo sensor units). Optionally, the client device includes a location detection device 916, such as a GPS (global positioning satellite) or other geo-location receiver, for determining the location of the smart device 204.

The built-in sensors 990 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 940 enable one or more radio communication networks in the smart home environments, and allow a smart device 204 to communicate with other devices. In some implementations, the radios 940 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 904 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

- Operating logic 920 including procedures for handling various basic system services and for performing hardware dependent tasks;
- Device communication module 922 for connecting to and communicating with other network devices (e.g., network interface 160, such as a router that provides Internet connectivity, networked storage devices, network routing devices, server system 508, etc.) connected to one or more networks 162 via one or more communication interfaces 904 (wired or wireless);
- Radio Communication Module 924 for connecting the smart device 204 to other devices (e.g., controller devices, smart devices 204 in smart home environment 100, client devices 504) via one or more radio communication devices (e.g., radios 940)
- Input processing module 926 for detecting one or more user inputs or interactions from the one or more input devices 914 and interpreting the detected inputs or interactions;
- User interface module 928 for providing and displaying a user interface in which settings, captured data, and/or other data for one or more devices (e.g., the smart device 204, and/or other devices in smart home environment 100) can be configured and/or viewed;
- One or more applications 930 for execution by the smart device 930 (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);
- Device-side module 932, which provides device-side functionalities for device control, data processing and data review, including but not limited to:
  - Command receiving module 9320 for receiving, forwarding, and/or executing instructions and control commands (e.g., from a client device 504, from a smart home provider server system 164, from user inputs detected on the user interface 910, etc.) for operating the smart device 204;
  - Data processing module 9322 for processing data captured or received by one or more inputs (e.g., input devices 914, image/video capture devices 918, location detection device 916), sensors (e.g., built-in sensors 990), interfaces (e.g., communication interfaces 904, radios 940), and/or other components of the smart device 204, and for preparing and sending processed data to a device for review (e.g., client devices 504 for review by a user); and
- Device data 934 storing data associated with devices (e.g., the smart device 204), including, but is not limited to:
  - Account data 9340 storing information related to user accounts loaded on the smart device 204, wherein such information includes cached login credentials, smart device identifiers (e.g., MAC addresses and UUIDs), user interface settings, display preferences, authentication tokens and tags, password keys, etc.; and
  - Local data storage database 9342 for selectively storing raw or processed data associated with the smart device 204 (e.g., video surveillance footage captured by a camera 118).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above.

Figure 9B:
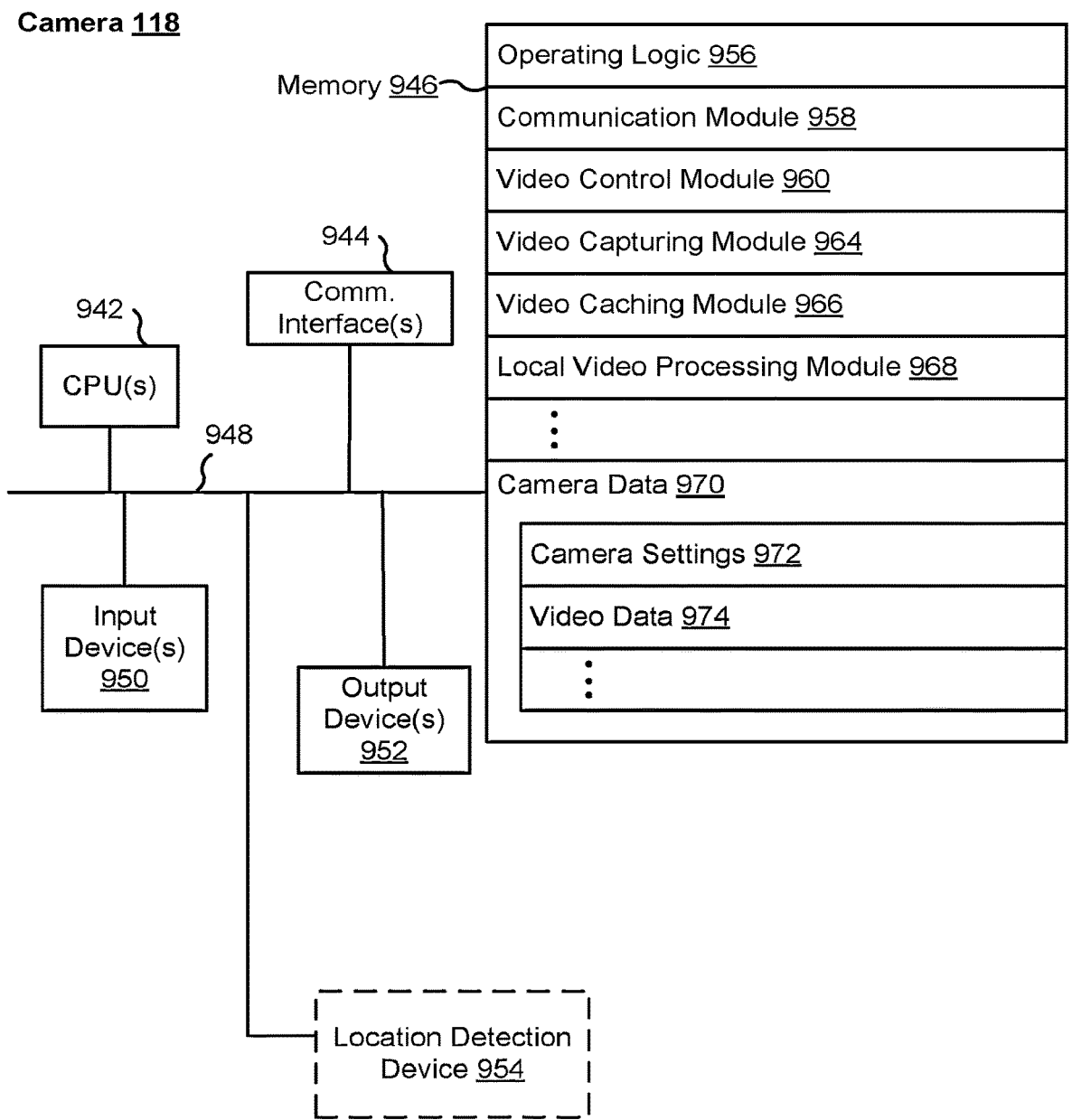
FIG. 9B is a block diagram illustrating a representative video capturing device (e.g., a camera) in accordance with some implementations.

FIG. 9B is a block diagram illustrating a representative camera 118 in accordance with some implementations. In some implementations, the camera 118 includes one or more processing units (e.g., CPUs, ASICs, FPGAs, microprocessors, and the like) 942, one or more communication interfaces 944, memory 946, and one or more communication buses 948 for interconnecting these components (sometimes called a chipset). In some implementations, the camera 118 includes one or more input devices 950 such as one or more buttons for receiving input and one or more microphones. In some implementations, the camera 118 includes one or more output devices 952 such as one or more indicator lights, a sound card, a speaker, a small display for displaying textual information and error codes, playing audio, etc. In some implementations, the camera 118 optionally includes a location detection device 954, such as a GPS (global positioning satellite) or other geo-location receiver, for determining the location of the camera 118.

Communication interfaces 944 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 946 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 946, or alternatively the non-volatile memory within memory 946, includes a non-transitory computer readable storage medium. In some implementations, memory 946, or the non-transitory computer readable storage medium of memory 946, stores the following programs, modules, and data structures, or a subset or superset thereof:

Operating system 956 including procedures for handling various basic system services and for performing hardware dependent tasks;

Network communication module 958 for connecting the camera 118 to other computing devices (e.g., hub device server system 508, video server system 552, the client device 504, network routing devices, one or more controller devices, and networked storage devices) connected to the one or more networks 162 via the one or more communication interfaces 944 (wired or wireless);

Video control module 960 for modifying the operation mode (e.g., zoom level, resolution, frame rate, recording and playback volume, lighting adjustment, AE and IR modes, etc.) of the camera 118, enabling/disabling the audio and/or video recording functions of the camera 118, changing the pan and tilt angles of the camera 118, resetting the camera 118, and/or the like;

Video capturing module 964 for capturing and generating a video stream and sending the video stream to the hub device server system 508 or video server system 552 as a continuous feed or in short bursts, and optionally generating a rescaled version of the video stream and sending the video stream at the original captured resolution and the rescaled resolution;

Video caching module 966 for storing some or all captured video data locally at one or more local storage devices (e.g., memory, flash drives, internal hard disks, portable disks, etc.);

Local video processing module 968 for performing preliminary processing of the captured video data locally at the camera 118, including for example, compressing and encrypting the captured video data for network transmission, preliminary motion event detection, preliminary false positive suppression for motion event detection, preliminary motion vector generation, etc.; and Camera data 970 storing data, including but not limited to:
Camera settings 972, including network settings, camera operation settings, camera storage settings, etc.; and
Video data 974, including video segments and motion vectors for detected motion event candidates to be sent to the hub device server system 508 or video server system 552.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 946, optionally, stores a subset of the modules and data structures identified above. Furthermore, memory 946, optionally, stores additional modules and data structures not described above. Additionally, camera 118, being an example of a smart device 204, optionally includes components and modules included in smart device 204 as shown in FIG. 9A that are not shown in FIG. 9B.

Figure 10:
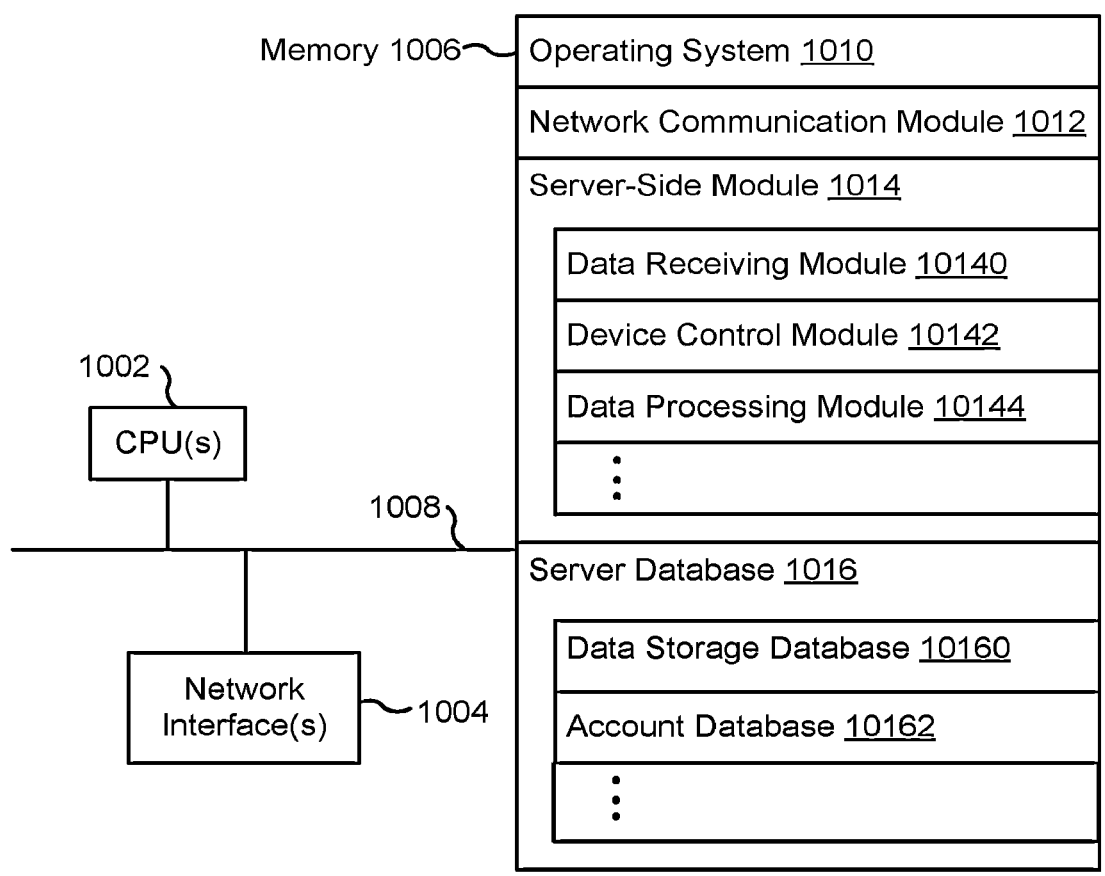
FIG. 10 is a block diagram illustrating a representative smart home provider server system, in accordance with some implementations.

FIG. 10 is a block diagram illustrating the smart home provider server system 164 in accordance with some implementations. The smart home provider server system 164, typically, includes one or more processing units (CPUs) 1002, one or more network interfaces 1004 (e.g., including an I/O interface to one or more client devices and an I/O interface to one or more electronic devices), memory 1006, and one or more communication buses 1008 for interconnecting these components (sometimes called a chipset). Memory 1006 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1006, optionally, includes one or more storage devices remotely located from one or more processing units 1002. Memory 1006, or alternatively the non-volatile memory within memory 1006, includes a non-transitory computer readable storage medium. In some implementations, memory 1006, or the non-transitory computer readable storage medium of memory 1006, stores the following programs, modules, and data structures, or a subset or superset thereof:

Operating system 1010 including procedures for handling various basic system services and for performing hardware dependent tasks;

Network communication module 1012 for connecting the smart home provider server system 164 to other systems and devices (e.g., client devices, electronic devices, hub device server system 508, video server system 552, and systems connected to one or more networks 162, FIGS. 1-5B) via one or more network interfaces 1004 (wired or wireless);

Server-side module 1014, which provides server-side functionalities for device control, data processing and data review, including but not limited to:
Data receiving module 10140 for receiving data from electronic devices (e.g., video data from a camera 118, FIG. 1), and preparing the received data for further processing and storage in the data storage database 10160;
Device control module 10142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;
Data processing module 10144 for processing the data provided by the electronic devices, and/or preparing and sending processed data to a device for review (e.g., client devices 504 for review by a user); and Server database 1016, including but not limited to:
Data storage database 10160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the electronic devices are stored securely; and
Account database 10162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1006, optionally, stores a subset of the modules and data structures identified above. Furthermore, memory 1006, optionally, stores additional modules and data structures not described above.

Furthermore, in some implementations, the functions of any of the devices and systems described herein (e.g., hub device 180, hub device server system 508, video server system 552, client device 504, smart device 204, camera 118, smart home provider server system 164) are interchangeable with one another and may be performed by any other devices or systems, where the corresponding sub-modules of these functions may additionally and/or alternatively be located within and executed by any of the devices and systems. As one example, generating of user interfaces may be performed by the user interface module 74610 (which may be located at the client interface server 556 or at the video server 554) or by the user interface module 826, depending on whether the user is accessing the video feeds and corresponding histories through a web browser 823 or an application 824 (e.g., a dedicated smart home management application) at the client device 504. The devices and systems shown in and described with respect to FIGS. 6-10 are merely illustrative, and different configurations of the modules for implementing the functions described herein are possible in various implementations.

Figure 11A:
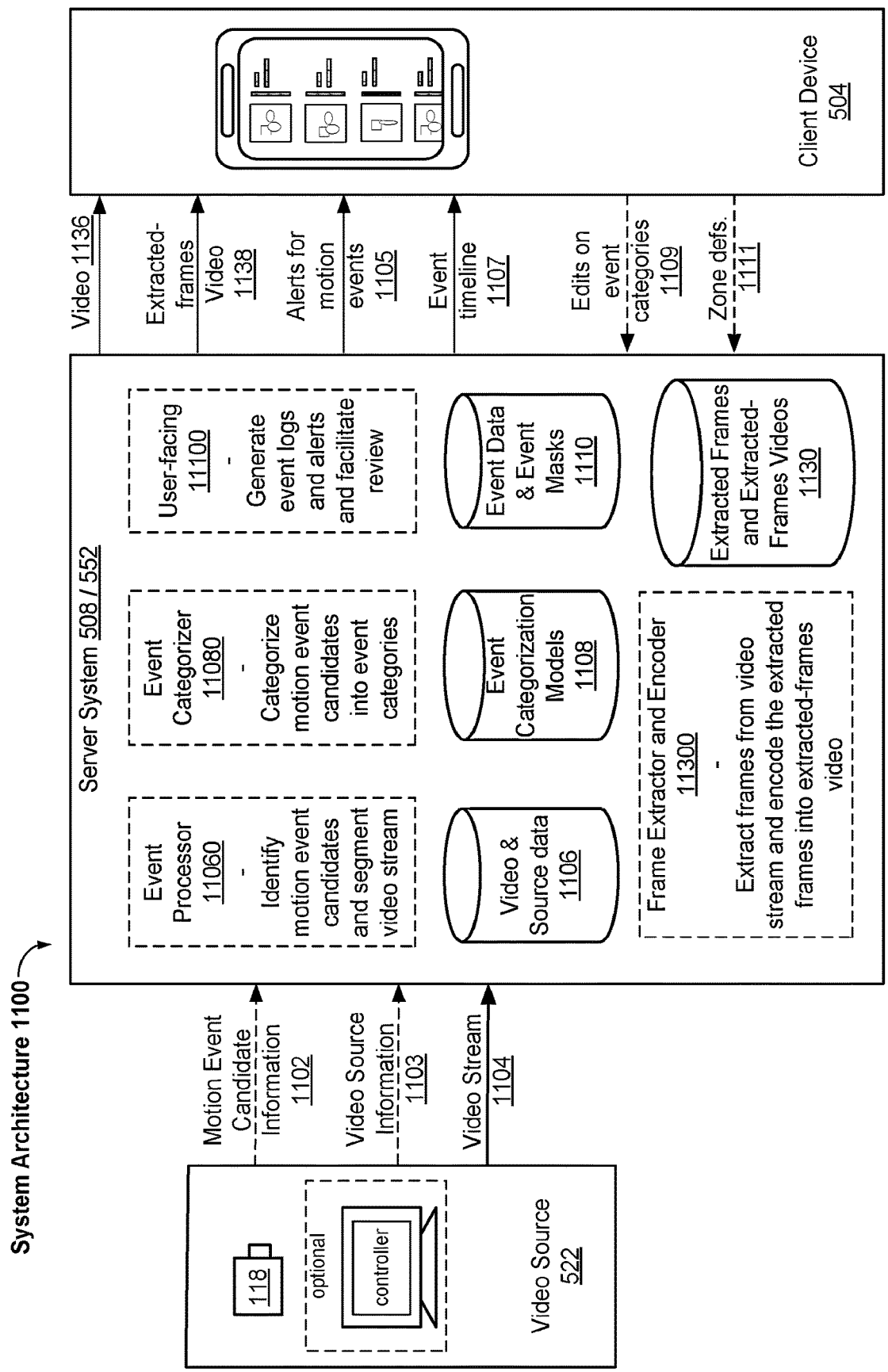
FIG. 11A illustrates a representative system architecture, in accordance with some implementations.
Figure 11B:
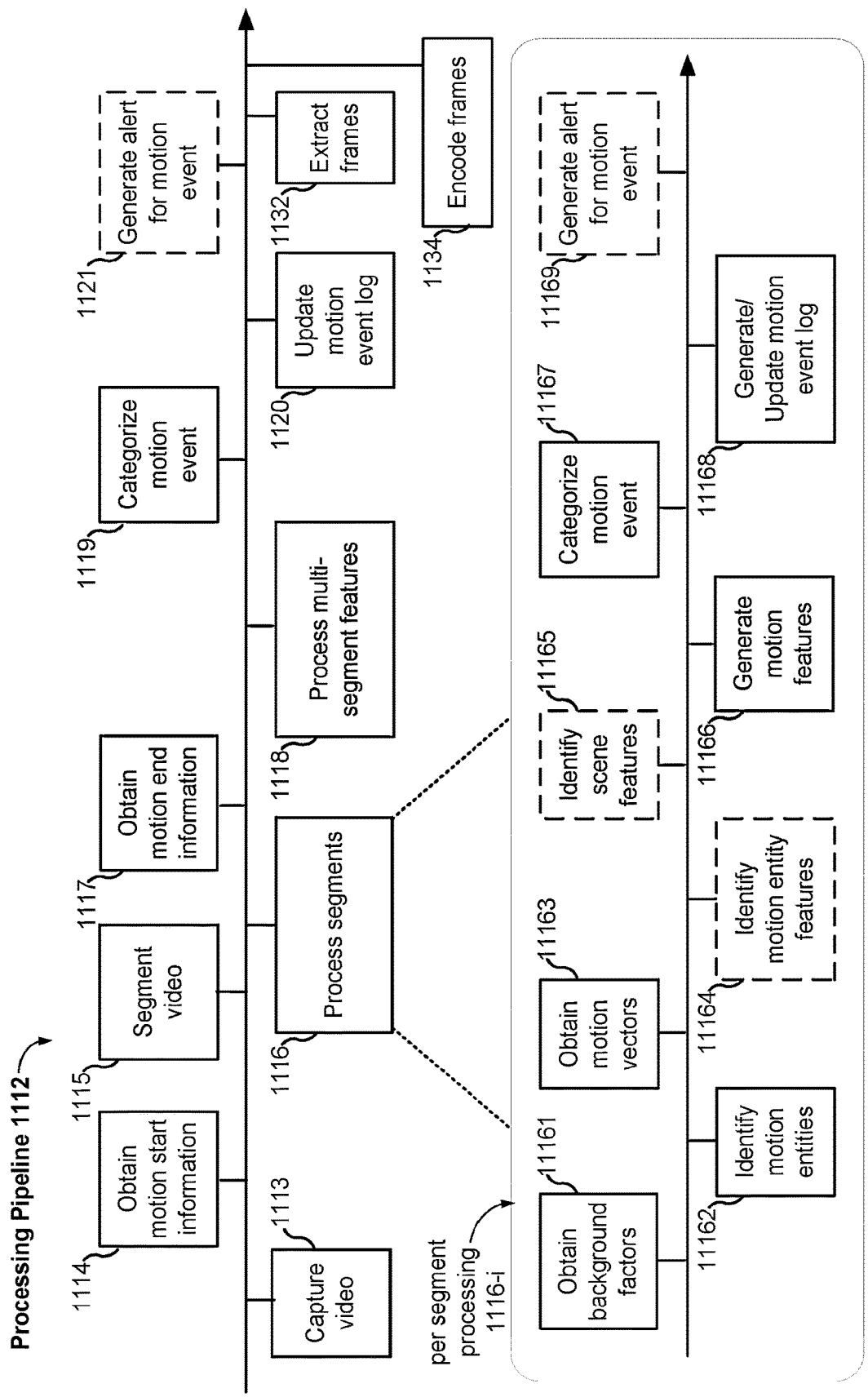
FIG. 11B illustrates a representative processing pipeline, in accordance with some implementations.

FIG. 11A illustrates a representative system architecture 1100 and FIG. 11B illustrates a corresponding data processing pipeline 1112.

In some implementations, the server system 508 or 552 includes functional modules for an event processor 11060, an event categorizer 11080, and a user-facing frontend 11100. The event processor 11060 (e.g., event detection module 7306, FIG. 7B) obtains the motion event candidates (e.g., by processing the video stream or by receiving the motion start information from the video source 522). The event categorizer 11080 (e.g., event categorization module 7308, FIG. 7B) categorizes the motion event candidates into different event categories. The user-facing frontend 11100 (e.g., alert events module 73022, FIG. 7B) generates event alerts and facilitates review of the motion events by a reviewer through a review interface on a client device 504. The client facing frontend also receives user edits on the event categories, user preferences for alerts and event filters, and zone definitions for zones of interest. The event categorizer optionally revises event categorization models and results based on the user edits received by the user-facing frontend. The server system 508/522 also includes a video and source data database 1106, event categorization modules database 1108, and event data and event masks database 1110. In some implementations, each of these databases is part of the server database 732.

In some implementations, the server system 508/552 also includes a frame extractor and encoder 11300. The frame extractor and encoder (e.g., frame extraction module 73026, encoding module 73028; FIG. 7B) extracts frames from raw video (e.g., video stream 1104) and encodes the extracted frames into an extracted-frames video. In some implementations, the frame extractor and encoder 11300 extracts frames at a predefined rate or a lower rate for portions of the video stream without alert events, and extracts frames at a higher rate for portions with alert events (e.g., the portion with the alert event and bracketing portions before and after the portion with the alert event). In some implementations, the overall, average rate at which the frames are extracted is a predefined rate (e.g., 20 frames per 20 minutes, 60 frames per hour, 1 frame per minute). The server system 508/522 also includes an extracted frames and extracted-frames videos 1130 database. In some implementations, extracted frames and extracted-frames videos 1130 are part of the server database 732 (e.g., extracted frames and extracted-frames videos database 7330, FIG. 7C).

The server system 508/522 receives the video stream 1104 from the video source 522 and optionally receives motion event candidate information 1102 such as motion start information and video source information 1103 such as device settings for camera 118. In some implementations, the event processor sub-module 11060 communicates with the video source 522. The server system sends alerts for motion (and other) events 1105 and event timeline information 1107 to the client device 504. The server system 508/522 optionally receives user information from the client device 504 such as edits on event categories 1109 and zone definitions 1111. The server system also sends to the client device 504 video 1136 (which may be the video stream 1104 or a modified version thereof) and, on request by the client device 504, extracted-frames video 1138.

The data processing pipeline 1112 processes a live video feed received from a video source 522 (e.g., including a camera 118 and an optional controller device) in real-time to identify and categorize motion events in the live video feed, and sends real-time event alerts and a refreshed event timeline to a client device 504 associated with a reviewer account bound to the video source 522. The data processing pipeline 1112 also processes stored video feeds from a video source 522 to reevaluate and/or re-categorize motion events as necessary, such as when new information is obtained regarding the motion event and/or when new information is obtained regarding motion event categories (e.g., a new activity zone is obtained from the user).

After video data is captured at the video source 522 (1113), the video data is processed to determine if any potential motion event candidates are present in the video stream. A potential motion event candidate detected in the video data is also sometimes referred to as a cuepoint. Thus, the initial detection of a motion event candidate is referred to as motion start detection and/or cuepoint detection. Motion start detection (1114) triggers performance of a more thorough event identification process on a video segment (also sometimes called a "video slice" or "slice") corresponding to the motion event candidate. In some implementations, the video data is initially processed at the video source 522. Thus, in some implementations, the video source sends motion event candidate information, such as motion start information, to the server system 508. In some implementations, the video data is processed at the server system 508 for motion start detection. In some implementations, the video stream is stored on server system 508 (e.g., in video and source data database 1106). In some implementations, the video stream is stored on a server distinct from server system 508. In some implementations, after a cuepoint is detected, the relevant portion of the video stream is retrieved from storage (e.g., from video and source data database 1106).

In some implementations, the more thorough event identification process includes segmenting (1115) the video stream into multiple segments then categorizing the motion event candidate within each segment (1116). In some implementations, categorizing the motion event candidate includes an aggregation of background factors, motion entity detection identification, motion vector generation for each motion entity, motion entity features, and scene features to generate motion features (11166) for the motion event candidate. In some implementations, the more thorough event identification process further includes categorizing each segment (11167), generating or updating a motion event log (11168) based on categorization of a segment, generating an alert for the motion event (11169) based on categorization of a segment, categorizing the complete motion event (1119), updating the motion event log (1120) based on the complete motion event, and generating an alert for the motion event (1121) based on the complete motion event. In some implementations, a categorization is based on a determination that the motion event candidate is within a particular zone of interest. In some implementations, a categorization is based on a determination that the motion event candidate involves one or more particular zones of interest.

Frames are extracted from the video (1132) and an extracted-frames video is encoded from the extracted frames (1134). In some implementations, more frames are extracted per unit time of video from portions of the video during and proximate to the start and end of alert events (e.g., proximate to cuepoints) than from portions of the video without alert events. Thus, portions of the extracted-frames video without alert events have less frames per unit time than portions of the extracted-frames video with alert events.

The event analysis and categorization process may be performed by the video source 522 and the server system 508/552 cooperatively, and the division of the tasks may vary in different implementations, for different equipment capability configurations, and/or for different network and server load situations. After the server system 508 categorizes the motion event candidate, the result of the event detection and categorization may be sent to a reviewer associated with the video source 522.

In some implementations, the server system 508/522 also determines an event mask for each motion event candidate and caches the event mask for later use in event retrieval based on selected zone(s) of interest.

In some implementations, the server system 508/522 stores raw or compressed video data (e.g., in a video and source data database 1106), event categorization models (e.g., in an event categorization model database 1108), and event masks and other event metadata (e.g., in an event data and event mask database 1110) for each of the video sources 522. In some implementations, the video data is stored at one or more display resolutions such as 480p, 780p, 1080i, 1080p, and the like. In some implementations, the server system 508/522 also stores the extracted-frames video in the same or a similar database (e.g., in an extracted frames and extracted-frames video database 1130).

It should be appreciated that while the description of FIGS. 11A-11B refer to motion events, the system architecture 1100 and the data processing pipeline 1112 apply similarly to other types of events or alerts (e.g., alerts or events from other smart devices 204, such as hazard alerts). Indeed, such alerts and events may be processed together alongside motion events in the same system architecture 1100 and pipeline 1112.

In some implementations, one or more of the modules and data stores associated with server system 508 or 552 (FIGS. 5A-5B) or 1501 (FIG. 15) may be located in the camera (e.g., camera 118) itself and/or in a computing device or system local to the camera (e.g., a server or digital video recorder device or hub device (e.g., hub device 180) located in the same house as the camera 118). In some implementations, one or more of the operations that are described as being performed at or by the server system 508 or 552 or 1501 may be performed by the camera itself and/or by the computing device or system local to the camera. For example, the camera and/or the local device/system may include analogous modules and data stores for processing the video feed captured by the camera to detect alert events and to identify frames in the video feed for extraction (e.g., analogue to video data receiving module, event detection module 7306, etc.), storing the video feed (e.g., analogue to video storage database 7320), extracting the identified frames (e.g., analogue to frame extraction module 73026), encoding the extracted frames into extracted-frames video (e.g., analogue to encoding module 73028), storing the extracted frames video (e.g., analogue to extracted frames and extracted-frames video database 7330), and receiving requests from a client device for the video feed and/or extracted-frames video and transmitting the video feed and/or extracted-frames video to the client device (e.g., analogue to I/O interface to clients 516 or client interface server 556 or front-end 1508).

Example User Interfaces

Figure 12A:
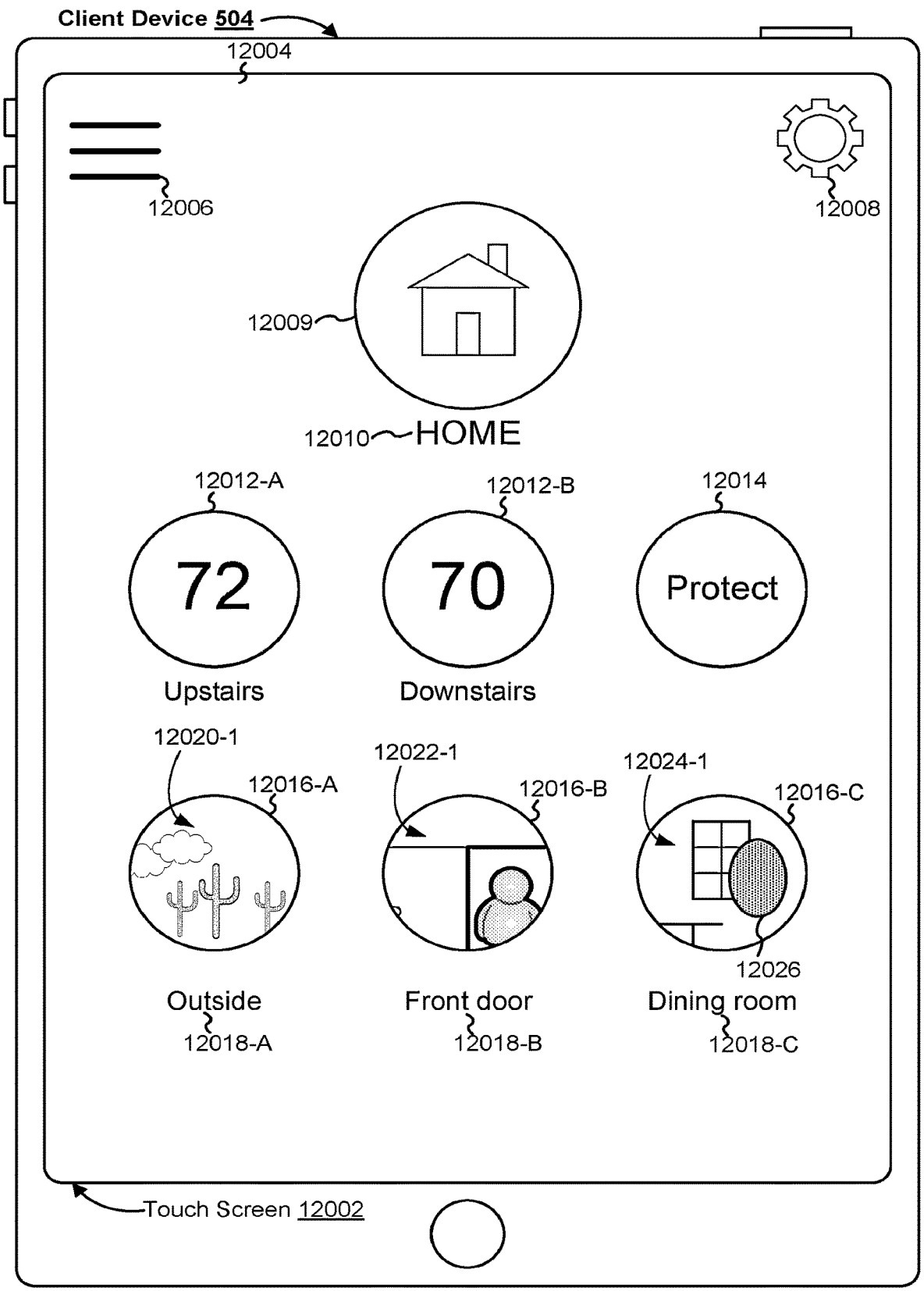
FIGS. 12A-12M illustrate example user interfaces on a client device for presenting a timeline-video relationship in accordance with some implementations.

FIGS. 12A-12M illustrate example user interfaces on a client device for monitoring and reviewing video feeds in accordance with some implementations. FIG. 12A illustrates a client device 504 (e.g., a mobile device, such as a smart phone) with a touch screen 12002 and optionally an accelerometer 892 and/or a gyroscope 894 (FIG. 8A). A user interface 12004 of an application 824 is displayed on the touch screen 12002. In some implementations, the application is a dedicated smart home management application (also referred to below as a "smart home application"), and the user interface 12004 is a home page or screen of the smart home management application. The user interface 12004 includes multiple user interface objects (e.g., buttons, icons, etc.) that display information associated with a smart home environment 100 associated with the user and/or that serve as affordances with which a user may interact to access functionalities associated with the smart home application. For example, the user interface 12004 includes a menu object 12006, a settings object 12008, a mode icon 12009 and corresponding label 12010, one or more thermostat objects 12012, a "Protect" object 12014, and one or more camera objects 12016 with respective corresponding labels 12018.

Other examples of a user interface that is a home page or screen of a smart home application are shown in FIGS. 11B, 14A, 14F, 14H, 14I, 14N-14R, and 14Y-14Z of U.S. patent application Ser. No. 15/208,578, which is incorporated by reference in its entirety.

The menu and settings objects 12006 and 12008, when activated by the user, provide access to an options menu or interface and a settings menu or interface for the smart home application, respectively. In some implementations, the menu object 12006 is displayed as a "hamburger menu" icon consisting of three parallel lines (e.g., as shown in FIG. 12A), and the settings icon is displayed as a gear icon (e.g., as shown in FIG. 12A). The mode icon 12009 and label 12010 indicates the operating mode of the smart home environment 100 with which the information displayed in user interface 12004 is associated (e.g., the user's home). For example, the smart home environment 100 may operate in a "Home" mode and an "Away" mode. In the "Home" mode, the user is presumed to be in the smart home environment 100 (e.g., within the structure 150). In the "Away" mode, the user is presumed to be remote from the smart home environment 100. Smart devices 204 may operate differently in the "Home" mode than in the "Away" mode, and certain notifications of events may be elided when in "Home" mode. The user may access a menu to change the mode by activating the mode icon 12009 (e.g., by tapping on the mode icon 12009 with a single tap gesture).

Thermostat objects 12012-A and 12012-B correspond to respective smart thermostats 102 in the smart home environment 100 and display the current detected temperatures and/or the set temperatures at the corresponding smart thermostats 102. "Protect" object 12014 provides access to a history of alert events (e.g., detected hazards, detected sounds, detected vibrations, operation of smart door lock 120, etc.) associated with the smart home environment 100. The user accesses the "Protect" history by activating the "Protect" object 12014 (e.g., by tapping on the "Protect" object 12014 on the touch screen 12002).

The camera objects 12016-A, 12016-B, and 12016-C correspond to respective video sources 522 (or, more particularly, respective cameras 118) within the smart home environment 100. The labels 12018-A, 12018-B, and 12018-C indicate the respective video sources 522 to which the respective camera objects 12016 correspond. For example, the camera object 12016-A corresponds to a camera 118 labeled "Outside" 12018-A.

Within a respective camera object 12016, a view of a video feed or stream from the corresponding camera is displayed. For example, a view 12020 of the video feed from the "Outside" 12018-A camera is displayed in camera object 12016-A, a view 12022 of the video feed from the "Front door" 12018-B camera is displayed in camera object 12016-B, and a view 12024 of the video feed from the "Dining room" 12018-C camera is displayed in camera object 12016-C. In some implementations, the view of a video feed is displayed in a camera object 12016 as a real-time (or near real-time) live video stream from the corresponding camera or as periodically refreshed (e.g., at a rate less than typical frame rates for video) still images from the corresponding camera. In some implementations, the view is displayed at a resolution different from the original resolution and/or frame rate in which the video was captured. For example, the video views displayed in the camera objects 12016 are displayed at an 180 P (180 horizontal lines progressive scan) resolution and at a frame rate of 5 or 10 frames per second, which is different from the original capture resolution (e.g., 720 P, 1080 P, 4K resolution) and the original frame rate.

In some implementations, the view displayed in a camera object 12016 is cropped from the original video to fit the size and shape of the camera object 12016, and the cropping is positioned to focus on a particular portion of the video for display. For example, view 12020 is cropped to view 12020-1 to fit into circle-shaped object 12016-A, view 12022 is cropped to view 12022-1 to fit into circle-shaped object 12016-B, and view 12024 is cropped to view 12024-1 to fit into circle-shaped object 12016-C.

It should be appreciated that while the camera objects 12016 are shown in the drawings as having a circular shape, the camera objects 12016 may be in other shapes (e.g., square, rectangle, etc.) or each camera object 12016 may have a distinct shape (e.g., one camera object 12016 has a circular shape, another camera object 12016 has a square shape, and so on).

Figure 12B:
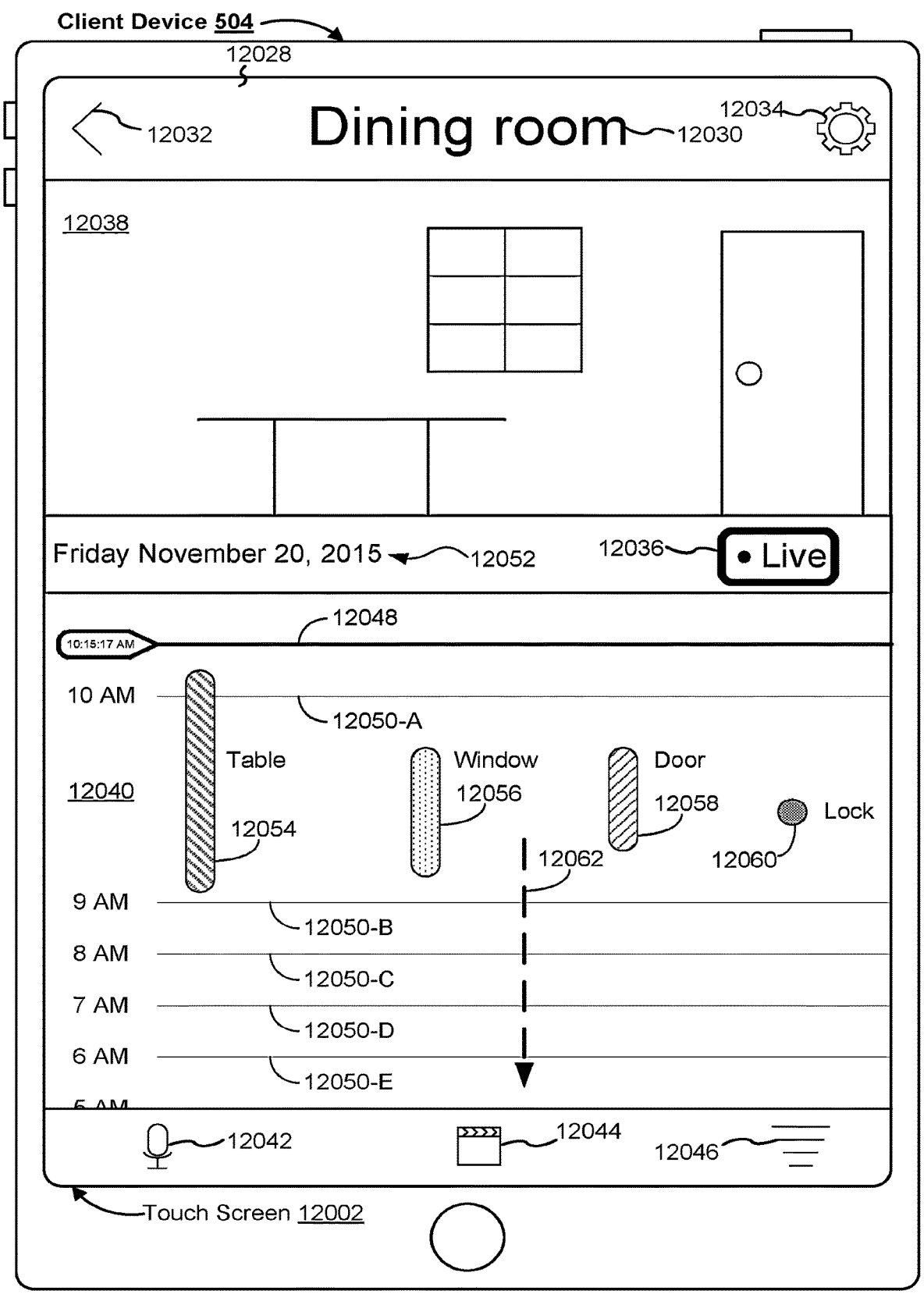

Each of the camera objects 12016 are associated with a respective camera and its corresponding video feed. A user may perform a gesture on one of the camera objects 12016 to access a user interface that shows the video corresponding to that camera object uncropped and alert event information associated with the corresponding video feed. For example, in FIG. 12A a single tap gesture with contact 12026 is detected on the camera object 12016-C. In response to detection of the gesture, user interface 12028 is displayed on the touch screen 1102, replacing user interface 12004, as shown in FIG. 12B.

User interface 12028 includes a camera name 12030 (e.g., indicating or identifying the camera 118 for which a video feed is shown in the interface 12028) and optionally a description, a backtracking affordance 12032 to backtrack to a previous user interface (e.g., back to user interface 12004), a settings affordance 12034, a live video indicator 12036, and a video region 12038. Within the video region 12038, a video feed from a camera 118 (e.g., the video feed from the "Dining room" 12018-C camera corresponding to the tapped-upon camera object 12016-C) is displayed. A date description or indicator 12052 indicates the date of a frame of the video feed currently shown in the video region 12038.

Also displayed in the user interface 12028 is a timeline region 12040. In some implementations, one or more of a microphone icon 12042, a video clip creation icon 12044, and a timeline event filtering icon 12046 are also displayed in the user interface 12028. The microphone icon 12042 corresponds to an affordance for activating audio capability between the device 504 and the camera 118 for which the video feed is displayed in the video region 12038 (if the camera 118 is equipped and configured for audio input and/or output). The video clip creation icon 12044 corresponds to an affordance for starting a process to save a portion of the video feed as a user-created video clip. The timeline event filtering icon 12046 corresponds to an affordance for filtering alert events displayed in the timeline by, for example, alert event type and/or the zone in which an alert event was detected.

The timeline region 12040 displays a timeline of the video feed displayed in the video region 12038; the timeline of the video feed corresponds to the date and time of the video feed displayed in the video region 12038. The timeline region 12040 includes a time position marker 12048 and time increment markers 12050. The time position marker 12048 marks a time in the timeline to which the portion of the video feed currently displayed in the video region 12038 corresponds; the time position marker 12048 marks the current position in the video feed on the timeline. In some implementations, the time position marker 12048 is also a "scrubber" for the video feed displayed in the video region 12038; the user may move the time position marker 12048 relative to the timeline or the timeline relative to the time position marker 12048 to "scrub" through the video feed in order to locate a particular portion of or to go to a particular time in the video feed. In some implementations, a date indicator 12052 is displayed in the user interface 12028 (e.g., proximate to the timeline region 12040). The date indicator 12052 indicates the date to which the time marked by the time position marker 12048, and optionally the portion of the timeline displayed in the timeline region 12040, corresponds. In some implementations, a count of events (not shown) associated with the video feed is displayed along with the date indicator 12052.

Time increment markers 12050 indicate time units or increments on the timeline. For example, time increment marker 12050-A marks 10 AM of a certain day on the timeline, time increment marker 12050-B marks 9 AM on the timeline, time increment marker 12050-C marks 8 AM on the timeline, time increment marker 12050-D marks 7 AM on the timeline, and time increment marker 12050-E marks 6 AM on the timeline. Thus, the time increment markers 12050, as shown in FIG. 12B, indicate one-hour increments on the timeline. In some implementations, the increments may be of another size (e.g., two-hour increments, half-hour increments, 10-minute increments, etc.). In some implementations, the smart home application, either in the user interface 12048 or elsewhere, includes an affordance for changing the time unit or increment size of the timeline (e.g., changing form one-hour increments as shown in FIG. 12B to another increment size). In some implementations, the timeline may be zoomed in or out by the user, thus changing the time increment size. In some implementations, the time unit or increment size is independent of how much display length (e.g., in pixels) on the timeline an increment occupies on the timeline, further details of which are described below.

In some implementations, indicators of alert events associated with the video feed displayed in the video region 12038 are displayed on the timeline in the timeline region 12040. For example, in FIG. 12B, alert event indicators 12054, 12056, 12058, and 12060 are displayed on the timeline. In some implementations, information regarding alert events is obtained from smart devices 204. Further details regarding these alert event indicators are described below.

In some implementations, time increments on the timeline during which one or more alert events occurred or were otherwise detected by a smart device, as indicated by alert event indicators in those time increments (e.g., alert event indicators 12054, 12056, 12058, and/or 12060), occupy more display length on the timeline than time increments in which no alert event occurred or was detected, as indicated by the lack of alert event indicators in those time increments. For example, one or more alert events occurred during the 9 AM-10 AM hour (the "9-AM increment") between time increment markers 12050-A and 12050-B, as indicated by alert event indicators 12054, 12056, 12058, and 12060 displayed in that time increment. The display length between time increment markers 12050-A and 12050-B (the 9-AM increment) is longer than any of the respective display lengths between time increment markers 12050-B and 12050-C (the 8-AM increment), time increment markers 12050-C and 12050-D (the 7-AM increment), and time increment markers 12050-D and 12050-E (the 6-AM increment), where no alert event had occurred or were detected. In some implementations, increments that have alert events respectively have one display length, and increments that do not have alert events respective have another, shorter display length. For example, increments that have alert events respectively have lengths of X pixels on the timeline, and increments that do not have alert events respectively have lengths of X/4 pixels on the timeline.

For convenience, in this specification, the term "occur" or "occurrence" is used to collectively refer to occurrence of an alert event or detection of the alert event by a smart device. A time increment during which one or more alert events occurred and was detected by a smart device is described in this specification as a time increment with an alert event. Conversely, a time increment during which no alert event occurred or was detected by a smart device is described as a time increment without an alert event.

In some implementations, the timeline in the timeline region 12040 is arranged vertically, with the direction of time from past to present going from bottom to top on the timeline, as shown in FIG. 12B. In some implementations, the timeline is arranged vertically, but the direction of time from past to present goes from top to bottom. In some implementations, the timeline in the timeline region is arranged horizontally and the direction of time from past to present goes from, depending on the particular implementation, left to right or right to left. It should be appreciated that in this specification, the "length" of the timeline is parallel to the direction-of-time orientation of the timeline. For example, if the timeline is vertically arranged, as with the timeline in the timeline region 12040 as shown in FIG. 12B, the "length" of the timeline is the vertical dimension of the timeline. In some implementations, the timeline is an overlay over the video region 12038 as opposed to being a distinct region. For example, the video region 12038 may be sized to fit the width of the display, and the timeline is a vertically arranged timeline overlaid on one side (e.g., the right side) of the video region 12038 and displayed semi-transparently or translucently.

Figure 12C:
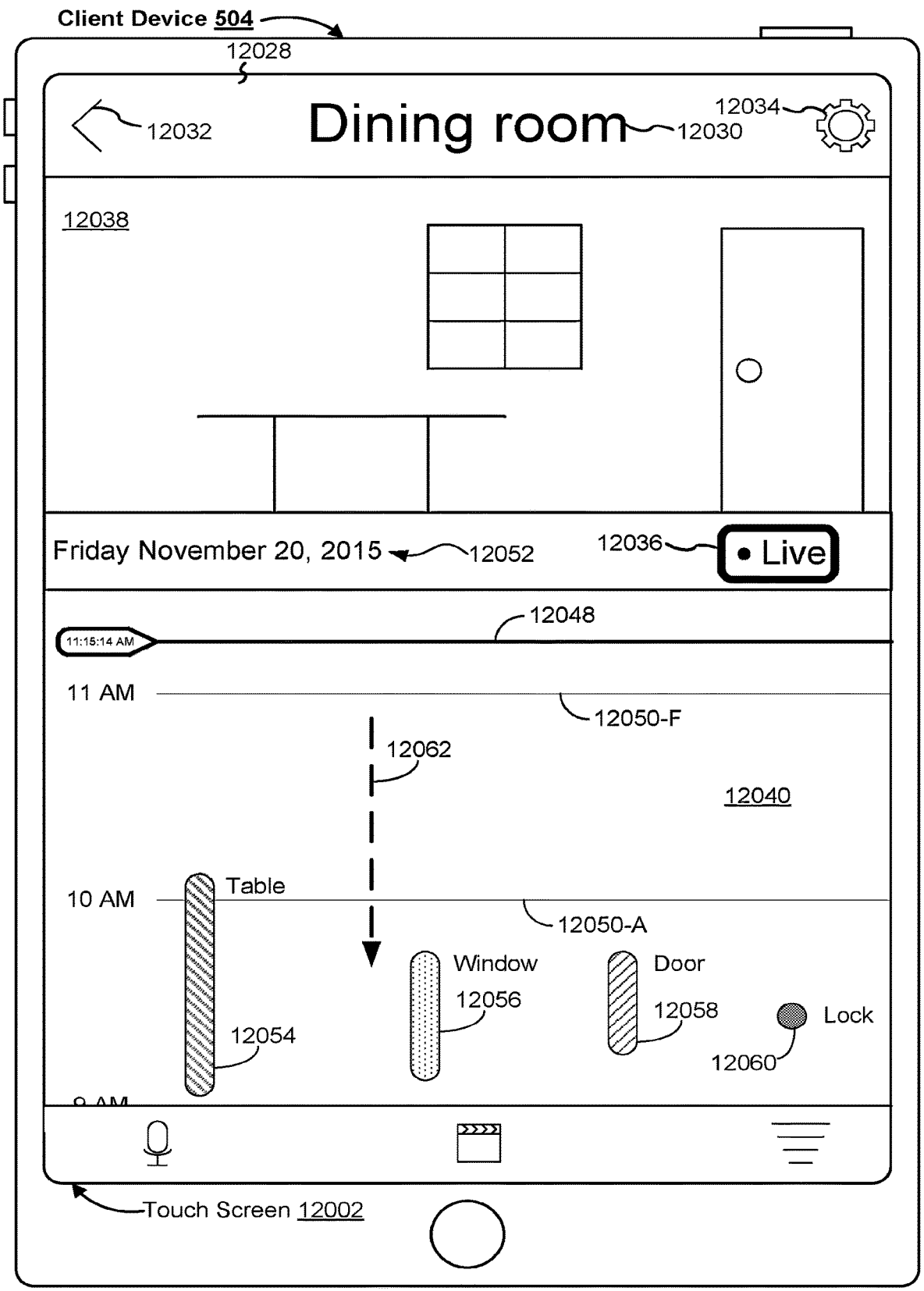
Figure 12D:
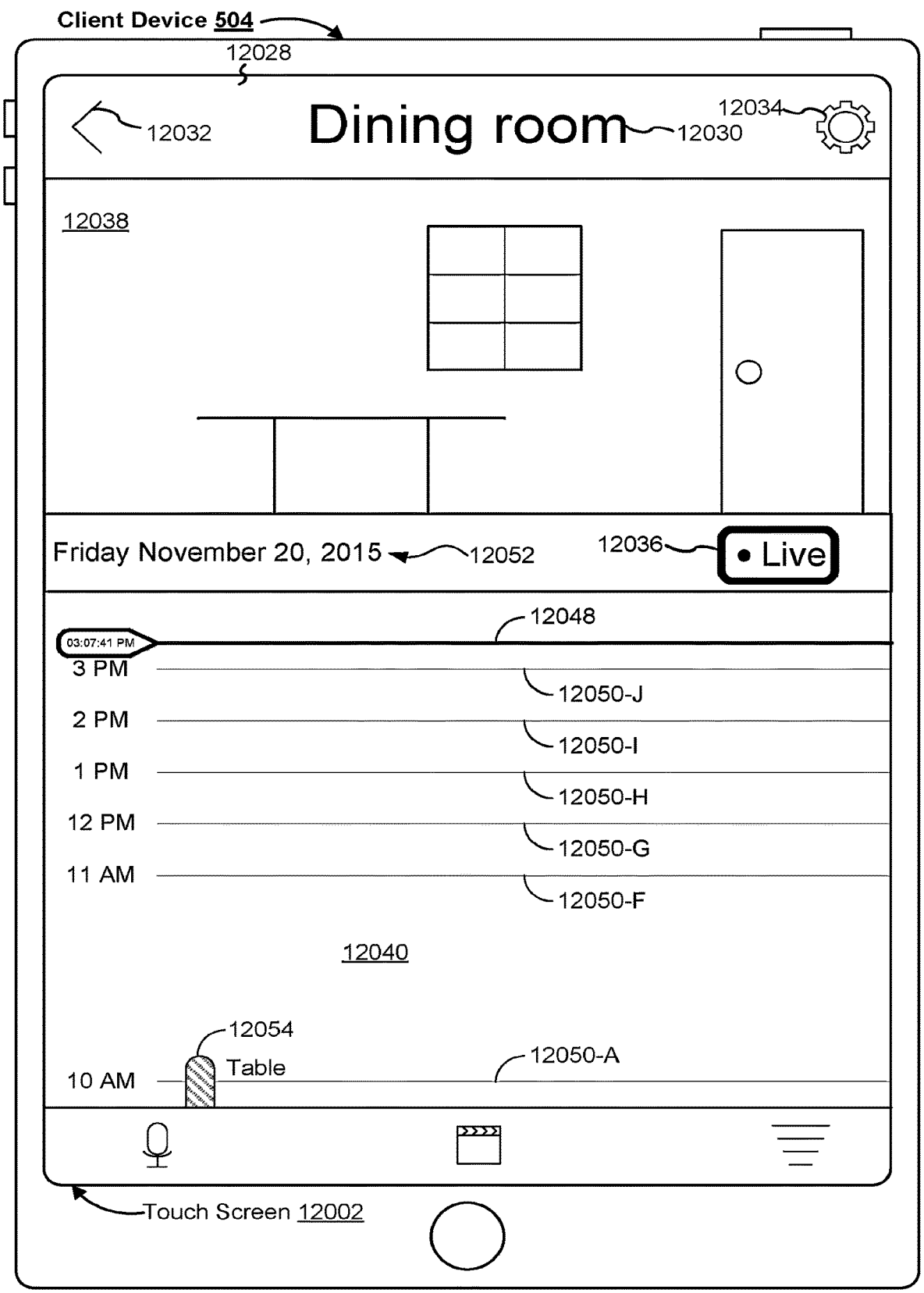

In some implementations, the video feed playing in the video region 12038 is a live or approximately live video stream originally captured by the camera 118 and received through a server system 508 or 552 (e.g., video 7321, FIG. 7C). Correspondingly, while the video feed is playing, the timeline in the timeline region 12040 scrolls, relative to the time position marker 12048, at the same rate as and in accordance with real-time. For example, as shown in FIGS. 12B-12D, the video feed is live, as indicated by live video indicator 12036. The timeline in the timeline region 12040 moves in direction 12062, in accordance with the actual passage of time and playback of the video feed, such that the time position marker 12048 continually marks approximately the present time on the timeline. Concurrently, the video feed plays in the video region 12038 along with the scrolling timeline and the position of the time position marker 12048 relative to the timeline. In some implementations, the time position marker 12048 is stationary within the timeline region 12040; the user sees the time position marker 12048 remaining in place while respective time increments in the timeline scroll by.

As the timeline scrolls, respective time increments in the timeline that are further in the past are scrolled out of display and respective time increments closer to the present are scrolled into display. For example, in FIG. 12C, the 6-AM increment, the 7-AM increment, and the 8-AM increment have scrolled out of display, and the 10-AM increment between time increment markers 12050-A and 12050-F have scrolled completely into display. As the timeline scrolls further, portions of the 9-AM increment have scrolled out of display. The 11-AM increment between time increment markers 12050-F and 12050-G, the 12-PM increment between time increment markers 12050-G and 12050-H, the 1-PM increment between time increment markers 12050-H and 12050-I, and the 2-PM increment between time increment markers 12050-I and 12050-J scroll into display, as shown in FIG. 12D.

In some implementations, the video feed is encoded (e.g., by server system 508; by video server system 552) such that portions of the video feed corresponding to time increments with an alert event have more frames per unit time than portions of video feed corresponding to time increments without an alert event. In some implementations, the differences in timeline display length between time increments with an alert event and time increments without an alert event is associated with the difference in frames per unit time between time increments with an alert event and time increments without an alert event. As the timeline scrolls, when the time position marker 12048 is located over a time increment without an alert event, the video plays at less frames per unit time than when the time position marker 12048 is located over a time increment with an alert event. Thus, for example, portions of the video feed corresponding to the 9-AM increment and the 10-AM increment have more frames per unit time (e.g., frames per hour, frames per second) than the 6-AM increment, the 7-AM increment, the 8-AM increment, the 11-AM increment, the 12-PM increment, the 1-PM increment, or the 2-PM increment. When the timeline is scrolling, the video feed plays in the video region 12038 in accordance with these different frame rates.

Figure 12E:
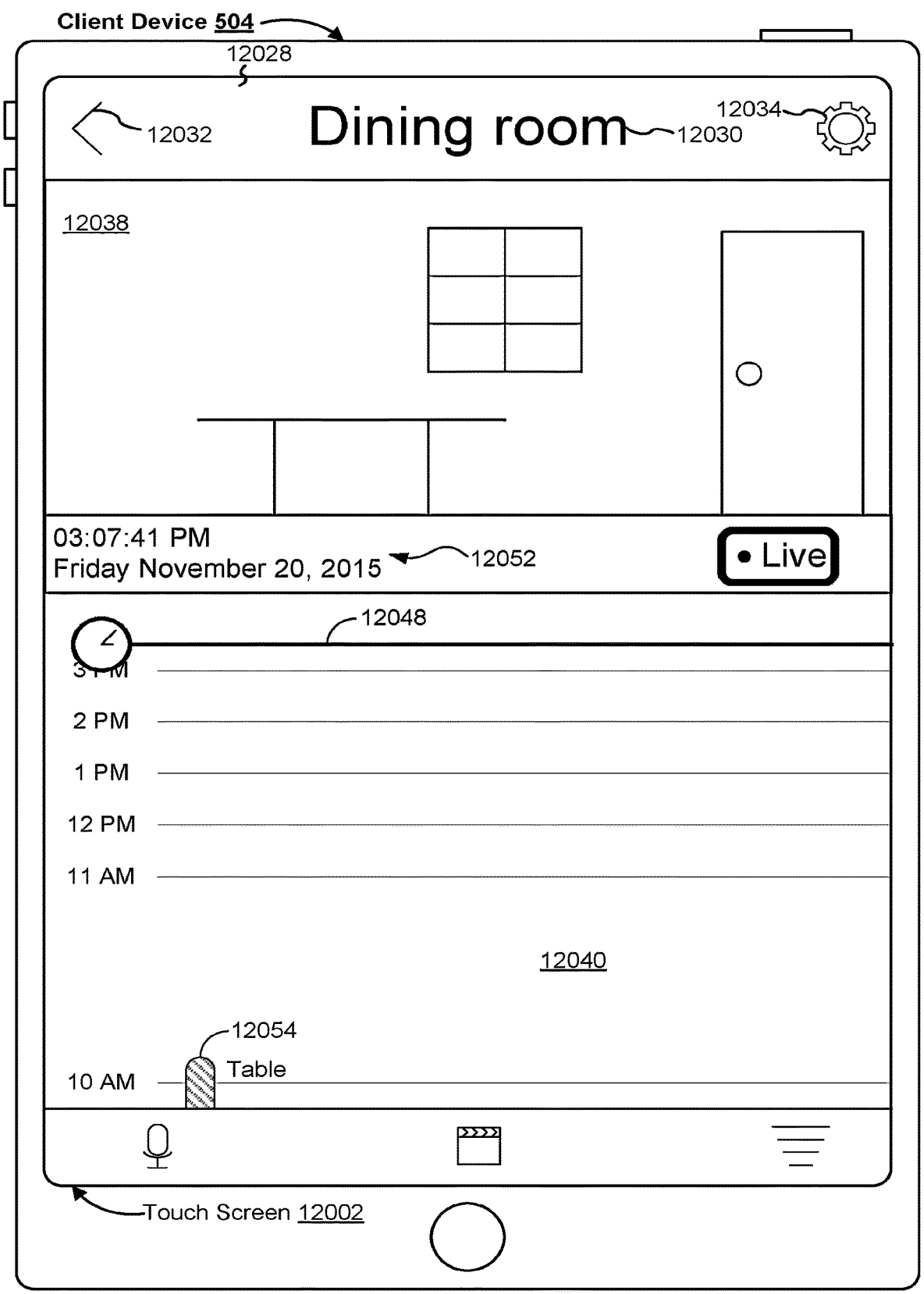

In some implementations, the time position marker 12048 displays digitally the time corresponding to the current location of the time position marker 12048 relative to the timeline. For example, in FIG. 12B, the time position marker 12048 shows the time marked by the time position marker 12048 as "10:15:17 AM." In some implementations, the time position marker 12048 displays the time corresponding to the current location of the time position marker 12048 relative to the timeline in analog form (e.g., with a graphic or icon resembling an analog clock). For example, the time position marker 12048 as shown in FIG. 12E includes an analog clock icon that shows the time marked by the time position marker 12048. The analog clock icon has hour and minute hands that show the time marked by the time position marker 12048. In implementations where the time position marker 12048 includes the analog clock icon or graphic, the date indicator 12052 may include, along with the date, the time marked by the time position marker 12048 in digital form, as shown in FIG. 12E for example.

Figure 12F:
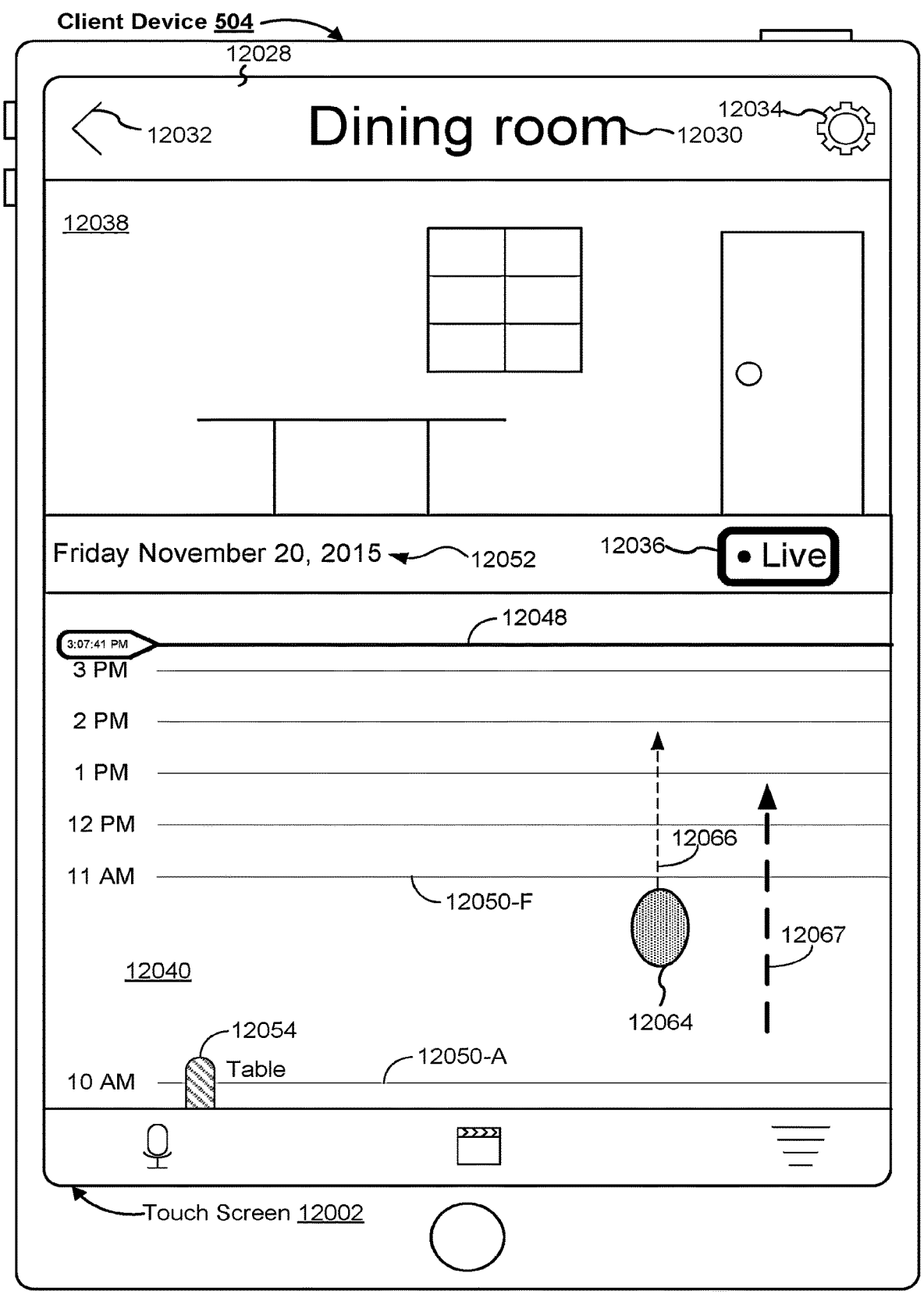
Figure 12G:
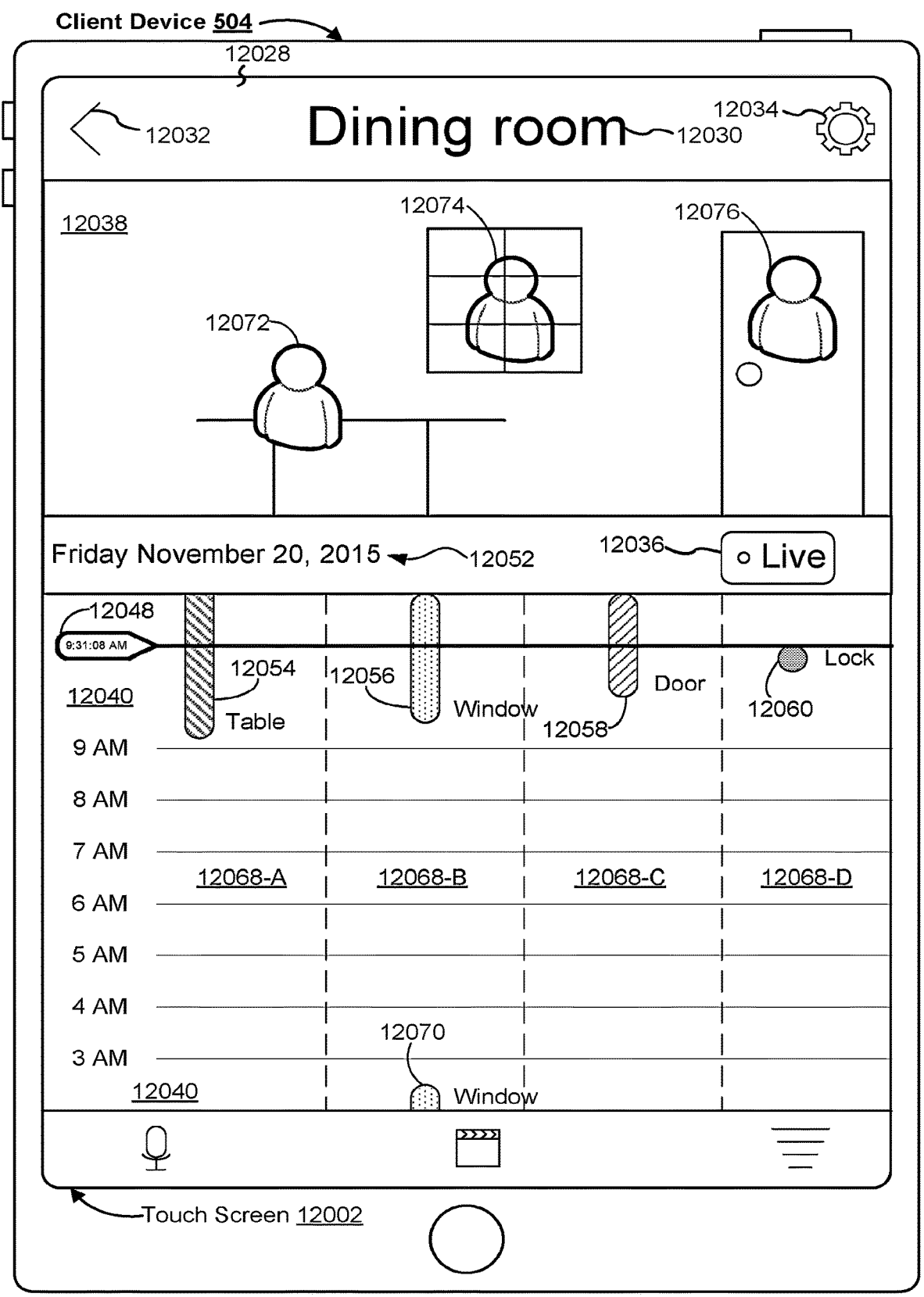

In some implementations, the timeline scrolls backward or forward in time in accordance with a manual user input. The user may perform a gesture on the touch screen 12002 over the timeline region 12040. The smart home application detects the gesture, and scrolls the timeline in accordance with the detected gesture. For example, as shown in FIG. 12F, a gesture with contact 12064 (hereinafter "gesture 12064" for convenience) is detected in timeline region 12040. The gesture 12064 moves in direction 12066. In accordance with the gesture 12064 and its direction 12066, the timeline scrolls in direction 12067, backwards toward past time, as shown in FIG. 12G for example. Meanwhile, time position marker 12048 remains stationary, thus marking a new time by virtue of the timeline scrolling relative to the time position marker 12048, thus positioning the time position marker 12048 at a new location on the timeline. As shown in FIG. 12G, live video indicator 12036 indicates that the video feed content displayed in video region 12038 is not live; the timeline has scrolled backward to a past time corresponding to historical video content in the video feed. In some embodiments, in response to the time position marker 12048 being moved to a past time, the recorded video feed corresponding to that past time will be requested and subsequently displayed in video region 12038. Thus, by scrolling the timeline, the user can access the recorded video feed backward or forward in time in order to find a desired portion for viewing, where the recorded video feed could be recorded locally (e.g., on the camera, such as camera 118, or another electronic storage device in proximity to the camera) or remotely (e.g., on a server system remote from the camera, such as server system 508, 552, or 1501). In some implementations, whichever time on the timeline the user scrolls to, the video feed resumes playback from the approximate time on the timeline where the scrolling stopped. In some implementations, the user can also scroll the timeline all the way forward in time to resume live video in the video region 12038. In which case, e.g., the client device 504 may request the live video feed from the camera (e.g., camera 118) itself or a server system remote from the camera (e.g., server system 508, 552, or 1501).

In some implementations, while the user is moving in time through the video feed (e.g., with gesture 12064), the video content displayed in the video region 12038 is an extracted-frames video (e.g., extracted-frames video from database 7330) version of the video feed, encoded (e.g., by server system 508/552) from frames extracted from the original video from the camera 118 (e.g., high-quality video 7321). In some implementations, the extracted-frames video averages a predefined frame rate (e.g., 20 frames per 20 minutes, 60 frames per hour, 1 frame per minute), but the frame rate between portions of the extracted-frames video may vary, with the portions of the extracted-frames video corresponding to an alert event having more frames per unit time than portions without an alert event. Frames are extracted from the video feed for generation of the extracted-frames video, such that frames are extracted closer together (e.g., frames extracted at higher than the average rate) from portions of the video feed in proximity to an alert event (e.g., a cuepoint) than from portions of the video feed without an alert event (e.g., frames extracted at or lower than the average rate). When the user scrubs the timeline (i.e., moves in time through the recorded video feed), the portions of the extracted-frames video with an alert event have frames closer together in time than the portions of the extracted-frames video without an alert event. As the user scrubs the video feed, frames from the extracted-frames video are displayed in the video region 12038, instead of frames from the original version of the video feed that plays when the timeline is not being manually scrolled. In other words, in some implementations, the original video feed is not displayed while the user is scrubbing the video feed—rather, only a subset of frames from the original video feed are displayed. Further, in some implementations, frames of the extracted-frames video may be requested from the server system (e.g., server system 508 or 552, a server or recording/storage device local to the camera 118) as the user scrolls the timeline. This facilitates the efficient provision of extracted-frames video for scrubbing while keeping the extracted-frames video generation and storage primarily at the server system 508/522. In some implementations, the extracted-frames video operationally is more akin to a set of still images or a time-lapse video; the still images or time-lapse frames (e.g., the frames in the extracted-frames video) are displayed as the user scrubs the video feed. In at least one embodiment, while a user scrolls through the timeline of a recorded video feed, only a subset of frames from the original video feed are displayed rather than the actual recorded video feed. Once the user stops scrolling, however, or otherwise indicates a desire to playback the original video feed at a particular historical time, the client device 504 will request and display the recorded video feed from that historical time on. In some implementations, the client device 504 may not request or display the recorded video feed in such an instance. For example, a user account may have one of a number of a different subscription tiers.

Different qualities or amounts of recorded video feed may be provided to the user based on their subscription tier. For example, on a paid subscription, the client device 504 may give the user the full experience of subsets of frames while scrolling and then the full recorded video feed on response to the user selecting a particular time in history to begin playback. For an unpaid subscription, however, while the client device 504 may give the user the experience of subsets of frames while scrolling, in response to the user selecting a particular time in history to begin playback the client device 504 may not actually playback any video. In some embodiments, and in accordance with different subscription tiers, the client device 504 may playback historical video for only a select number of hours (e.g., 1, 3, 12, etc.) or days (e.g., 1, 7, 30, etc.). In some embodiments, a still image from the subset of frames may be displayed instead of the recorded video stream. In some embodiments, a message indicating different subscription plans are available may be displayed or superimposed on the still image. In some embodiments, the subsets of frames may be displayed only for historical times during which an event occurred. E.g., the subsets of frames may be displayed during the time a particular event occurred, and a still image or message may be displayed during the time that no events have occurred.

As described above, the timeline may include one or more alert event indicators (e.g., alert event indicators 12054, 12056, 12058, 12060). These alert event indicators indicate on the timeline occurrences of alert events detected by smart devices. In some implementations, alert event indicators indicate alert events corresponding to any of multiple types, including for example: motion events in a user-defined or automatically generated zone in the field of view captured by the camera 118 and shown in the video feed, motion events in the field of view generally or not in any user-defined or automatically generated zone, hazard events (e.g., hazards detected by a hazard (e.g., smoke, carbon monoxide) detector), a window or door activity event (e.g., detection of a window or door being opened or closed), a door lock event (e.g., detection of a door lock being engaged or disengaged), and a thermostat or HVAC event (e.g., a thermostat temperature change, activation of thermostat programming, the thermostat turning on or off, etc.). In some implementations, additional indicators or information from the smart devices may be displayed on the timeline along with alert event indicators. For example, the ambient temperature as detected by the thermostat or HVAC system may be plotted as a line graph on the timeline.

In some implementations, an alert event indicator is displayed as a graphical object (e.g., a "pill" graphical object, called such because its shape and rounded ends resemble a medicine pill) with a display length parallel to the timeline; the display length is based on the duration of the alert event. For example, alert event indicators 12054 and 12056 (FIG. 12B) have different display lengths, and correspondingly reflect different durations. Alert event indicators corresponding to alert events associated with a toggle event or a state change event (e.g., a simple on-to-off event or vice versa, a door lock changing state from engaged to disengaged) may have a default or nominal display length independent of duration (e.g., as with indicator 12060). Alert event indicators are displayed on the timeline in a manner that indicates approximate start and end times of the respective corresponding alert events based on their respective locations on the timeline and optionally their lengths. For example, the alert event corresponding to alert event indicator 12054 starts sometime after 9 AM and lasts until sometime after 10 AM.

Figure 12H:
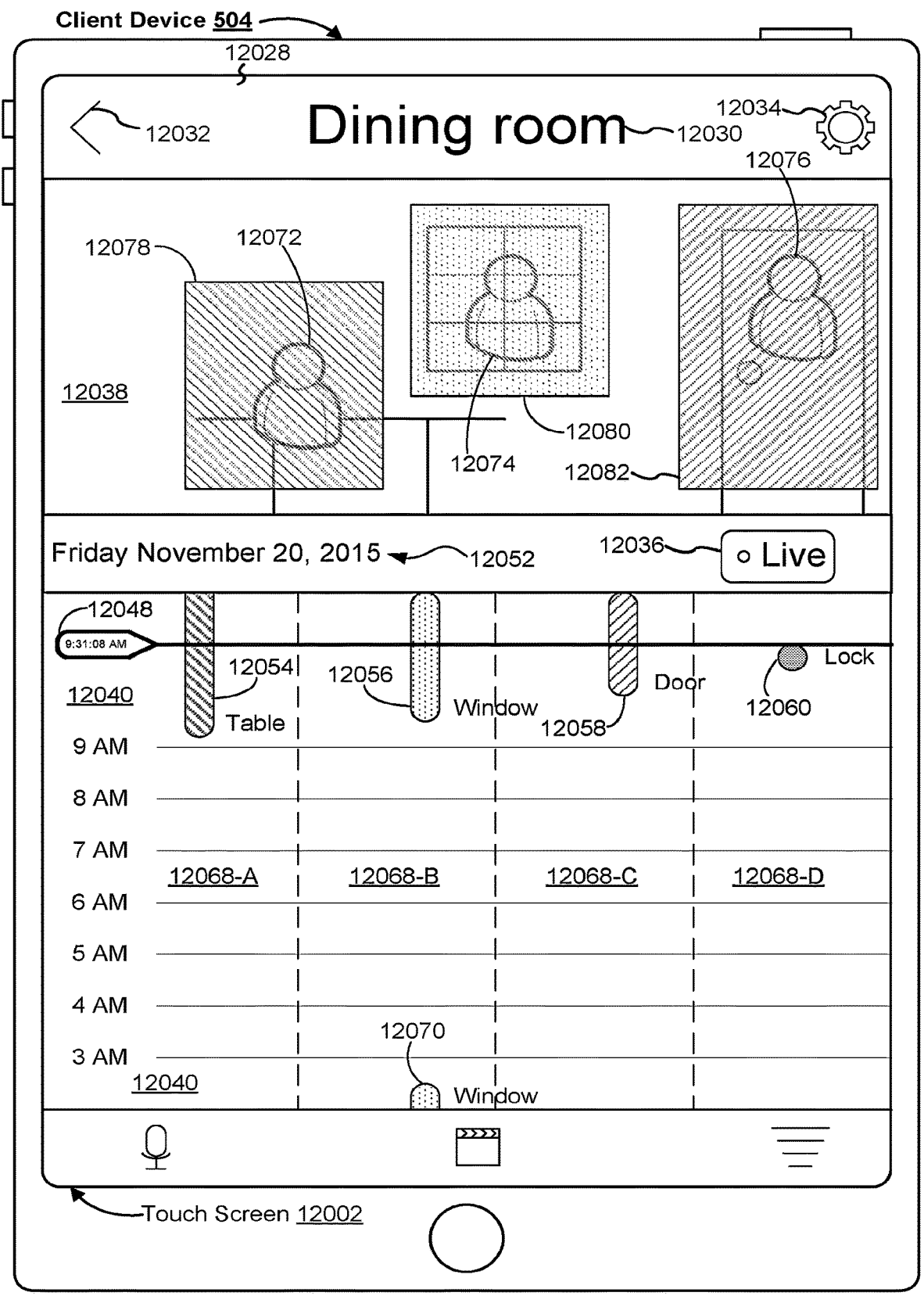

In some implementations, the timeline region 12040 includes multiple sub-regions or sub-sections or columns (for a vertically oriented timeline) or rows (for a horizontally oriented timeline) 12068 running parallel to the timeline. For example, FIGS. 12G and 12H show sub-sections 12068-A, 12068-B, 12068-C, and 12068-D in timeline region 12040, running parallel to the timeline. It should be appreciated that the dotted lines dividing the sub-sections 12068 in FIGS. 12G and 12H are shown in the figures for illustrative purposes only, and are not actually displayed in the user interface 12028 and are not otherwise visible to users. Alert event indicators and other information from smart devices are displayed in respective sub-sections 12068 based on the alert event type or information type. For example, alert event indicators corresponding to motion events in a "Table" zone (e.g., indicator 12054) are displayed in sub-section 12068-A. Alert event indicators corresponding to motion events in a "Window" zone (e.g., indicators 12056 and 12070) are displayed in sub-section 12068-B. Alert event indicators corresponding to motion events in a "Door" zone (e.g., indicator 12058) are displayed in sub-section 12068-C. Alert event indicators corresponding to door lock events for a respective door lock (e.g., indicator 12060) are displayed in sub-section 12068-D. In some implementations, the number of sub-sections 12068 is limited (e.g., four as shown in FIGS. 12G and 12H) due to display space and legibility considerations; multiple alert event types may be assigned the same sub-section. For example, sub-section 12068-A may be shared by alert event indicators corresponding to "Table" zone motion events and alert event indicators corresponding to motion events not in any of the user-created or automatically generated zones. As another example, one sub-section 12068 may be shared by non-motion events (e.g., hazard alerts) and motion events not in any user-created or automatically created zone, and other sub-sections 12068 are reserved for motion events in respective zones.

In some implementations, one or more of the sub-regions/sub-sections/columns display other information from smart devices. For example, the ambient temperature as detected by the thermostat or HVAC system may be plotted as a line graph in one of the sub-sections.

Locations on the timeline with alert event indicators may correspond to portions of the video feed that were captured and recorded while the respective corresponding alert events were detected. When the time position marker 12048 overlaps one or more alert event indicators on the timeline, the video feed portion that is played or displayed in the video region 12038 was captured concurrently with detection of the corresponding alert events. For example, as shown in FIGS. 12G and 12H, the time position marker overlaps alert event indicators 12054, 12056, and 12058. Indicator 12054 corresponds to a motion event in a "Table" zone, e.g., a person 12072 moving in a zone named "Table." Indicator 12056 corresponds to a motion event in a "Window" zone, e.g., a person 12074 moving in a zone named "Window." Indicator 12058 corresponds to a motion event in a "Door" zone, e.g., a person 12076 moving in a zone named "Door."

In some implementations, different portions of the video feed portion may be recorded and accessible. These may be accessible based on, e.g., a subscription tier associated with the user. For example, in accordance with one subscription tier, video may be recorded and accessible only during the time that an event occurs. In some embodiments, the full video may not be available but rather only a subset of the frames corresponding to that event. In accordance with another subscription tier, video may be recorded and accessible not only during events but also when events do not occur. Depending on the particular subscription tier, the amount of recorded video recorded and/or accessible may be different, e.g., a certain number of hours or a certain number of days, weeks, or years.

In some implementations, the alert event indicators have different visual characteristics based on the corresponding alert event type. The different visual characteristic may be different colors, for example. For example, indicators corresponding to "Table" zone motion events (e.g., indicator 12054) have a first color, indicators corresponding to "Window" zone motion events (e.g., indicators 12056 and 12070) have a second color, indicators corresponding to "Door" zone motion events (e.g., indicator 12058) have a third color, indicators corresponding to door lock events for a particular door (e.g., indicator 12060) have a fourth color, and so on. In FIGS. 12G-12H, the different colors are represented in the figures by the different fill patterns in the alert event indicators.

In some implementations, when the video feed portion that is being played or displayed corresponds to a portion with one or more alert events corresponding to motion events in zones (i.e., the time position marker 12048 overlaps one or more alert event indicators corresponding to motion events in zones), the zone(s) in which the motion event(s) were detected are highlighted in the video feed portion. For example, as shown in FIG. 12H, "Table" zone 12078, "Window" zone 12080, and "Door" zone 12082 are highlighted. In some implementations, the respective zones are highlighted with the same respective colors as their respective corresponding alert event indicators.

In some implementations, the order in which alert event types corresponding to motion events in zones are assigned, relative to each other, to respective sub-sections 12068 is based on the order of the zones in the field of view of the camera 118. For example, as shown in FIG. 12H, "Table" zone 12078, "Window" zone 12080, and "Door" zone 12082 had been defined in the field of view of the video feed, in the order from left to right as shown in the figure. Following that ordering, indicators for "Table" zone motion events are assigned to sub-section 12068-A, indicators for "Window" zone motion events are assigned to sub-section 12068-B, and indicators for "Door" zone motion events are assigned to sub-section 12068-C.

Figure 12I:
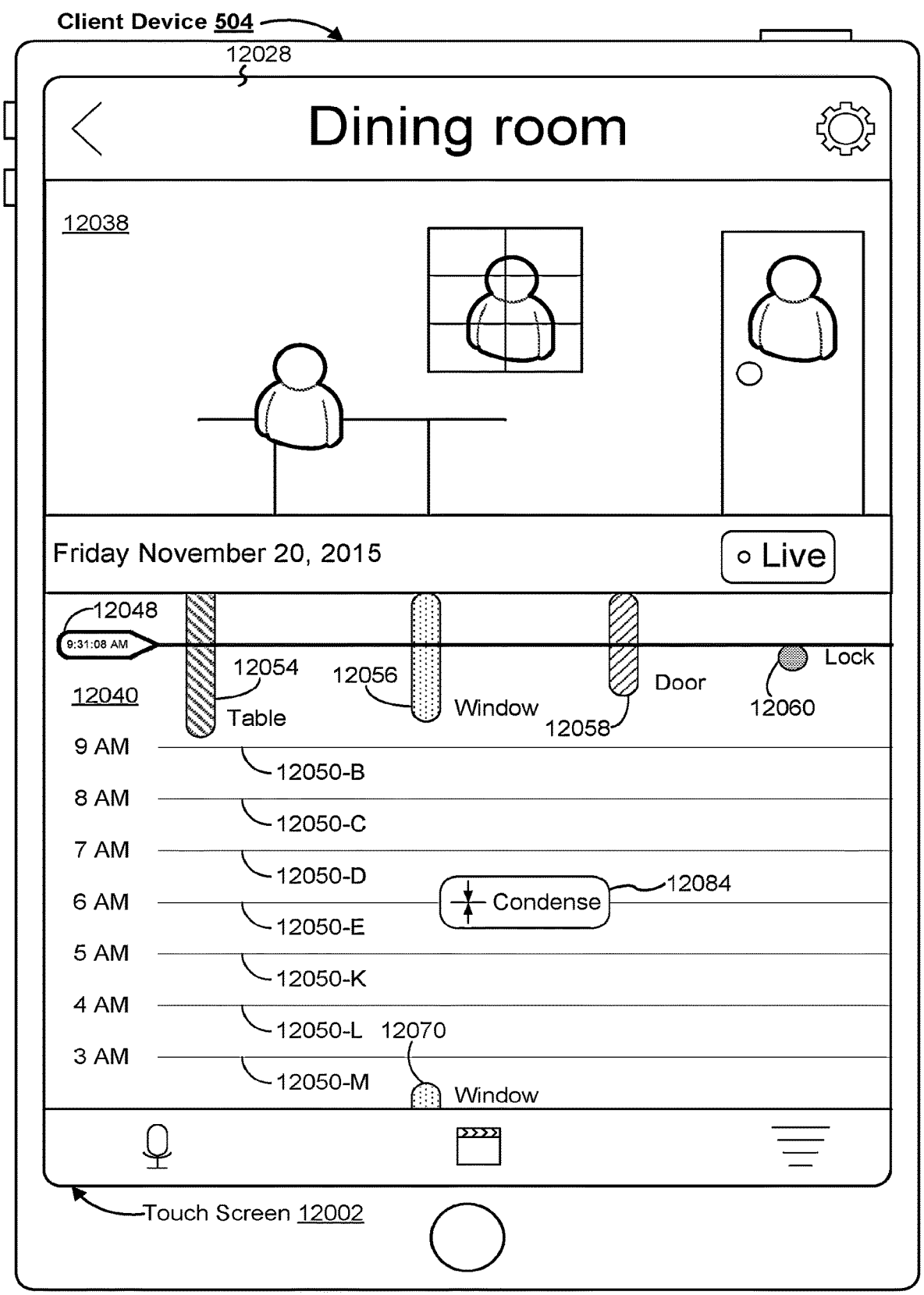
Figure 12J:
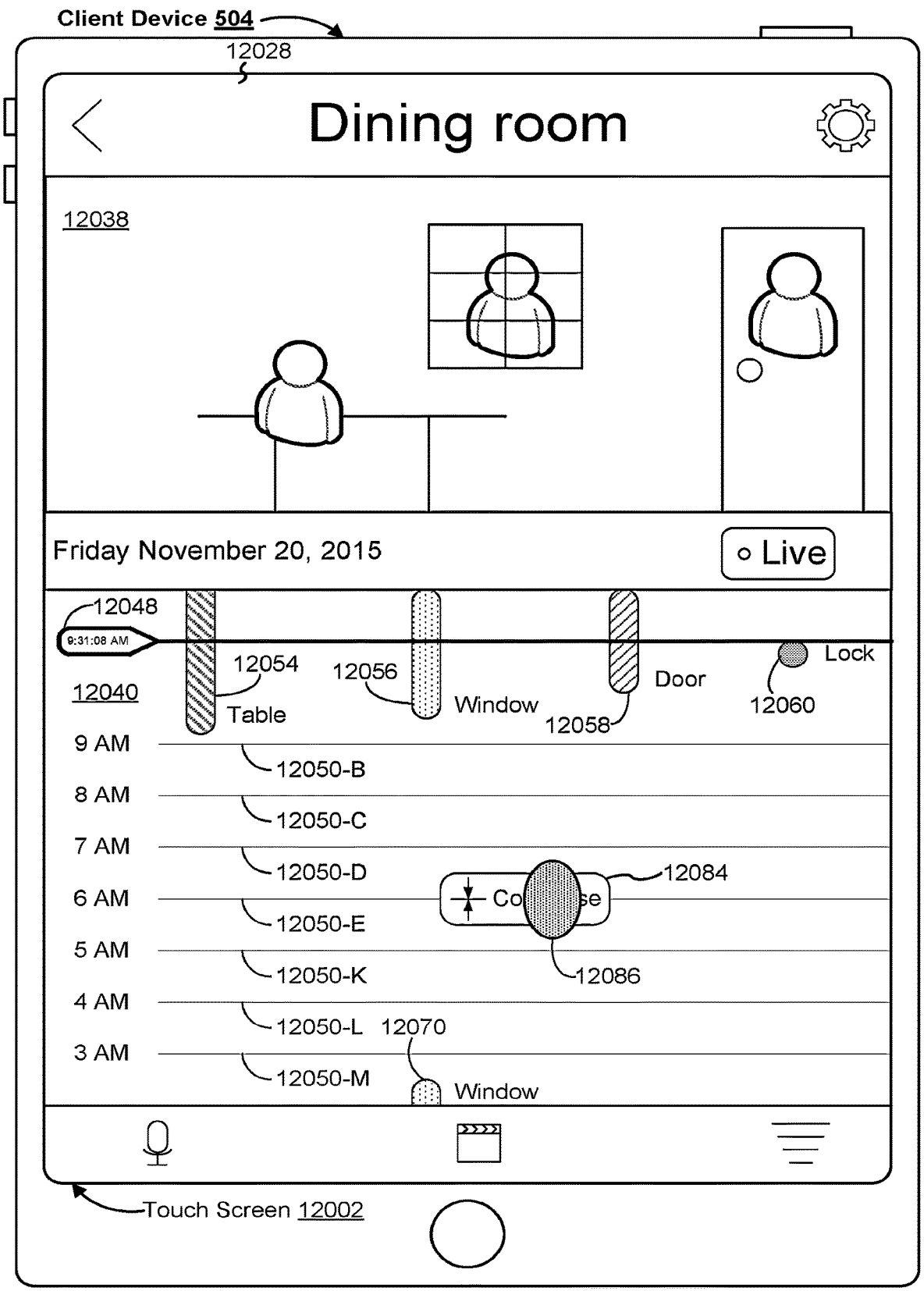
Figure 12K:
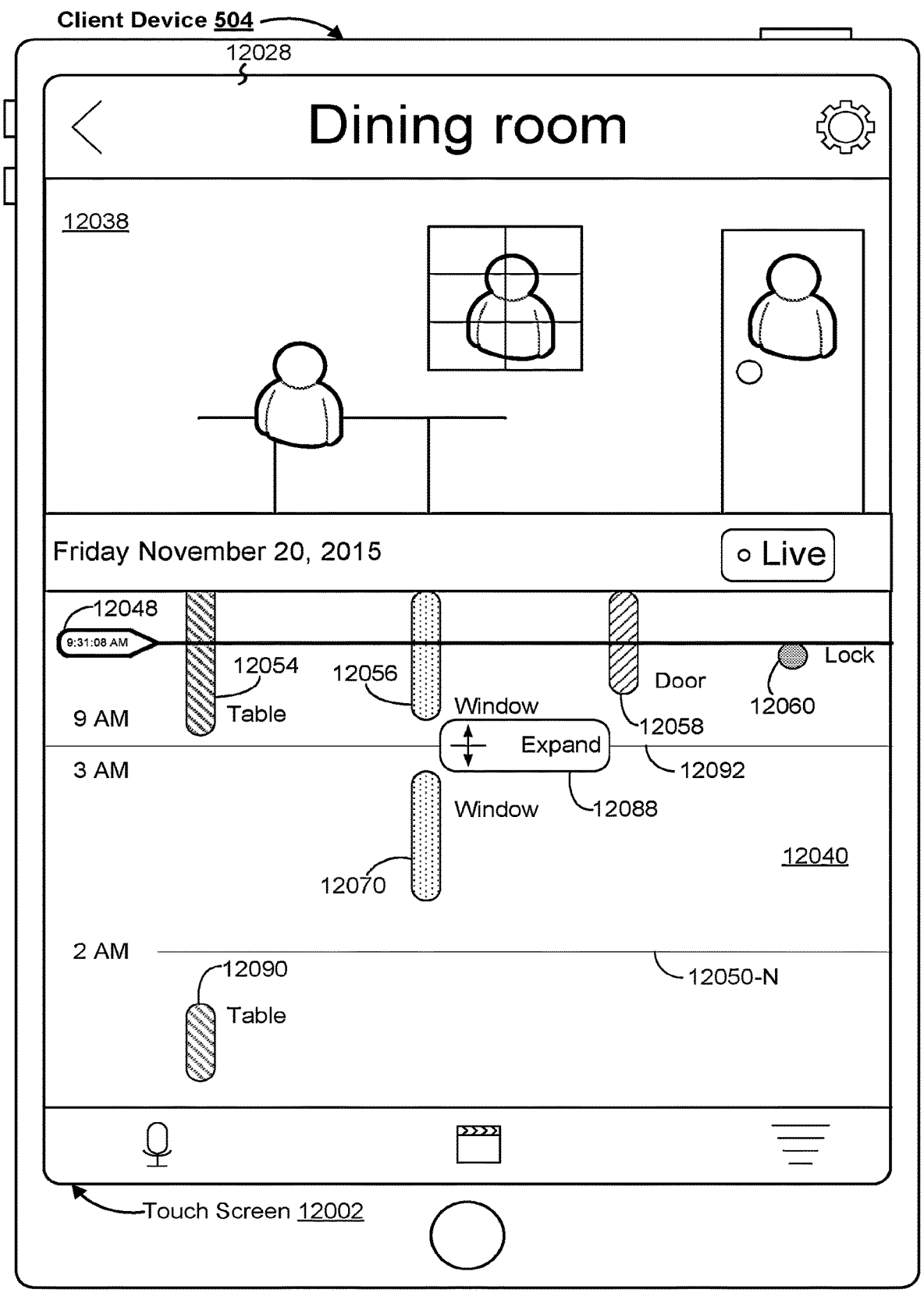

FIG. 12I illustrates user interface 12028 with a "Condense" affordance 12084 (e.g., a virtual button or other user interface object) displayed amongst multiple consecutive time increments without an alert event (e.g., the 8-AM increment, the 7-AM increment, etc.). In some implementations, consecutive time increments without alert events may be condensed on the timeline. For example, by activating the "Condense" affordance 12084 (e.g., tapping on the "Condense" affordance with a tap gesture 12086, as shown in FIG. 12J), the respective one-hour time increments between time increment markers 12050-B and 12050-C, 12050-C and 12050-D, 12050-D and 12050-E, 12050-E and 12050-K, 12050-K and 12050-L, and 12050-L and 12050-M are condensed or collapsed into one multi-hour time increment represented by multi-hour marker 12092 (FIG. 12K). In some implementations, activation of the "Condense" affordance also causes other consecutive time increments without alert events elsewhere in the timeline to condense or collapse. The condensing pulls other time increments, and any alert event indicators within these other time increments, into view. For example, one or more other alert event indicators (alert event indicators 12070 and 12090) and associated time increments (e.g., the time increment between multi-hour marker 12092 and time increment marker 12050-N) are pulled into view by the condensing of the increments between time increment markers 12050-M and 12050-B. After the condensing, an "Expand" affordance 12088 (e.g., a virtual button or other user interface object) is displayed over the multi-hour marker 12092 (e.g., as shown in FIG. 12K). The condensing may be reversed by activation of the "Expand" affordance 12088 in a similar manner as activation of the "Condense" affordance 12084 (e.g., with a tap gesture).

Figure 12L:
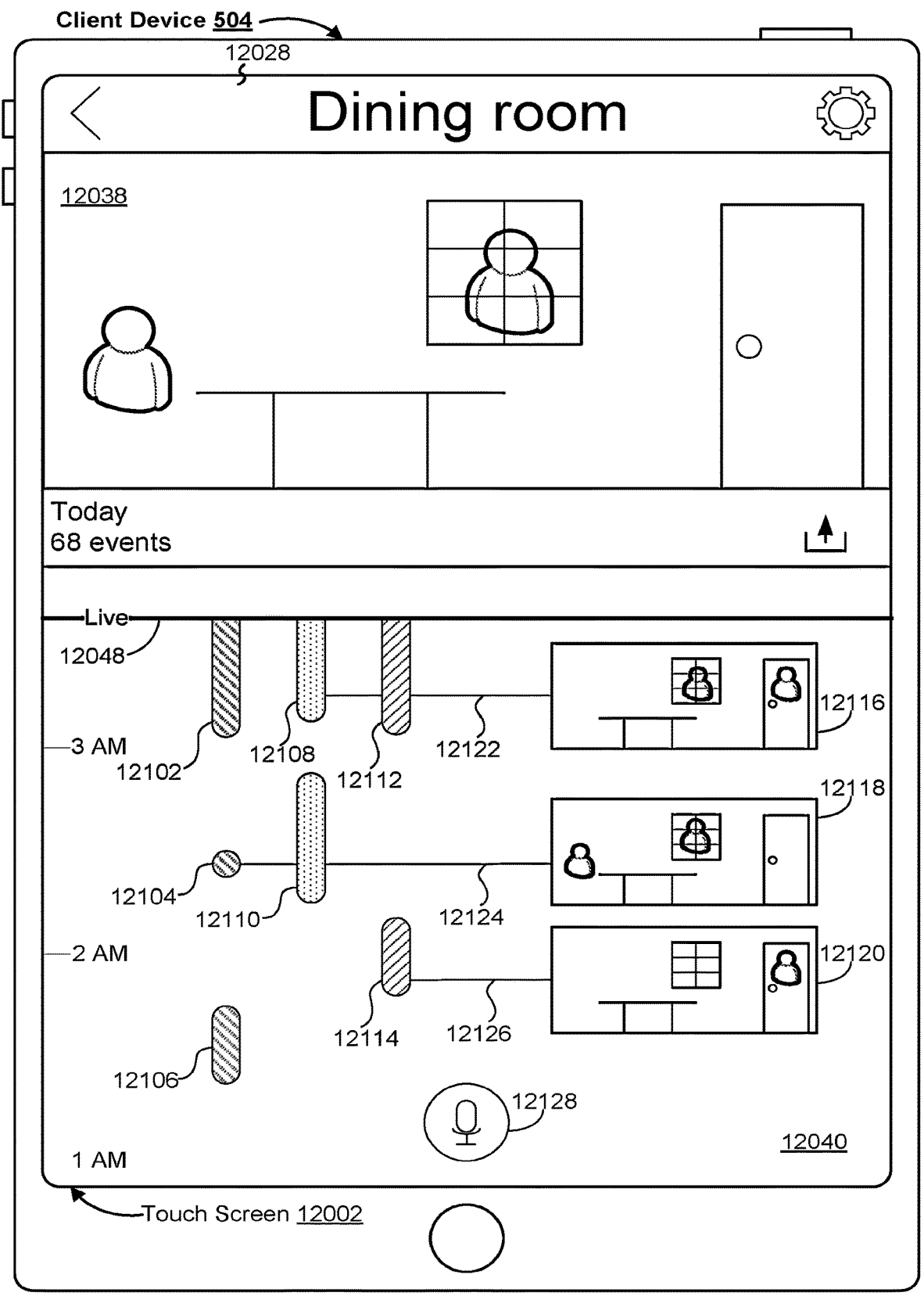
Figure 12M:
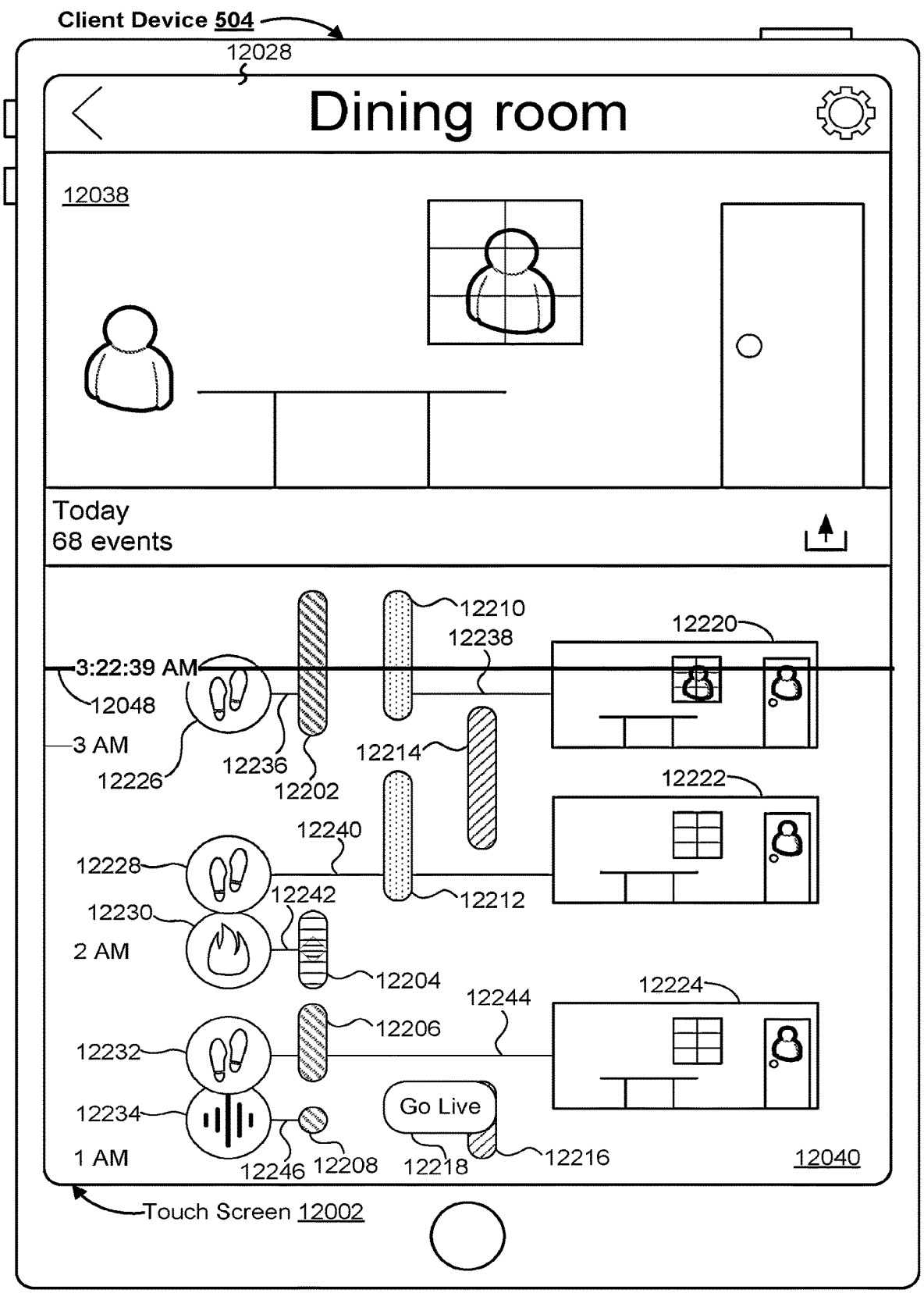

FIG. 12L-12M illustrate examples in which additional information is displayed in the timeline. In FIG. 12L, in the timeline region 12040, alert event indicators 12102, 12104, and 12106 are aligned in one sub-section (the sub-section delineations not shown in the FIG. 12L) within the timeline region 12040, alert event indicators 12108 and 12110 are aligned in another sub-section in the timeline region 12040, and alert event indicators 12112 and 12114 are aligned in a third sub-section in the timeline region 12040. A "Live" label in time position marker 12048 indicates that the video feed displayed in the video region 12038 is the live video feed. While the live video feed is played, microphone icon 12128 (similar in function to microphone icon 12042) is displayed; a user may activate the microphone icon 12128 to activate audio capability between the device 504 and the camera 118.

Along with the alert event indicators 12102, 12104, 12106, 12108, 12110, 12112, and 12114, event thumbnails 12116, 12118, and 12120 may be displayed in the timeline region 12040. Lines 12122, 12124, and 12126 visually connect the event thumbnails 12116, 12118, and 12120 to respective associated alert event indicators. For example, thumbnail 12116 is associated with alert event indicator 12108, thumbnail 12118 is associated with alert event indicator 12104, and thumbnail 12120 is associated with alert event indicator 12114. In some implementations, for a respective alert event indicator, the associated event thumbnail is a frame from the portion of the video feed associated with the alert event indicator. In some implementations, the user may interact with an event thumbnail. For example, the user may tap on an event thumbnail displayed on the touch screen 12002 to jump in the timeline to the time corresponding to the beginning of the video portion with which the tapped event thumbnail is associated. In other words, in response to a user selection of a particular event thumbnail, the client device 504 may request the stored video associated with that event thumbnail and begin playing back the video stored at that time in the video region 12038. In some implementations, up to a predefined number (e.g., two) of event thumbnails are displayed per one-hour increment; the predefined number ultimately depends on the visual size (e.g., pixel size) of the time increments on the time line and the size of the display (e.g., touch screen 12002), as the limit on the number of event thumbnails to be displayed is an accommodation to limited on-screen display space. In some embodiments, the thumbnail may not be a thumbnail image of the entire frame from the video feed, but rather may be a thumbnail image illustrating only a portion of a frame from the video feed. For example, the thumbnail image may be an image portion associated with a zone in which motion was detected. For another example, the thumbnail image may be an image portion associated with a person, pet, object, or other entity that was detected by way of classification mechanisms or otherwise. For another example, the thumbnail image may be an image portion associated with an event such as fire or smoke. For another example, the thumbnail image may be an image portion associated with other sensors located within field of view or otherwise associated with the camera and in response to sensor detections. For example, an image portion associated with the door in response to the door lock being actuated. Or an image portion associated with a window which is monitored by a window sensor in response to the window sensor being actuated (e.g., detecting a window break).

In FIG. 12M, in the timeline region 12040, alert event indicators 12202, 12204, 12206, and 12208 are aligned in one sub-section (the sub-section delineations not shown in the FIG. 12M) within the timeline region 12040, alert event indicators 12210 and 12212 are aligned in another sub-section in the timeline region 12040, and alert event indicators 12114 and 12116 are aligned in a third sub-section in the timeline region 12040. A time is shown digitally on time position marker 12048, indicating that the video feed displayed in the video region 12038 is non-live, historical video. While the non-live video feed is shown, a "go live" button or icon 12218 is displayed; the user may activate the "go live" button 12218 to jump to the current time in the timeline and live video in the video region 12038.

Along with the alert event indicators 12202, 12204, 12206, 12208, 12210, 12212, 12214, and 12216, event thumbnails 12220, 12222, and 12224 and event category icons 12226, 12228, 12230, 12232, and 12234 are displayed in the timeline region 12040. The event category icons indicate a type or category of an alert event (e.g., motion event, hazard event, sound event, thermostat event). Each of the event thumbnails is associated with an alert event indicator. Each of the event category icons is associated with an alert event indicator. The event thumbnails and the event category icons are visually linked to their associated alert event indicators by lines. For example, line 12236 connects event category icon 12226 to alert event indicator 12202, line 12238 connects event thumbnail 12220 to alert event indicator 12210, line 12240 connects event category icon 12228 and event thumbnail 12222 to alert event indicator 12212, line 12242 connects event category icon 12230 to alert event indicator 12204, line 12244 connects event category icon 12232 and event thumbnail 12224 to alert event indicator 12206, and line 12246 connects event category icon 12234 to alert event indicator 12208.

In some implementations, and as previously disclosed, viewing of the video feed (e.g., how much the user can view, what the user can do with the video feed) and other functionality may be restricted based on whether the user has a paid subscription. For example, viewing of historical content of the video feed beyond a certain day and/or time (e.g., viewing portions of the video feed that are older than six hours from the current time) may be restricted to subscribed users. When the user tries to view restricted content without a paid subscription, the smart home application may attempt to promote paid subscriptions to the user. For example, when the user tries to scroll the timeline past the restriction point, so that the time position marker 12048 marks a time past the restriction point, instead of displaying the corresponding portion of the video feed in the video region 12038, the user interface 12028 may display a prompt, pop-up, or other message to the user, informing the user that portions of the video feed beyond the restriction point is limited to paid subscribers and promoting a paid subscription to the user. Further, in some implementations, additional functionality limitations may be imposed on non-subscribers. For example, snapshots of event activity (e.g., frames from portions of the video feed with an alert event) are displayed in the video region 12038 to non-subscribers instead of playback of the video feed. In some implementations, there are multiple subscription tiers for the service, and the functionality and storage limitations and restrictions depend on the particular subscription tier (e.g., the number of days for which video is retained and stored depends on the particular subscription tier).

As described above with reference to FIG. 12F, a user may scroll the timeline backwards or forwards with a gesture on the timeline region 12040. In some implementations, the scrolling is based also on the type of gesture detected by the smart home application. For example, the gesture may be a dragging gesture or a swipe (or flick) gesture. In a drag gesture, the contact stays on and moves on the touch screen 12002, and the timeline scrolls in accordance with the movement of the contact, as if the contact is dragging the timeline along. In a swipe or flick gesture, the contact moves on and releases from the touch screen 12002 quickly, and the timeline scrolls in the direction of the contact's movement with a decaying speed, e.g., the timeline scrolls with inertial scrolling.

When the gesture is a dragging gesture, frames of the extracted-frames video version of the video feed may be displayed in the video region 12038 as the timeline scrolls relative to the time position marker 12048. In some implementations, depending on the speed of the gesture (and thus the speed of the scrolling), some frames of the extracted-frames video may be omitted from display as the timeline scrolls past the time position marker 12048, so that the display of the frames can keep pace with the scrolling of the timeline.

When the gesture is a swipe gesture, frames of the extracted-frames video are displayed in the video region 12038 as the timeline scrolls, with inertial scrolling, relative to the time position marker 12048. In some implementations, as with the scrolling caused by a dragging gesture, some frames of the extracted-frames video may be omitted from display as the timeline scrolls past the time position marker 12048. Further, as the inertial scrolling of the timeline decays, less frames need to be omitted as the display of the frames of the extracted-frames video are better able to keep pace with the scrolling of the timeline.

In some implementations, an alert events summary view may be displayed. This view may be activated by activation of a predefined affordance (e.g., date indicator 12052, FIG. 12B). In some implementations, the summary view shows thumbnails of video portions corresponding to alert events arranged chronologically. As the view is scrolled up or down, the video portions are played one at a time. In some implementations, the summary view shows the timeline in miniature and thumbnails of video portions corresponding to alert events grouped by zone or event type. Within a respective zone or type, video portion thumbnails are ordered chronologically.

In some implementations, video feeds from multiple cameras 118 are displayed concurrently. For example, video feeds from up to four cameras 118 may be displayed in a two-by-two arrangement on a display (e.g., a display of a tablet computer device). A shared timeline for the video feeds may be displayed. The shared timeline includes a respective sub-section 12068 for each of the video feeds displayed.

In some implementations, an event thumbnail shows a cropped and zoomed-in version of the frame selected for the event thumbnail. The event thumbnail is cropped and zoomed-in to focus on an area of interest in the frame (e.g., motion activity).

Example Processes

Figure 13:
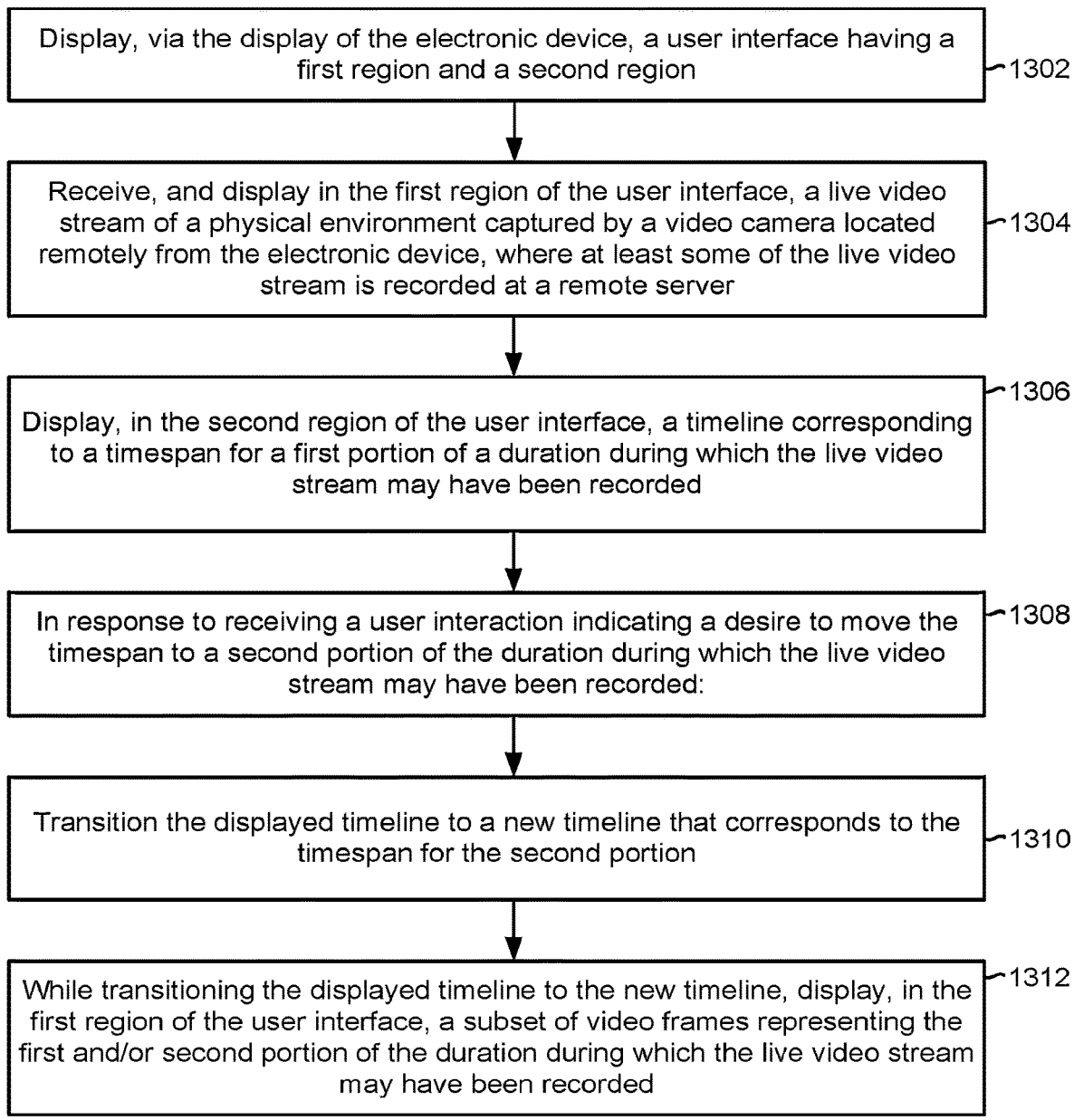
FIG. 13 illustrates a flowchart diagram of a method for presenting a timeline-video relationship, in accordance with some implementations.

FIG. 13 illustrates a flowchart diagram of a method 1300 for presenting a timeline-video relationship in accordance with some implementations. In some implementations, the method 1400 is performed at an electronic device with one or more processors, memory, a display (e.g., a computer display, a television display, a mobile device display, a touchscreen display), and optionally a touch-sensitive surface (e.g., a touchscreen display, a touchpad), an accelerometer, and/or an audio input device. For example, in some implementations, the method 1400 is performed by a client device 504 (FIGS. 5A-5B and 8A-8B) or 1504 (FIG. 15) in an operating environment (e.g., environment 500, 550, 1500) or one or more components thereof (e.g., client-side module 502, presentation module 821, input processing module 822, web browser module 823, application 824, user interface module 826). In some implementations, the method 1400 is governed by instructions that are stored in a non-transitory computer readable storage medium (e.g., the memory 806) and the instructions are executed by one or more processors of the electronic device (e.g., the CPUs 802).

The electronic device displays, via the display of the electronic device, a user interface having a first region and a second region (1302). The client device 504 displays a user interface 12028 on the touch screen 12002. The user interface 12028 includes a video region 12038 and a timeline region 12040.

The electronic device receives, and displays in the first region of the user interface, a live video stream of a physical environment captured by a video camera located remotely from the electronic device, wherein at least some of the live video stream is recorded at a remote server (1304). The client device 504 receives a video feed (e.g., video captured by camera 118) from a server system 508/552; the camera 118 transmits captured video to the server system 508/552, which stores the at least some of the video and transmits at least some of the video to the client device 504. The video feed is displayed in video region 12038 of the user interface 12028. In some implementations, the video feed includes a live video stream. In some implementations, the video feed includes recorded video of the live video stream (e.g., past recordings of the live video stream). The video feed is video of a physical environment captured by the camera 118, which is located remotely from the client device 504. The server 508/552 is also remotely located from the client device 504.

The electronic device displays, in the second region of the user interface, a timeline corresponding to a timespan for a first portion of a duration during which the live video stream may have been recorded (1306). The client device 504 displays in the timeline region 12040 of the user interface 12028 a timeline. The timeline includes multiple time increments 12050. The portion of the timeline displayed in the timeline region 12040 at a given instance, represented by the time increments 12050 displayed in the region 12040 at the given instance, corresponds to a timespan for a portion of a duration (e.g., a continuous time duration) during which the video feed may have been recorded (e.g., during the continuous time duration, video feed from the camera 118 may be recorded at the server system 508/552 or not recorded (e.g., because the camera 118 was turned off, camera 118 lost network connectivity, recording was beyond limits of the associated user's subscription tier)). In some implementations, the timespan is an amount or span of time (e.g., some number of hours) at a certain point in history (e.g., the duration). For example, the span of time between 3 AM to 10 AM on a certain day is a different timespan from the span of time between 10 AM to 3 PM on the same day, or from 3 AM to 10 AM on another day. A timespan in the timeline is the amount of time corresponding to the portion of the timeline that is displayed in the timeline region 12040 at any given moment.

In response to receiving a user interaction indicating a desire to move the timespan to a second portion of the duration during which the live video stream may have been recorded (1308), the electronic device transitions (1310) the displayed timeline to a new timeline that corresponds to the timespan for the second portion, and while transitioning the displayed timeline to the new timeline, displays (1312), in the first region of the user interface, a subset of video frames representing the first and/or second portion of the duration during which the live video stream may have been recorded. In response to a user interaction (e.g., a gesture 12064 on touchscreen display 12002) to move the timespan of the timeline to a second portion of the duration (e.g., to have timeline in the timeline region 12040 show another timespan with another set of time increments 12050; the user "scrubs" or scrolls the timeline), the client device 504 transitions the displayed timeline to another timespan with another set of time increments 12050 (e.g., scroll the timeline such that another timespan is displayed in the timeline region 12040). While transitioning the timeline, the client device 504 displays in the video region 12038 frames from the extracted-frames video(s) for the time duration portion(s) displayed in the timeline region 12040 during the transition; frames from the extracted-frames videos are displayed in the video region 12038 for the time period displayed in the timeline region 12040 while the timeline scrolls in accordance with the gesture.

In some implementations, the electronic device obtains the subset of video frames separately from receiving the live video stream. The client device 504 obtains the extracted-frames video separately from the video feed. The video feed and the extracted-frames video are separate transmissions from the server system 508/552 to the client device 504.

In some implementations, after the transitioning, the electronic device displays in the first region a recorded portion of the live video stream recorded during the second portion of the duration. After the transitioning (e.g., after the scrolling ends), the client device 504 plays the video feed in the video region 12038 (e.g., resume playback of the video feed) instead of displaying frames from the extracted-frames video. The portion of video feed where playback is resumed from is a portion associated with the time duration portion displayed in the timeline at the end of the scrolling.

In some implementations, the second portion of the duration includes the current time, and displaying in the first region a recorded portion of the live video stream includes displaying in the first region the live video stream. If the transition (e.g., the timeline scrolling) transitions the timeline to the current time (i.e., the end of the timeline closest to the current or present time), the client device 504 plays the live video stream in the video region 12038.

In some implementations, the user interaction includes a gesture (e.g., a gesture on touchscreen display 12002) configured to activate a scrolling effect on the timeline. The user interaction indicating the desire to move the span may be a gesture that activates a scrolling effect on the timeline.

In some implementations, the gesture is one of a swipe gesture or a dragging gesture. The scrolling gesture may be a swipe gesture or a dragging gesture in the timeline region 12040. Other gestures that may be configured to activate the scrolling effect include a flick gesture in the timeline region 12040 or a tap gesture on a predefined portion of the user interface 12028 (e.g., tap on the top of the user interface 12028 near the top edge of the touch screen 12002 or on a displayed affordance (e.g., "Go Live" affordance 12218) to have the timeline automatically scroll to the current time, tap on the bottom of the user interface 12028 near the bottom edge of the touch screen 12002 to have the timeline scroll automatically to the back limit of the timeline (e.g., time corresponding to the limit of possible video recording and storage time based on the user's subscription tier)).

In some implementations, the electronic device receives information indicating one or more alert events within the timespan, and in accordance with the alert events information, displays on the timeline an alert event indicator for each of the alert events within the timespan. The client device 504 receives alerts events information or data from the server system 508/552. In some implementations, the alert events information is received in the form of metadata. The alert events information include data indicating alert events that were detected by smart devices in the operating environment 500/550 during the time duration in the timeline. Alert event indicators (e.g., alert event indicators 12054, 12056, 12058, 12060, etc.) are displayed in the timeline for each alert event in the time duration in the timeline.

In some implementations, the subset of video frames includes a first sub-subset of video frames and a second sub-subset of video frames distinct from the first sub-subset, the first sub-subset of video frames is associated with an alert event of the alert events, the second sub-subset of video frames is associated with no alert event, the first sub-subset has a first frame rate, and the second sub-subset has a second frame rate lower than the first frame rate. When frames are extracted from the video feed, frames may be extracted at different rates depending on whether a frame is around or proximate in time to an alert event or cuepoint (e.g., associated with an alert event). Frames around or proximate in time to an alert event or cuepoint are extracted at a higher rate than frames not around or proximate to an alert event or cuepoint. When these frames are encoded into an extracted-frames video, the frames that were extracted at a higher rate become a set of frames within the extracted-frames video with a higher frame rate (i.e., more frames per unit time; the frames are denser) than the set of frames that were extracted at the lower rate (i.e., less frames per unit time; the frames are less dense). In some implementations, due to this difference in frame rate, when the timeline moves, in response to a timespan-moving user interaction, to a time with an alert event, more frames may be displayed than when the timeline moves in response to a timespan-moving user interaction to a time without an alert event; the higher frame rate in the set of frames proximate to the alert event/cuepoint supplies more frames for display than the lower frame rate set of frames not proximate to any alert event/cuepoint.

In some implementations, the alert event indicator for an alert event includes a pill object, the pill object has a length parallel to the timeline, and the length represents the duration of the alert event. The alert event indicator may be displayed as a pill graphical object with a length parallel to the timeline. For example, FIG. 12B shows alert event indicators 12054, 12056, 12058, and 12050 as pill objects with different lengths. The lengths represents the durations of the corresponding events. In some implementations, if an alert event indicator indicates an event without a specific duration or where duration is not relevant (e.g., a toggle from one state to another), the alert event indicator may be displayed as a pill object with a default length or as a pill object that has devolved into another shape (e.g., circular shape as with alert event indicator 12060).

In some implementations, the alert events include alert events of one or more alert event types, the types including one or more of: motion events in a defined zone, motion events not in a defined zone, hazard events, sound events, thermostat events, and door events. The alert events detected by the smart devices in the environment belong to one of multiple types, which may include motion events in a zone defined by a user (and, in some implementations, where motion in each defined zone is its own type), motion events not in a defined zone, hazard events (e.g., smoke, fire, gas leak, carbon monoxide), sound events (e.g., sudden sounds over a decibel threshold), thermostat events (e.g., change in ambient temperature, change in temperature settings), and door events (e.g., smart door lock engaged/disengaged, door open/closed).

In some implementations, an alert event indicator for an alert event of a first type of the alert event types differs from an alert event indicator for an alert event of a second type of the alert event types in at least one visual characteristic. In some implementations, the differing visual characteristic is color. Alert event indicators corresponding to different alert event types may be distinguished visually in the timeline region 12040 by differences in a visual characteristic. For example, alert event indicators may differ in color, where the color represents a respective alert event type.

In some implementations, alert event indicators of alert events types have different visual characteristics based on the smart device that detected the alert event. For example, alert events indicators for alert events detected by one smart device may have one color, and alert events indicators for alert events detected by another smart device may have a different color.

In some implementations, alert event indicators for alert events of a first type of the alert event types are arranged along a first linear path, parallel to the timeline, in the second region; alert event indicators for alert events of a second type of the alert event types are arranged along a second linear path, parallel to the first linear path and to the timeline, in the second region; and the first linear path and the second linear path are parallel to each other and to the timeline. Alert event indicators of different types may be arranged in respective parallel linear paths (e.g., columns) by alert event type in the timeline region 12040. For example, FIG. 12L shows indicators 12102, 12104, and 12106 (corresponding to one alert event type) in one linear path parallel to the timeline, indicators 12108 and 12110 (corresponding to another alert event type) in another linear path parallel to the timeline, and indicators 12112 and 12114 (corresponding to yet another alert event type) in yet another linear path parallel to the timeline. In some implementations, each linear path or column has its own sub-section (e.g., sub-sections 12068, FIG. 12G) in the timeline region 12040.

In some implementations, the electronic device 504 displays in the second region one or more event type icons. Each event type icon is associated with an alert event indicator and indicating an event type of an alert event to which the alert event indicator corresponds. Icons identifying alert event types (e.g., icons 12226, 12228, 12230, 12232, and 12234, FIG. 12M) may be displayed in the timeline region 12040. Each event type icon is associated with a respective alert event indicator, and is visually linked to the associated alert event indicator by a line (e.g., line 12236, 12242, 12246).

In some implementations, displaying the timeline includes displaying a plurality of consecutive time increments, the plurality of consecutive time increments corresponding to a cumulative time duration and not associated with any alert event. Further, while displaying the plurality of consecutive time increments, the electronic device displays in the second region a first affordance to collapse the plurality of consecutive time increments into a cumulative time increment in the timeline, the cumulative time increment corresponding to the cumulative time duration. The electronic device detects a user interaction activating the first affordance, and in response to detecting the user interaction activating the first affordance, replaces display of the plurality of consecutive time increments with display of the cumulative time increment. The client device 504 displays time increments in the timeline. For example, in FIG. 12I, one-hour increments are displayed in the timeline in the timeline region 12040. In some implementations, an increment with one or more alert events (e.g., the 9 AM increment starting at marker 12050-B in FIG. 12I) takes up more space in the timeline region 12040 than a time increment without an alert event (e.g., the 3 AM increment between markers 12050-M and 12050-L in FIG. 12I). When there are multiple consecutive time increments that do not have alert events (e.g., the six one-hour increments between markers 12050-B and 12050-M, FIGS. 12I-12J), an affordance (e.g., affordance 12084) for condensing or collapsing these increments into one increment equivalent in time (e.g., condense the six one-hour increments into a 6-hour increment corresponding to marker 12092, FIG. 12K) is displayed. In some implementations, the client device 504 determines whether there are multiple consecutive time increments without alert events. In response to a user interaction on the touch screen 12002 to activate the affordance (e.g., gesture 12086 on touchscreen display 12002 over affordance 12084, FIG. 12J), the consecutive increments are replaced in the timeline region 12040 with an equivalent increment (e.g., the six one-hour increments are replaced with a 6-hour increment corresponding to marker 12092, FIG. 12K).

In some implementations, while displaying the cumulative time increment, the electronic device displays in the second region a second affordance to expand the cumulative time increment into the plurality of consecutive time increments, detects a user interaction activating the second affordance, and in response to detecting the user interaction activating the second affordance, replaces display of the cumulative time increment with display of the plurality of consecutive time increments. For example, as shown in FIG. 12K, while the equivalent increment is displayed as marker 12092, an affordance 12088 to expand is displayed in the timeline region 12040 (e.g., in proximity to the equivalent increment in the timeline). In response to a user interaction on the touch screen 12002 to activate the affordance (e.g., a tap gesture on touchscreen display 12002 over affordance 12088), the equivalent increment is replaced in the timeline region 12040 with the consecutive increments (e.g., the 6-hour increment corresponding to marker 12092 is replaced with the six one-hour increments between markers 12050-M and 12050-B).

In some implementations, the electronic device displays in the second region a thumbnail associated with a first alert event indicator of the alert event indicators, where the thumbnail is displayed proximate to the first alert event indicator, and the thumbnail includes a frame from a recorded portion of the live video stream proximate in time to an alert event to which the first alert event indicator corresponds. One or more thumbnails (e.g., thumbnails 12116, 12118, 12120, FIG. 12L; thumbnails 12220, 12222, 12224, FIG. 12M) may be displayed in the timeline region 12040. Each displayed thumbnail is associated with a respective alert event indicator and displayed in proximity to the associated alert event indicator (e.g., in FIG. 12L, thumbnail 12116 is associated with alert event indicator 12108), and a thumbnail is visually linked to its associated alert event indicator by a line (e.g., thumbnail 12116 is linked to alert event indicator 12108 by line 12122). Each thumbnail includes a frame from a portion of the video feed proximate in time to the alert event of the associated alert event indicator. In some implementations, the frame in a thumbnail may be different from the frames in the extracted-frames video for the same time period.

In some implementations, the electronic device displays in the second region, for a predefined time increment unit on the timeline, up to a predefined number of thumbnails associated with respective alert event indicators. For example, for a one-hour increment in the timeline, there may be a limit of up to two thumbnails that may be displayed for alert event indicators in that one-hour increment. In some implementations, the limit is predefined (e.g., coded into the application). In some implementations, the limit scales based on the screen size (e.g., size of touch screen 12002, which depends on the particular client device) and how much of the screen space is occupied by the timeline region 12040.

In some implementations, the electronic device displays a time marker on the timeline. The client device 504 displays a time position marker 12048 in the timeline region 12040.

In some implementations, the time displayed with the time position marker 12048 and optionally with the date indicator 12052 is the time closest to the time on the timeline corresponding to the pixel position of the time position marker 12048 relative to the timeline. For example, if there are 360 pixels between a 10-PM-and-11-PM increment, if the time position marker 12048 aligns with the 180th pixel, the time "10:30:00 PM" is displayed as the time marked by the time position marker 12048. In some implementations, when the video feed is being played in the video region 12038, the time displayed is the timestamp of the frame of the video feed being played. In some implementations, while the user is interacting with the timeline to move the timespan (e.g., manually scrolling the timeline with a gesture on the touch screen 12002), there is no relationship between the time displayed with the time position marker 12048 and the frame of the extracted-frames video being displayed in video region 12038; the pixel position of the time position marker 12048 relative to the timeline governs the time that is displayed with the time position marker 12048.

In some implementations, in accordance with a determination that a time on the timeline marked by the time position marker 12048 corresponds to a respective alert event (e.g., the time position marker 12048 intersects with an alert event indicator) and the alert event is motion in a defined zone, the client device 504 highlights the defined zone while playing the portion of the video feed with the alert event. For example, in FIG. 12H, zones 12078, 12090, and 12082 are highlighted in the playing video feed in the video region 12038 when the time position marker 12048 intersects with alert event indicators 12054, 12056, and 12058.

In some implementations, the client device 504 requests frames of the extracted-frames video(s) from the server 508/552 as the user interacts with the timeline to move the timespan. The client device 504 may request frames from the server as needed or in blocks or intervals (e.g., 20-minutes blocks, one-hour blocks). In some implementations, frames of the extracted-frames video are requested based on a sliding window around the current manual scrolling position; the frames are decoded for display based on the sliding window as well. In some implementations, frames of the extracted-frames video are requested independently of the scrolling position (e.g., continuously or periodically requested and streamed to the client device).

In some implementations, when the video feed is playing in the video region 12038 (i.e., whenever the user is not interacting with the timeline to move the timespan and the video feed is not paused), the timespan moves along automatically; the timeline scrolls automatically as the video feed plays. The time position marker 12048, based on its position relative to the timeline, acts as a position marker in the video feed. The frames displayed while the video feed is played are frames of the video feed.

In some implementations, the ordering of the linear paths/columns/sub-sections of alert event indicators in the timeline region 12040 correspond to the ordering of defined zones in the video feed. For example, if there are three zones in the video feed going in a certain order from left to right, the columns for the alert event indicators corresponding to these zones have the same relative order going from left to right within the timeline region 12040.

In some implementations, a time increment with alert event(s) has a longer display length (e.g., the increment between markers 12050-A and 12050-B, FIG. 12B) in the timeline region 12040 than an increment without alert event(s) (e.g., the increment between markers 12050-B and 12050-C, FIG. 12B).

Example Screenshots

FIGS. 14A-14L illustrate example screenshots of user interfaces on a client device in accordance with some implementations. In some implementations, the user interfaces depicted in FIGS. 14A-14L are user interfaces for a smart home application on a client device (e.g., client device 504), such as a smart phone or a tablet computer.

Figure 14A:
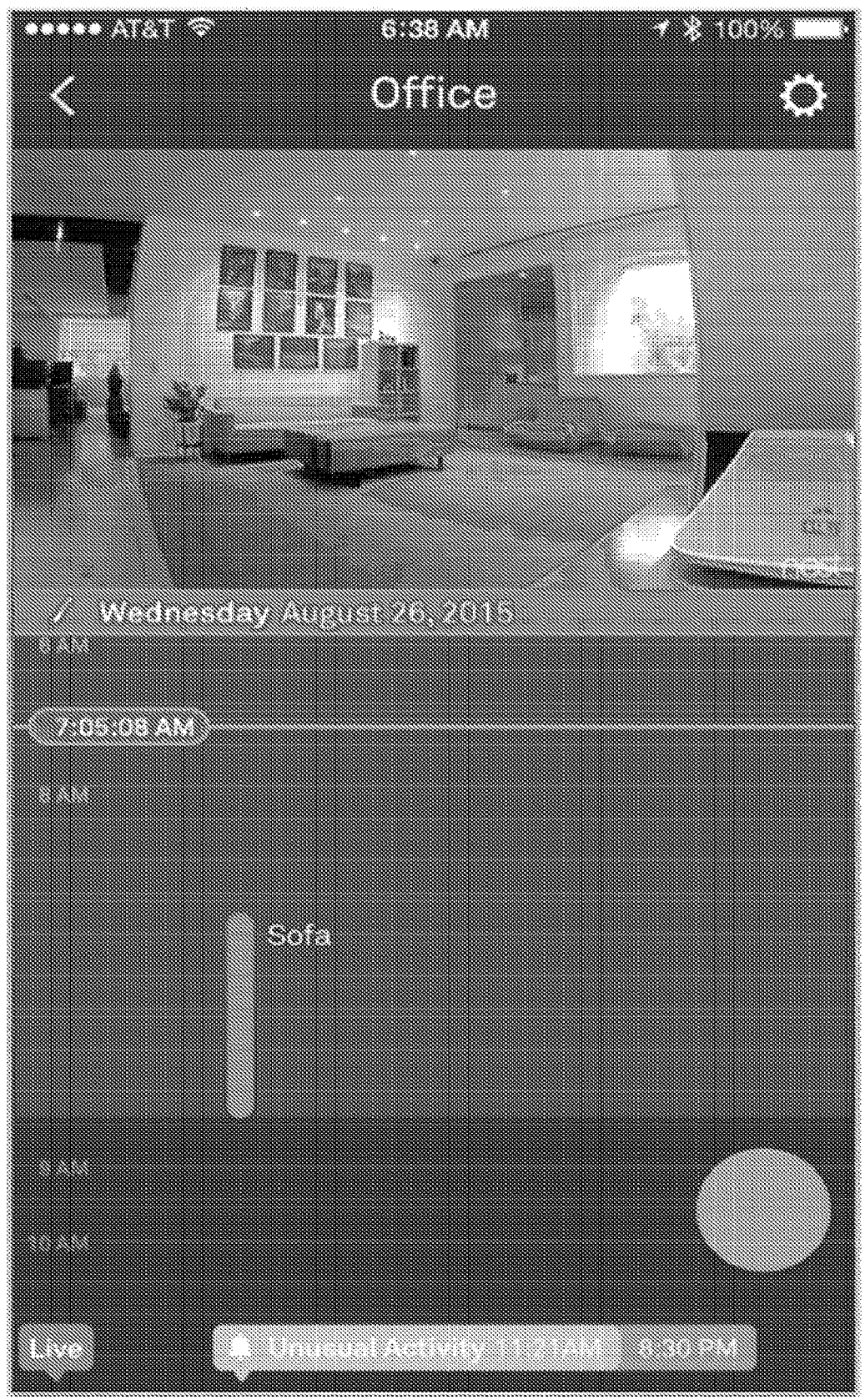
FIGS. 14A-14L illustrate example screenshots of user interfaces on a client device in accordance with some implementations.

FIG. 14A illustrates a user interface with a video region and a timeline in a timeline region. The flow of time in the timeline goes from top to bottom. The timeline is being manipulated by the user, and the time position marker is marking a time in the past that doesn't have an alert event. The 8-AM to 9-AM increment, which includes an alert event, occupies more display length than the 9-AM to 10-AM segment, which does not include an alert event.

Figure 14B:

FIG. 14B illustrates the timeline being manipulated by the user, such that the time position marker is marking a time in the past with an alert event; the time position marker overlaps with an alert event indicator. The zone corresponding to the alert event is highlighted in the video.

Figure 14C:
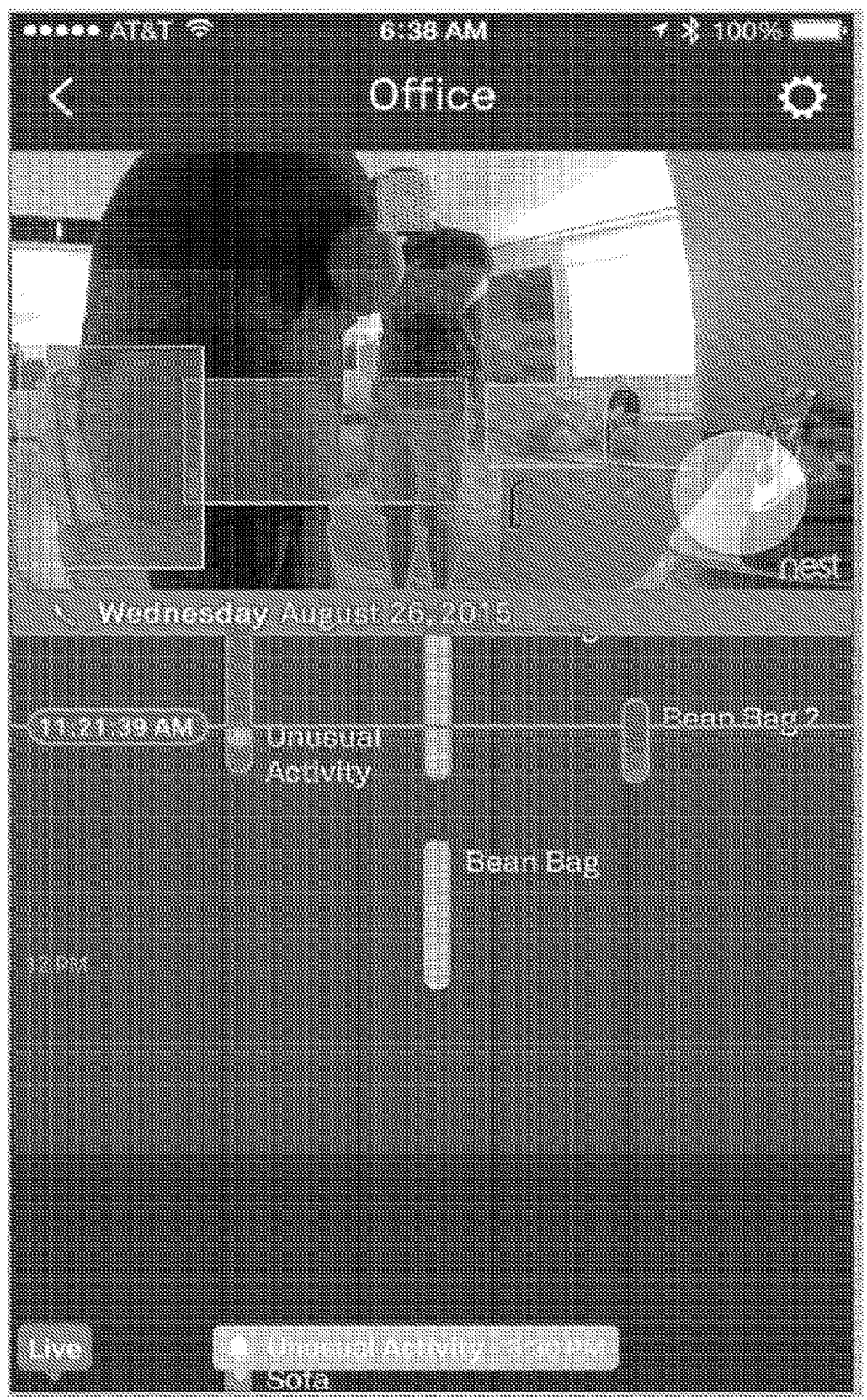

FIG. 14C illustrates the time position marker is marking a time in the past with multiple, concurrent alert events; the time position marker overlaps with multiple alert event indicators. The zones corresponding to the concurrent alert events are highlighted in the video.

Figure 14D:
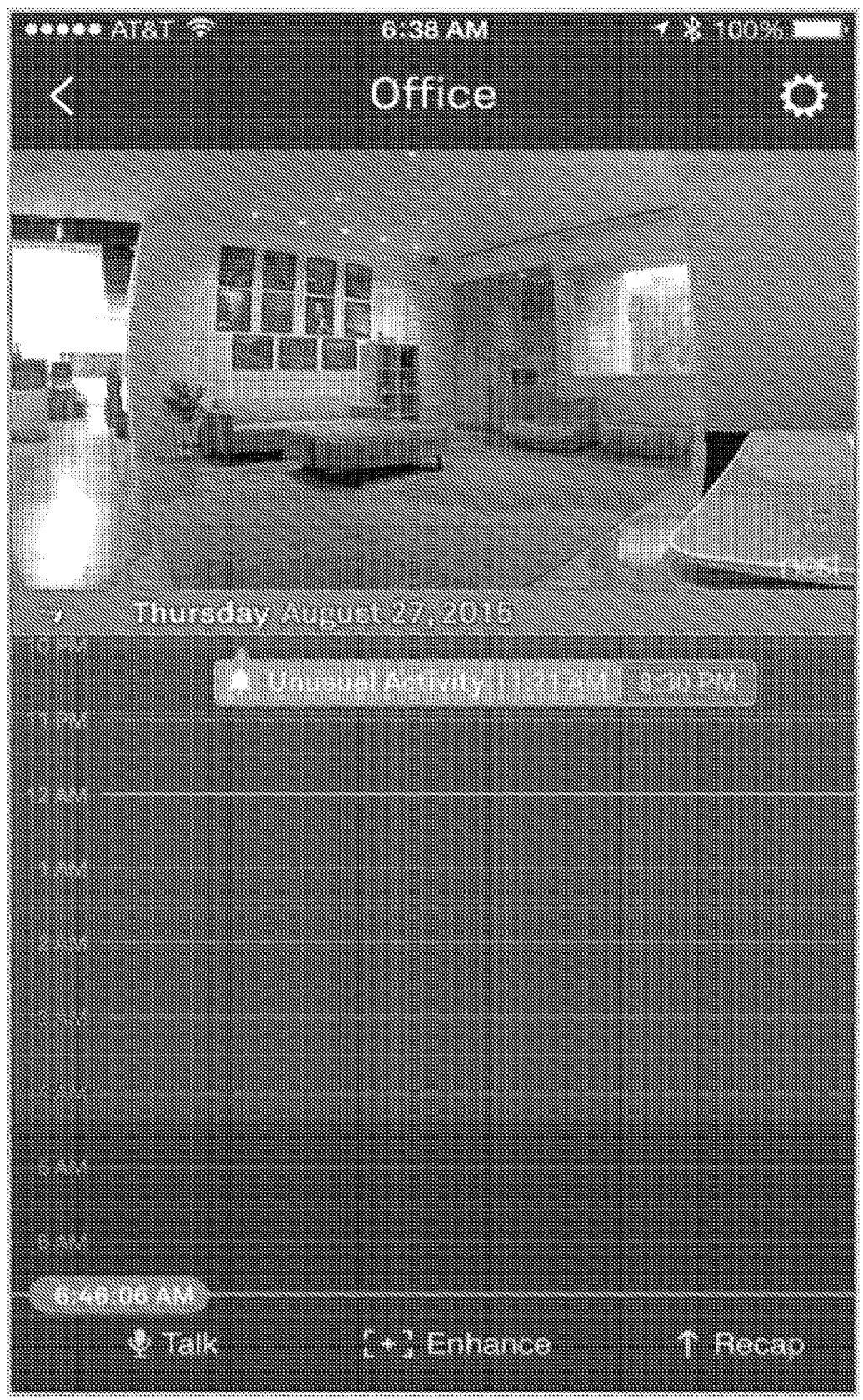

FIG. 14D illustrates the time position marker is marking the present time; the video is a live video stream.

Figure 14E:
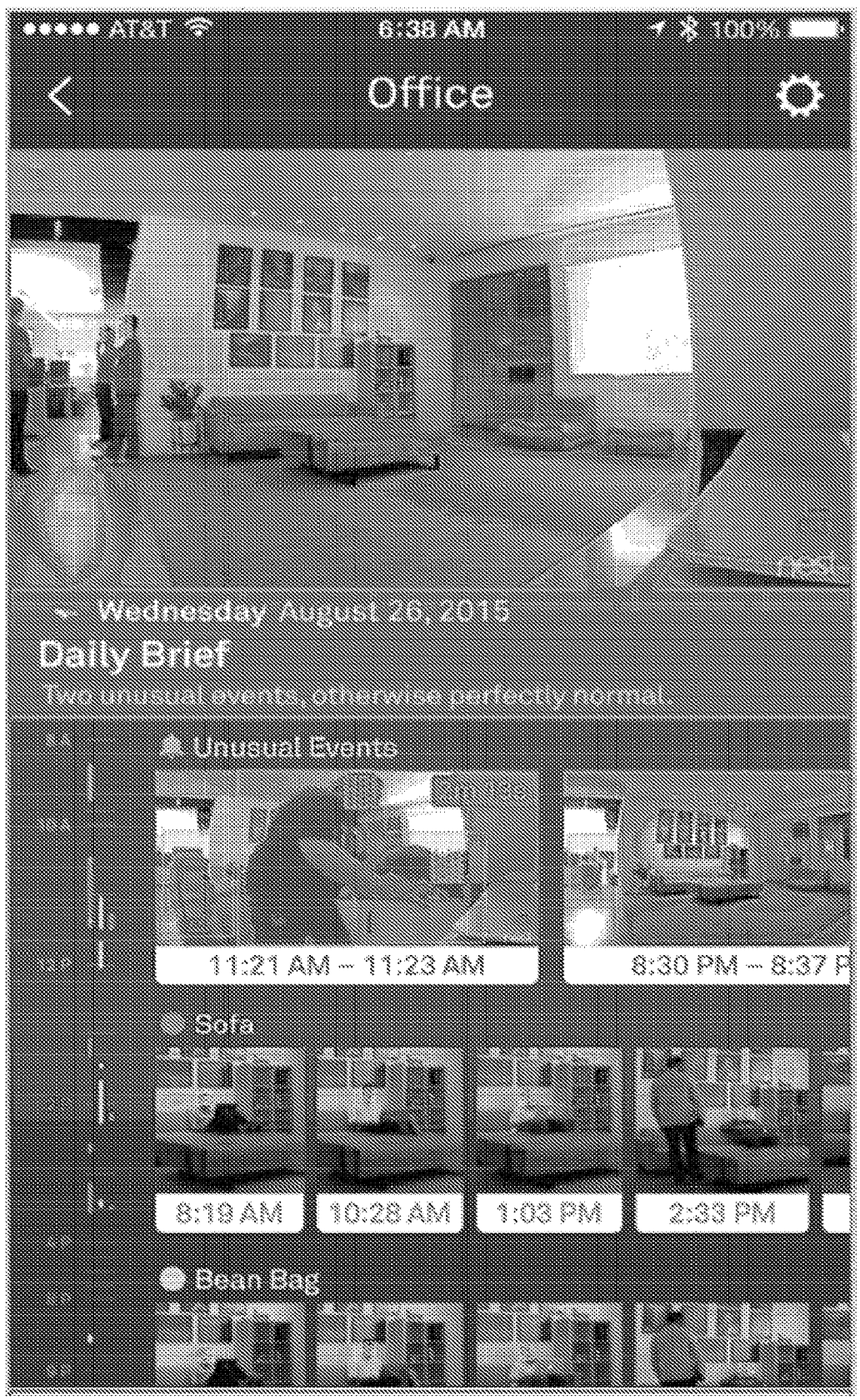

FIG. 14E illustrates an alert events summary, or "daily brief" view, which includes the timeline in miniature and to the side, and a summary of alert events for a time period (e.g., the last 24 hours, the current calendar day, etc.). The summary of alert events is presented as one or more sets of thumbnails of portions of the video feed that correspond to alert events. Each set corresponds to a by event type (where motion in a zone may count as an individual type). Within a set, the video feed portion thumbnails may be ordered chronologically or by importance of the alert event as determined by the server system. In some implementations, this summary view may be activated by the client-side module 502 (e.g., event review interface module 82810) at the client device (e.g., client device 504) in response to activation of a predefined affordance in the user interface at the client device by a user.

Figure 14F:
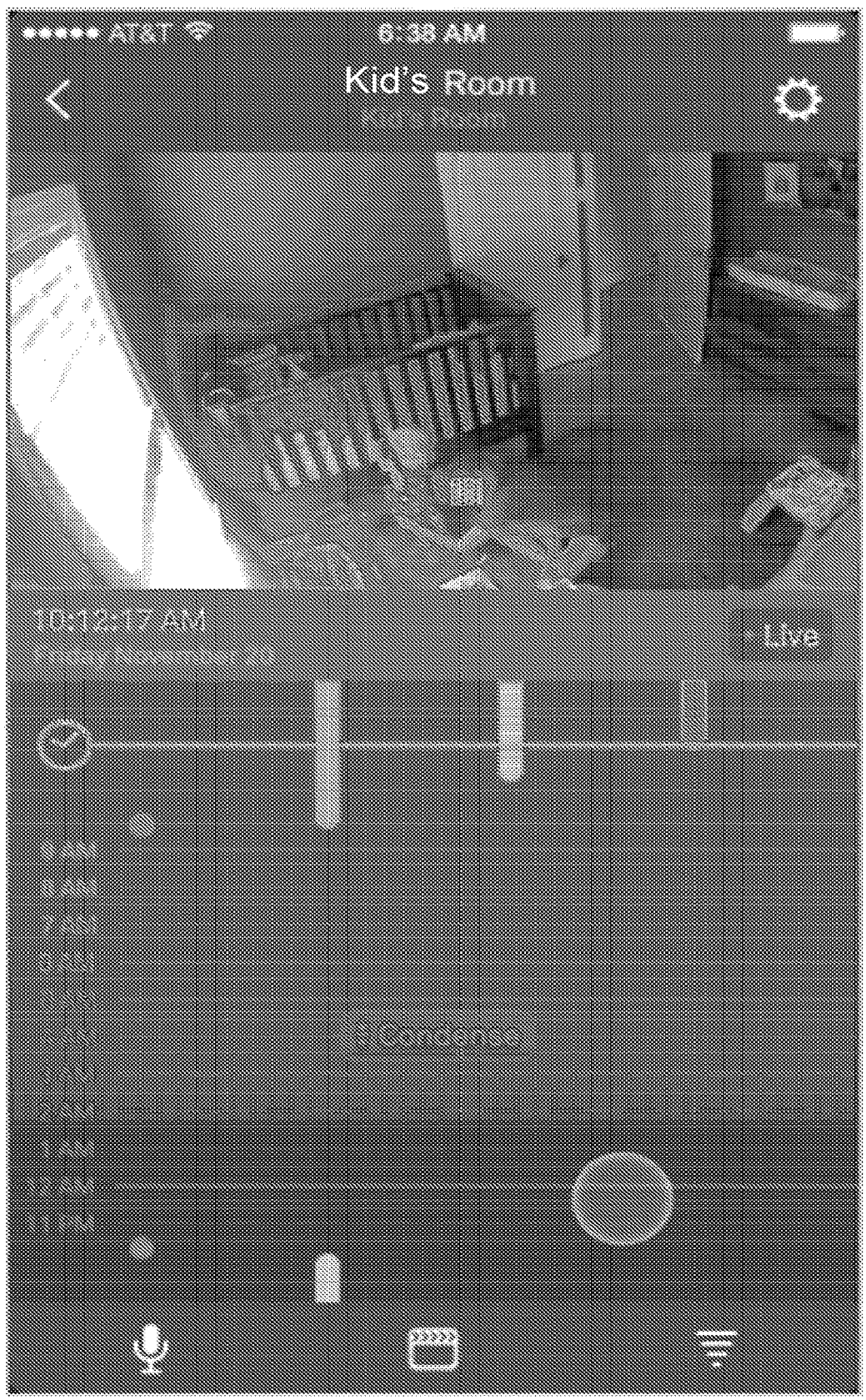

FIG. 14F illustrates a user interface with a video region and a timeline in a timeline region. The flow of time in the timeline goes from bottom to top. A "condense" affordance is displayed for a set of consecutive time increments without an alert event.

Figure 14G:
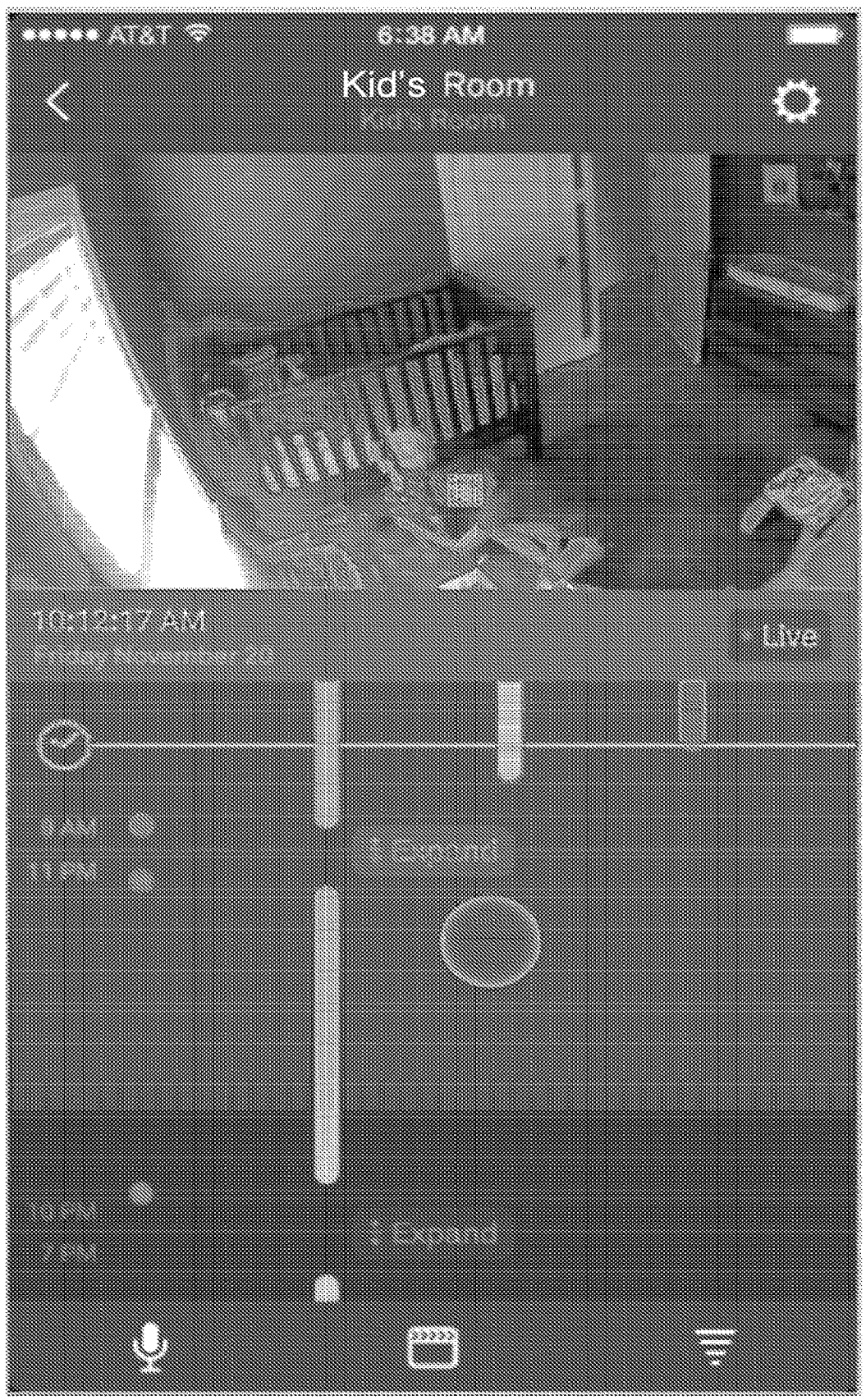

FIG. 14G illustrates the consecutive time increments without an alert event collapsed into an equivalent time increment marker as a result of activation of the "condense" affordance. An "expand" affordance is displayed for the collapsed equivalent time increment. Activation of the "expand" affordance reverses the collapsing.

Figure 14H:
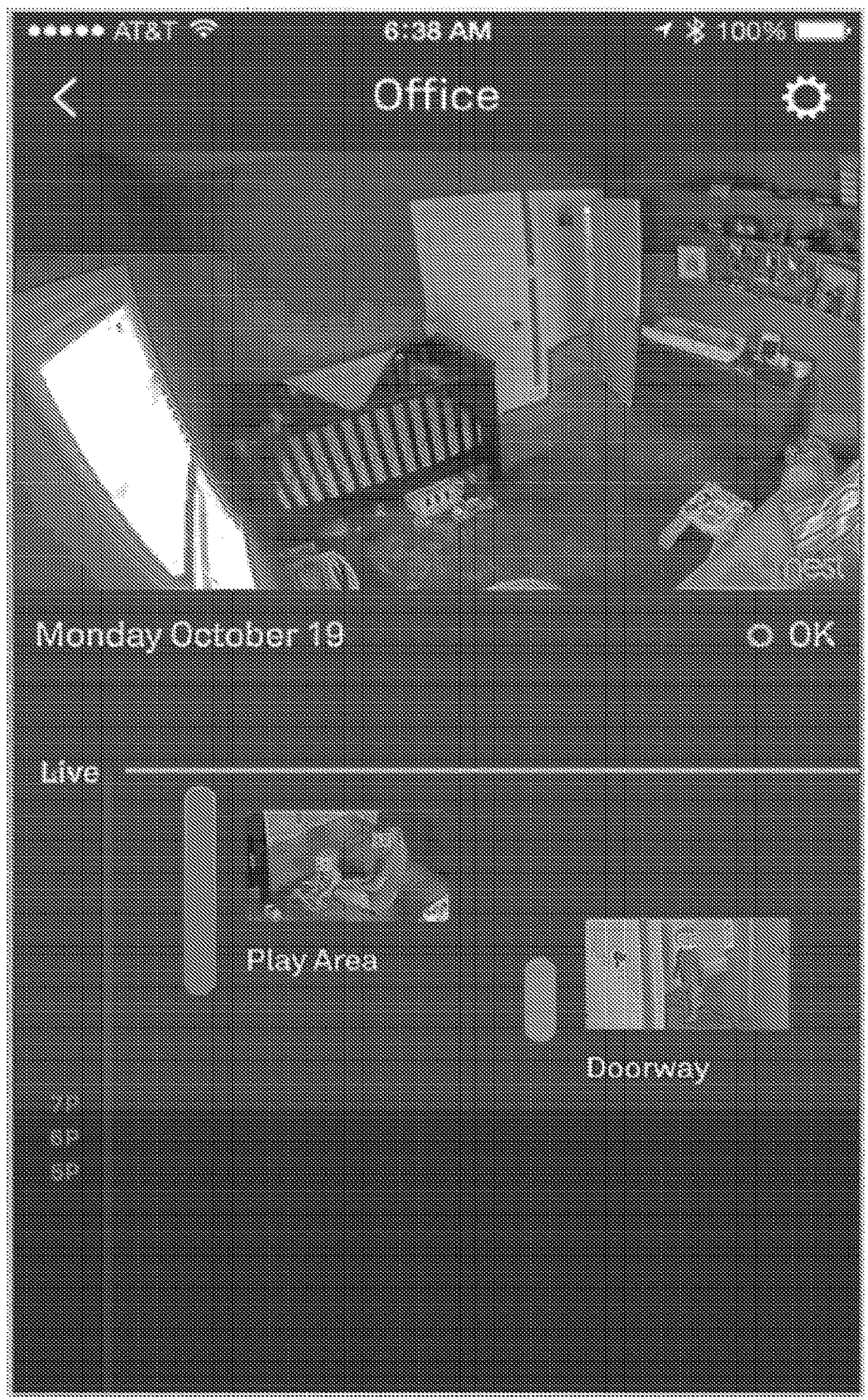

FIG. 14H illustrates respective alert event indicators corresponding to respective alert events displayed on the timeline, and thumbnails of respective video portions corresponding to the respective alert events displayed adjacent to the corresponding alert event indicators.

Figure 14I:

FIG. 14I illustrates another example alert events summary view, with video portions corresponding to alert events ordered chronologically. The videos are played one at a time as the summary view is scrolled up or down.

Figure 14J:
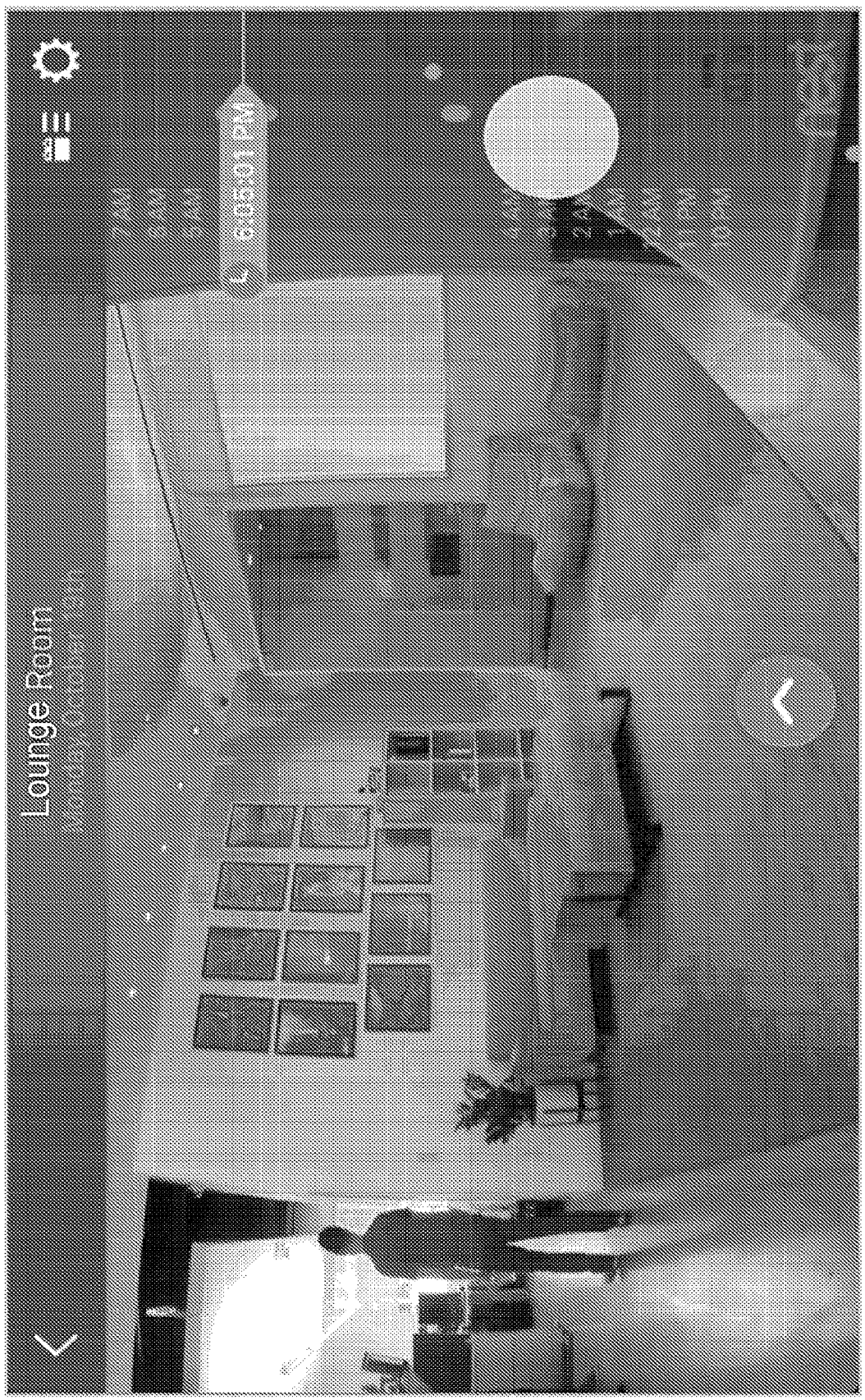

FIG. 14J illustrates a video view in landscape orientation, with the timeline as an overlay on the right side.

Figure 14K:

FIG. 14K illustrates a user interface with a video region and a timeline in a timeline region. In the timeline region, event thumbnails are displayed along with alert event indicators. Each displayed thumbnail is associated with an alert event indicator, and is connected to that alert event indicator visually by a line. There are multiple columns of alert event indicators, and with different colors for the alert event indicators of each column (e.g., alert event indicators of a first column are colored gray, alert event indicators of a second column are colored red, and alert event indicators of a third column are colored light green).

Figure 14L:
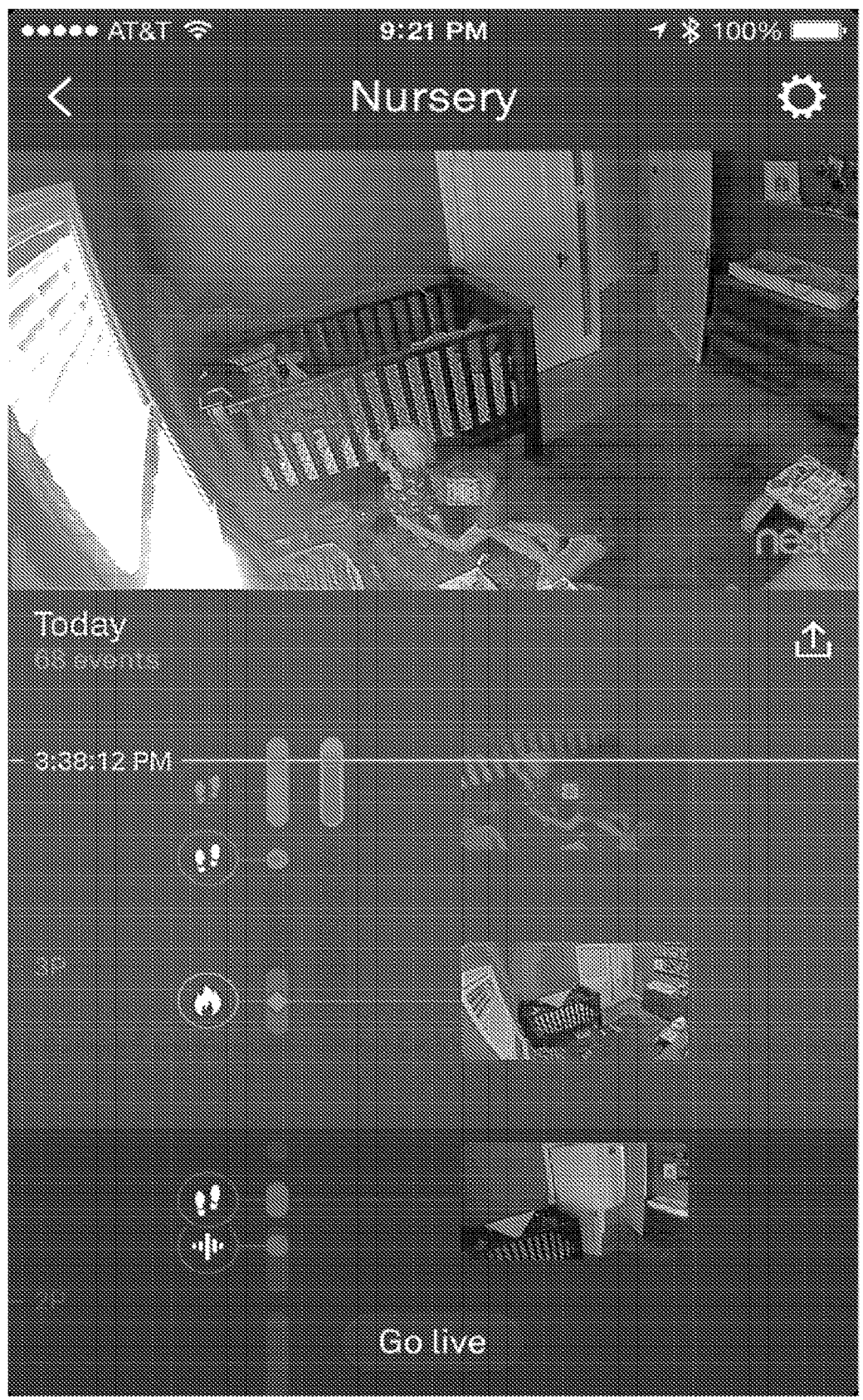

FIG. 14L illustrates a user interface with a video region and a timeline in a timeline region. In the timeline region, event category icons, as well as alert event indicators and event thumbnails, are displayed. Each displayed event category icon is associated with an alert event indicator and optionally a displayed event thumbnail, and is connected to that alert event indicator (and the optionally associated event thumbnail) visually by a line.

Example Operating Environment

Figure 15:
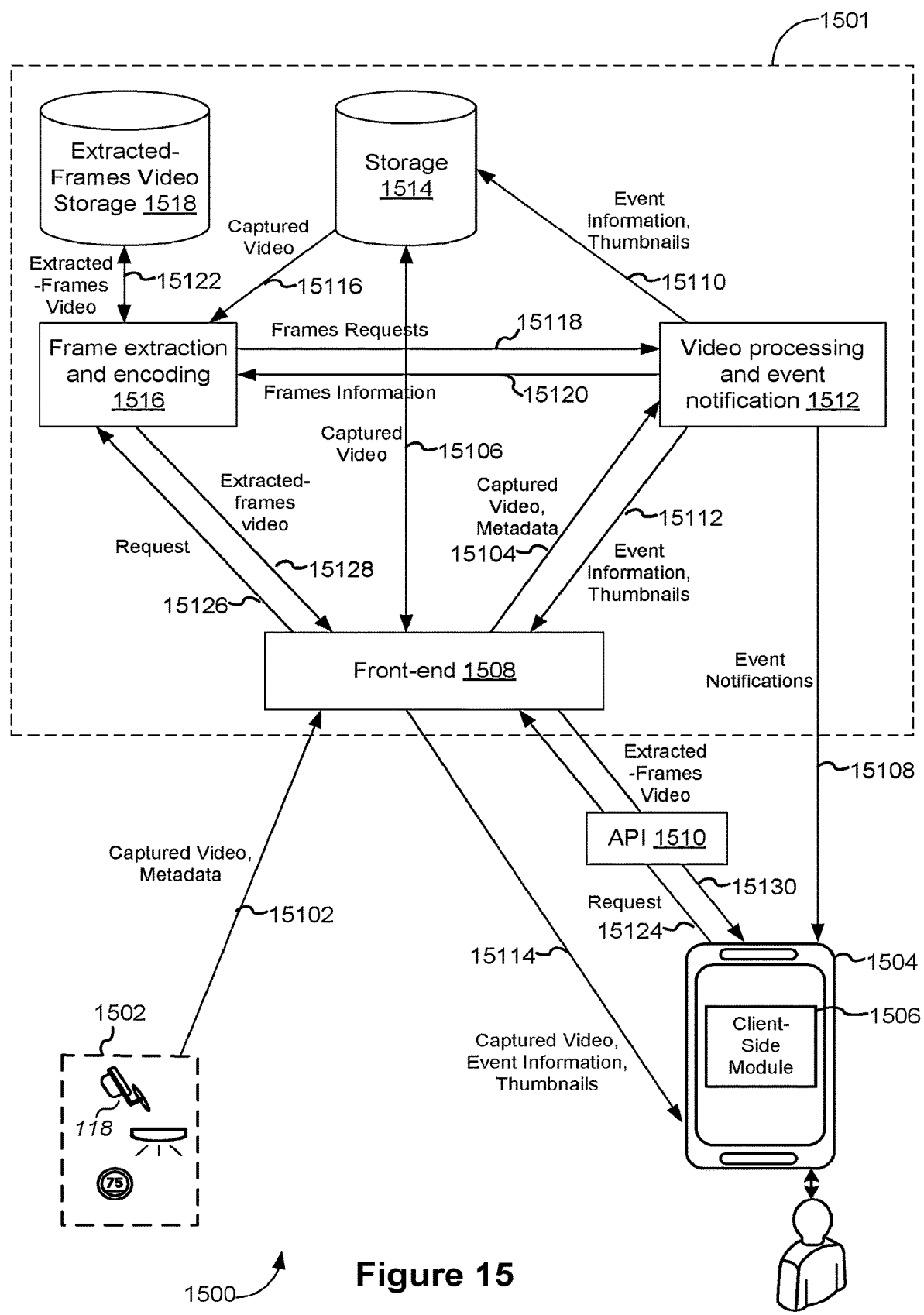
FIG. 15 is a block diagram illustrating an example operating environment in which a server system interacts with client devices and smart devices, in accordance with some implementations.

FIG. 15 illustrates an operating environment with a server system in communication with client devices and smart devices, in accordance with some implementations. The operating environment 1500 includes a server system 1501 that includes multiple modules. In some implementations, these modules may themselves be implemented as server systems. In some implementations, video server system 552 and/or hub device server system 508 are implemented as server system 1501. In some implementations, operating environment 500 or 550 may be implemented in the form of operating environment 1500.

In the operating environment 1500, server system 1501 is communicatively coupled to one or more smart devices 1502 (e.g., smart devices 204, including camera 118) and one or more client devices 1504 (e.g., client device 504) with a client side module 1506 (e.g., client side module 502). The communicative coupling may be through one or more networks (e.g., networks 162), not shown in FIG. 15 for sake of convenience and brevity. The server system 1501 is remote from the smart device(s) 1502 and the client device(s) 1504. The smart device(s) 1502 and the client device 1504 are associated with a user and the use's corresponding user account.

The camera 118, when powered on and video capture is enabled, continuously captures video at a predetermined resolution (e.g., 1080 P, 4K). In some implementations, the camera 118 also performs motion detection pre-processing and/or other pre-processing on the captured video. If the camera performs pre-processing on the video, the camera 118 generates metadata associated with the captured video in accordance with the pre-processing.

The camera 118 transmits the captured video (raw or pre-processed) and the metadata (15102) to the server system 1501. Other smart devices 1502 (e.g., hazard detector, thermostat) also transmit metadata (15102) to the server system 1501. The metadata transmitted by the other devices include information on detected alerts or events.

At the server system 1501, the received video and metadata are received by a front end 1508. The front end 1508 transmits the received captured video and metadata (15104) to the video processing and event notification system 1512 for further processing, and (15106) to the storage system 1514 (e.g., a database system) for storage.

The video processing and event notification system 1512 performs various processing on the video. The video processing and event notification system 1512 also processes the received metadata to identify alerts and events. The video processing and event notification system 1512 processes the video to further detect alerts and events, such as motion events, and to correlate events identified from the metadata to portions of the video. The video processing and event notification system 1512 also selects frames of the video for use in event thumbnails, and generates the thumbnails from the selected frames. The video processing and event notification system 1512 also generates event notifications, in accordance with the events information contained in the metadata and obtained from the video processing, and transmits the event notifications (15108) to the client device 1504. Further, in some implementations, the video processing and event notification system 1512 identifies frames for extraction by the frame extraction and encoding system 1516 based on the events information.

In some implementations, the video processing and event notification system 1512 transmits the events information and the generated thumbnails (15110) to the storage database 1514 for storage. In some implementations, the video processing and event notification system 1512 also generates frames information based on the events information; the frames information indicates timestamps of frames to be extracted for use in the generation of extracted-frames videos.

In some implementations, for a given camera 118, the captured video and corresponding metadata and event information that are stored in the storage system 1514 has a upper limit. What the upper limit is for the given camera 118 depends on whether the user account with which the camera 118 is associated includes a subscription to a video service with which the server system 1501 is associated. If the user account includes a subscription, the upper limit is higher than if the user account does not includes a subscription (e.g., the last 30 days with a subscription vs. the last 10 days without a subscription).

At the client device 1504, when a user is viewing the timeline for the camera 118 in the client-side module 1506 without manual scrubbing, the front end 1508 transmits captured video retrieved (15106) from the storage system 1514, and events information and event thumbnails obtained (15112) from the video processing and events notification system 1512 to the client 1504 (15114).

The frame extraction and encoding system 1516 extracts frames from the captured video and encodes the extracted frames into extracted-frames videos. The frame extraction and encoding system 1516 retrieves the captured video 15116 from storage system 1514 (or the front end 1518 transmits the captured video to the frame extraction and encoding system 1516 as well as to storage system 1514 and video processing and event notification system 1512), and extracts frames from the captured video. The frame extraction and encoding system 1516 generates extracted-frames video by encoding the extracted frames in a predetermined format (e.g., H.264) and stores the extracted-frames video in extracted-frames video storage system 1518 (15122).

In some implementations, the frame extraction and encoding system 1516 extracts frames from captured video (retrieved from storage system 1514) based on frames indicated by the video processing and event notification system 1512. The frame extraction and encoding system 1516 requests frames information (15118) from the video processing and event notification system 1512, and in response to the request, the video processing and event notification system 1512 transmits frames information (15120) to the frame extraction and encoding system 1516. The frame extraction and encoding system 1516 extracts the frames from the captured video in accordance with the fames information and encodes the frames to generate the extracted-frames videos.

The client-side module 1506 makes a request for extracted-frames video (15124) to the server system 1501 through an application programming interface 1510. In some implementations, the client-side module 1506 makes the request in response to a timeline scrolling input by a user. The front end 1508 transmits the request (15126) to the frame extraction and encoding system 1516, which retrieves the extracted-frames video (15122) from the extracted-frames video storage 1518, and transmits the extracted-frames video (15128) to the front end 1508, which transmits the extracted-frames video (15130) to the client device 1504.

In some implementations, the video processing and event notification system 1512 also selects frames from the video to serve as event thumbnails (e.g., event thumbnails 12116, 12118, 12120, 12220, 12222, 12224) for events. The video processing and event notification system 1512 processes the video and the metadata to identify event cuepoints and significant changes or transitions in the video, among other things. Based on identified cuepoints and significant changes, the video processing and event notification system 1512 selects, for an event, a frame to be a representative for the event, and generates the event thumbnail from the selected frame.

Frame Extraction and Encoding

As described above, the server system 1501 generates extracted-frames videos from the original video feeds. Extracted-frames video is displayed at the client device 1504 whenever a user is manually scrolling the timeline (including inertial scrolling stemming from manual scrolling, e.g., inertial scrolling from a swipe gesture), i.e., scrubbing the video feed, on the client device 1504. When the user is not scrolling the timeline (i.e., the video is left to play back automatically), the captured video is played.

Figure 16A:
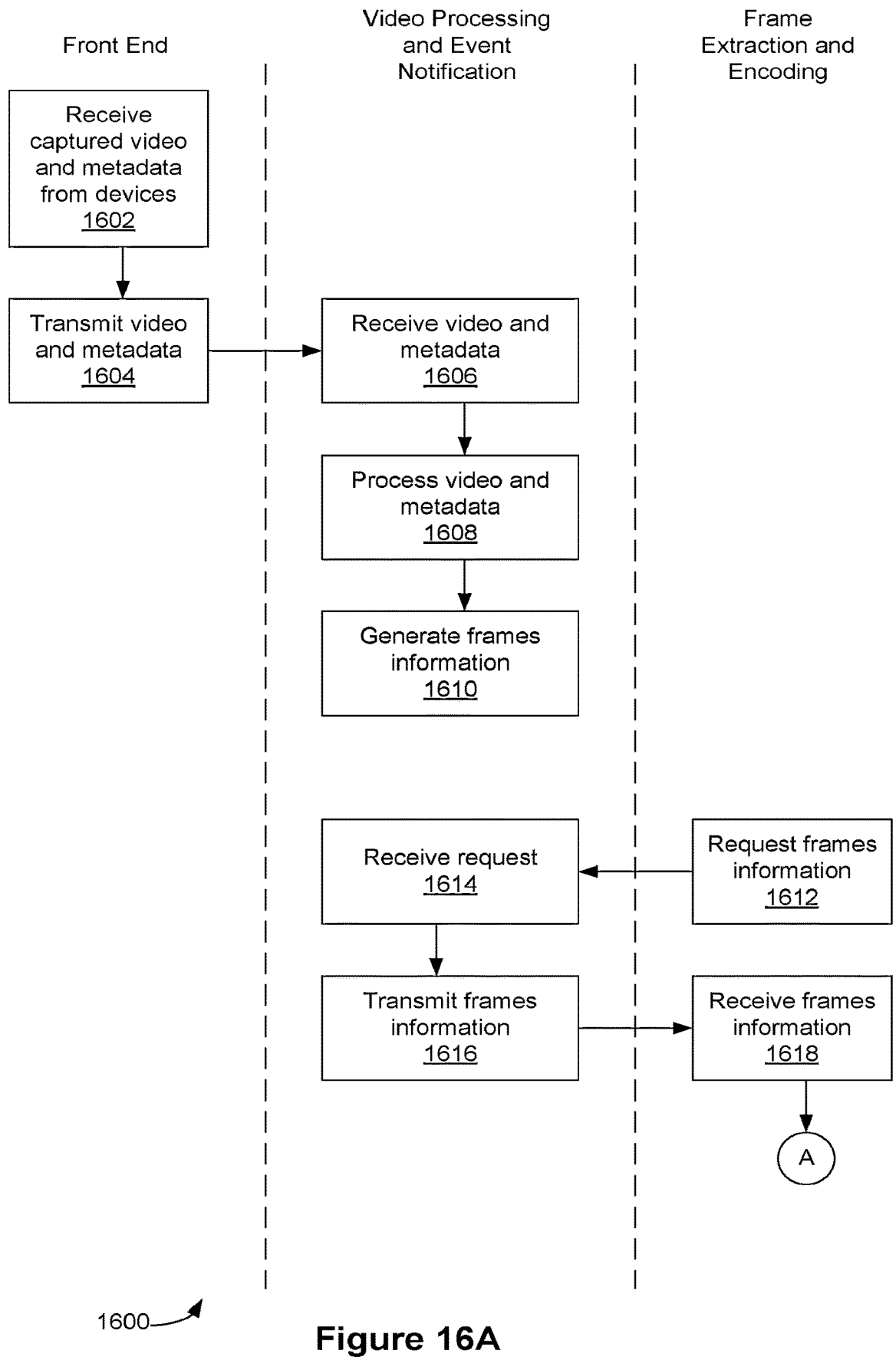
FIGS. 16A-16B illustrate a flow diagram of an example process for generating extracted-frames video in accordance with some implementations.
Figure 16B:
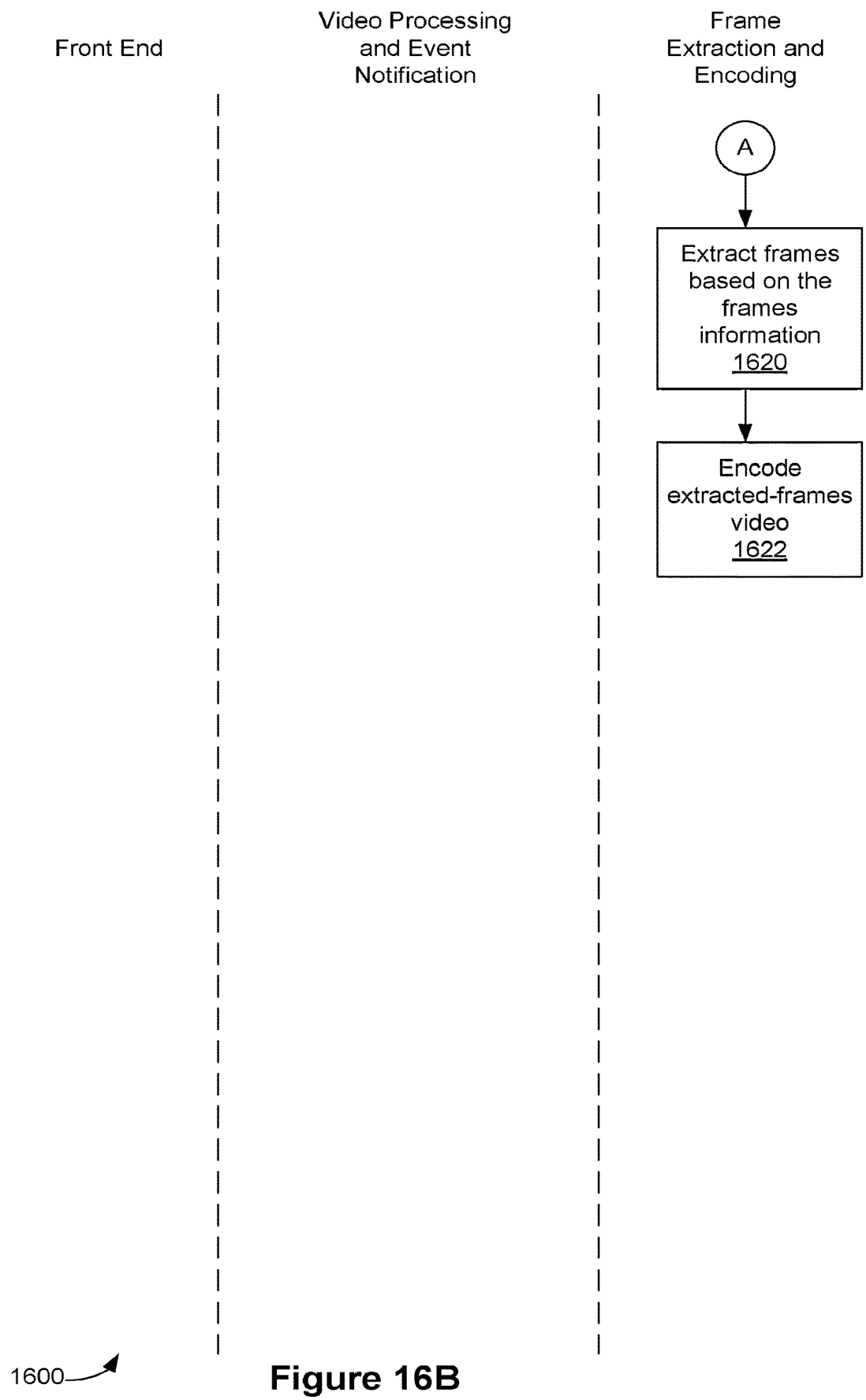

FIGS. 16A-16B illustrate a flow diagram of an example process 1600 for generating extracted-frames video in accordance with some implementations. In some implementations, the process 1600 is implemented in operating environment 1500.

The front end 1508 receives (1602) captured video and metadata from smart devices 1502. The front end 1508 receives raw or pre-processed captured video from a camera 118. The front end 1508 also receives event metadata from the camera 118 and other smart devices. The front end 1508 transmits (1604) the video and the metadata to the video processing and event notification system 1512 (hereinafter "video processing system" for convenience). The front end 1508 also transmits the video and optionally the metadata to a storage system 1514 for storage.

The video processing system 1512 receives (1606) captured video and metadata, and processes (1608) the video and the metadata. The video processing system 1512 analyzes the video to detect motion events (e.g., by determining cuepoints corresponding to motion events), and correlates portions of the video to events indicated in the metadata.

The video processing system 1512 generates (1610) frames information based on the processing of the video and the metadata. The video processing system 1512 generates frames information that identifies the frames for extraction in order to generate extracted-frames video. In some implementations, the frames information includes timestamps of the frames to be extracted.

In some implementations, blocks 1602, 1604, 1606, 1608, and 1610 are repeated periodically as video and metadata is continuously received from smart devices 1502.

The frame extraction and encoding system 1516 periodically requests (1612) frames information from the video processing system 1512. For example, requests may be made every minute, in order to generate extracted-frames video that covers up to the current time.

The video processing system 1512 receives (1614) the request and transmits (1616) the frames information to the frame extraction and encoding system 1516. The frame extraction and encoding system 1516 receives (1618) the frames information, and extracts (1620) frames from video retrieved from the storage system 1512 in accordance with the frames information. The frame extraction and encoding system 1516 encodes (1622) the extracted frames into extracted-frames video, which is stored in extracted-frames video storage system 1518.

Figure 17:
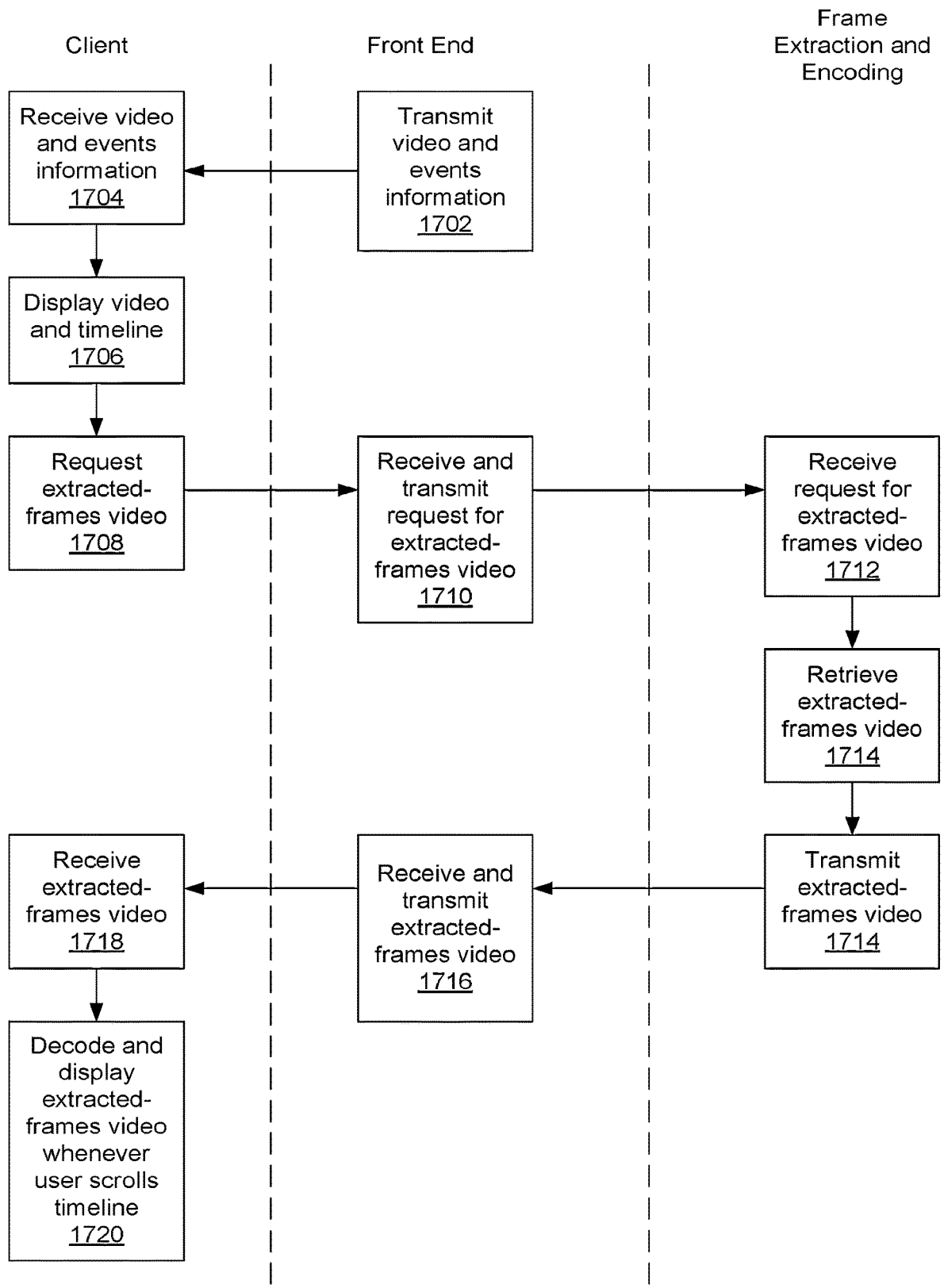
FIG. 17 illustrates a flow diagram of an example process for displaying extracted-frames video in accordance with some implementations.

FIG. 17 illustrates a flow diagram of an example process 1700 for displaying extracted-frames video in accordance with some implementations. In some implementations, the process 1700 is implemented in operating environment 1500.

The front end 1508 transmits (1702) video and events information to a client device 1504. For example, a live video feed and events information for display in a timeline format is streamed to the client device 1504. In some implementations, event thumbnails are also transmitted to the client device 1504.

The client device 1504 receives (1704) the video and events information, and displays (1706) the video and a timeline. The video is played back, and a timeline is displayed in accordance with the events information (e.g., the timeline is populated with alert events indicators and optionally event thumbnails, as in FIGS. 12B-12M).

The client device 1504 makes (1708) a request to the front end 1508 for extracted-frames video. In some implementations, the request is made through an API 1510. The request may be made periodically (e.g., every minute, every 20 minutes, every hour) and/or on-demand whenever user scrolling of the timeline is detected. In some implementations, the request is for the extracted-frames video for a certain time period or for a particular frame from the extracted-frames video for a certain time period.

The front end 1508 receives the request and transmits (1710) the request to the frame extraction and encoding system 1516. The frame extraction and encoding system 1516 receives (1712) the request, retrieves the requested extracted-frames video from the extracted-frames video storage system 1518, and transmits (1714) the retrieved video to the front end 1508. The front end 1508 receives the video and transmits (1716) the video to the client device 1504. The client device 1504 receives (1718) the extracted-frames video, and decodes and displays (1720) the extracted-frames video whenever the user scrolls the timeline. Extracted-frames video received by the client device 1504 may be cached (e.g., memory 806 as cached extracted-frames videos 836), so that multiple downloads of the same extracted-frames videos are reduced.

FIGS. 18A-18D illustrate diagrams showing an example frame extraction arrangement for a video feed segment and a frames arrangement in the corresponding extracted-frames video, in accordance with some implementations. For a given camera 118, extracted-frames video covering a predefined time period up to approximately the current time is stored in the extracted-frames video storage 1518. In some implementations, the predefined time period is the last 24 hours. Thus, there is extracted-frames video corresponding to the last 24 hours of the video feed.

In some implementations, extracted-frames video is generated from the video feed in segments, of predefined time length, of the predefined time period. In some implementations, each segment is 20 minutes long. In some implementations, each segment is 1 hour long.

Figure 18:
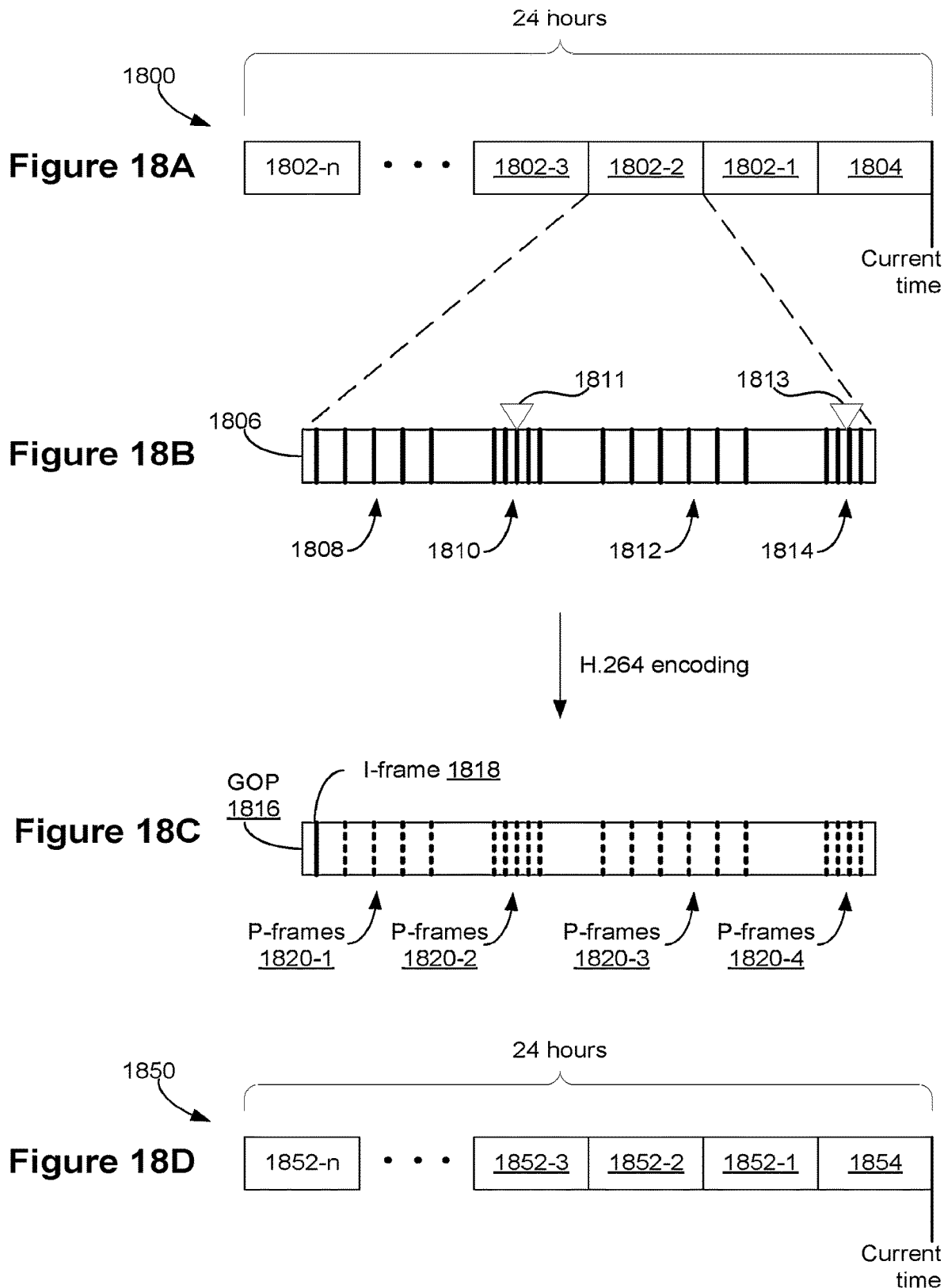
FIGS. 18A-18D illustrate diagrams showing an example frame extraction arrangement for a video feed segment and a frames arrangement in the corresponding extracted-frames video, in accordance with some implementations.

FIG. 18A is a diagram illustrating the last 24 hours of a video feed 1800 divided into past segments 1802-12 through 1802-n and a live segment 1804. Extracted-frames video is generated for each of these segments 1802 and 1804. In some implementations, as captured video is continuously received from the camera 118, an extracted-frames video for the live segment 1804 is generated and periodically updated (e.g., re-encoded with additional and possibly different frames in accordance with additional events information) until the extracted-frames video for the live segment 1804 covers the predefined segment time length. As the extracted-frames video for the live segment 1804 is periodically updated with new frames, the extracted-frames video for the live segment 1804 may have different frames minute-by-minute. When the extracted-frame video for the live segment covers the predefined segment time length, the extracted-frames video for the live segment 1804 is completed and becomes an extracted-frames video for a past segment 1802 (i.e., no longer updated); the live segments 1804 becomes the most recent past segment 1802. A new extracted-frames video for a new live segment 1804 is generated. As an analogy, the extracted-frames video for the live segment 1804 may be thought of as a cup that starts empty and is periodically being filled with water. When the cup is completely filled, the cup is moved aside and no longer being filled, and a new empty cup takes its place. Thus, each of the extracted-frames videos for the past segments 1802 is an extracted-frames video for a previously live segment, where the extracted-frames video has since been "locked-in" once the live segment becomes a past segment.

In some implementations, the predefined segment length is 20 minutes; the extracted-frames videos corresponding to the past segments 1802 are each 20 minutes long, and the extracted-frames video corresponding to the live segment 1804 grows from 0 minutes long until 20 minutes long. In some implementations, the predefined segment length is 60 minutes; the extracted-frames videos corresponding to the past segments 1802 are each 60 minutes long, and the extracted-frames video corresponding to the live segment 1804 grows from 0 minutes long until 60 minutes long.

In some implementations, frames are extracted from the video feed, for encoding of extracted-frames video, at a predefined average rate. The predefined average rate is, for example, 20 frames per 20 minutes or 60 frames per 60 minutes. Thus, if there are no events, a frame is extracted from the original video per minute.

In some implementations, the predefined average rate of frame extraction described above is also the constant rate of frame extraction. In these implementations, frames are extracted at the rate regardless of whether a frame is in proximity to a detected event or not. Also, in these implementations, frame may be extracted without first requesting frames information from the video processing system 1512 since the extraction rate is a predefined constant.

In some implementations, frames are extracted at variable rates based on events detected in the video feed and by other smart devices 204, such that more frames are extracted from the video feed in proximity to a detected event, while maintaining the predefined average rate. Thus, in proximity to an alert event (e.g., near a cuepoint), frames are extracted closer together. To maintain the average rate, frames are extracted farther apart in portions without alert events.

FIG. 18B includes a diagram 1806 illustrating frames of a segment (e.g., segment 1802-2) of the video feed 1800 that are indicated for extraction. In diagram 1806, cuepoints 1811 and 1813 were detected by the video processing system 1512. For the segment 1802-2, frame sets 1808, 1810, 1812, and 1814 are indicated for extraction in frames information generated by the video processing system 1512. The video processing system 1512 generates frames information that indicates the timestamps of each frame in the frame sets 1808, 1810, 1812, and 1814 for extraction. Frame sets 1810 and 1814 are in proximity to cuepoints 1811 and 1813, respectively, and thus the frames in those frame sets are closer together than the frames in frame sets 1808 and 1812. The frames not in proximity to detected events/cuepoints may be extracted at the predefined average rate, or at a rate even less than the predefined average rate (for a smoother transition between frames not in proximity to an event/cuepoint to frames in proximity to an event/cuepoint, and vice versa).

In some implementations, the encoding is done using the H.264 format. It should be appreciated that other encoding formats are possible.

The extracted-frames video, when encoded using the H.264 format, includes a "group of pictures" ("GOP"). FIG. 18C includes a diagram illustrating a GOP 1816 for the extracted-frames video encoded from frames extracted from segment 1802-2 in accordance with the frame indications in diagram 1806. The GOP 1816 includes an I-frame 1818 and P-frames 1820. The frames indicated in diagram 1806 are encoded into either an I-frame or a P-frame. The I-frame 1818 may be any one of the indicated frames in diagram 1806. The I-frame 1818 and P-frames 1820 follow the time spacing of the frame sets 1808, 1810, 1812, and 1814 as shown in FIG. 18B; frames in proximity to a detected event/cuepoint are closer together than frames not in proximity to a detected event/cuepoint. In some implementations, a P-frame expresses a delta or a difference from the I-frame; higher compression rates may be achieved by encoding the extracted-frames video as including a reference frame (the I-frame) and deltas from the reference frame (the P-frames).

In some implementations, a GOP may have multiple I-frames, and the P-frames within the GOP refer to a different I-frame within the GOP depending on their respective positions within the GOP. In some implementations, a GOP has a single I-frame and the P-frames within the GOP refer to the single I-frame.

FIG. 18D illustrates a set of extracted-frames videos 1850 corresponding to the last 24 hours of the video feed 1800 diagrammed in FIG. 18A. The extracted-frames videos 1850 include static (i.e., no longer updated) extracted-frames videos 1852 corresponding to the past segments 1802 and dynamic (i.e., periodically updated until grown to the predefined segment time length) extracted-frames video 1852 corresponding to the live segment 1804. Static extracted-frames video 1852-2 corresponds to segment 1802-2; static extracted-frames video 1852-2 includes the GOP 1816. Similarly, the other static extracted-frames videos 1852 also include their respective GOPs, and the dynamic extracted-frames video 1854 also includes a GOP. Extracted-frames video 1854 is periodically re-encoded by the frame extraction and encoding system 1516 to include additional frames and possibly different frames until the length of the extracted-frames video 1854 has grown to the predefined segment time length.

Figure 19:
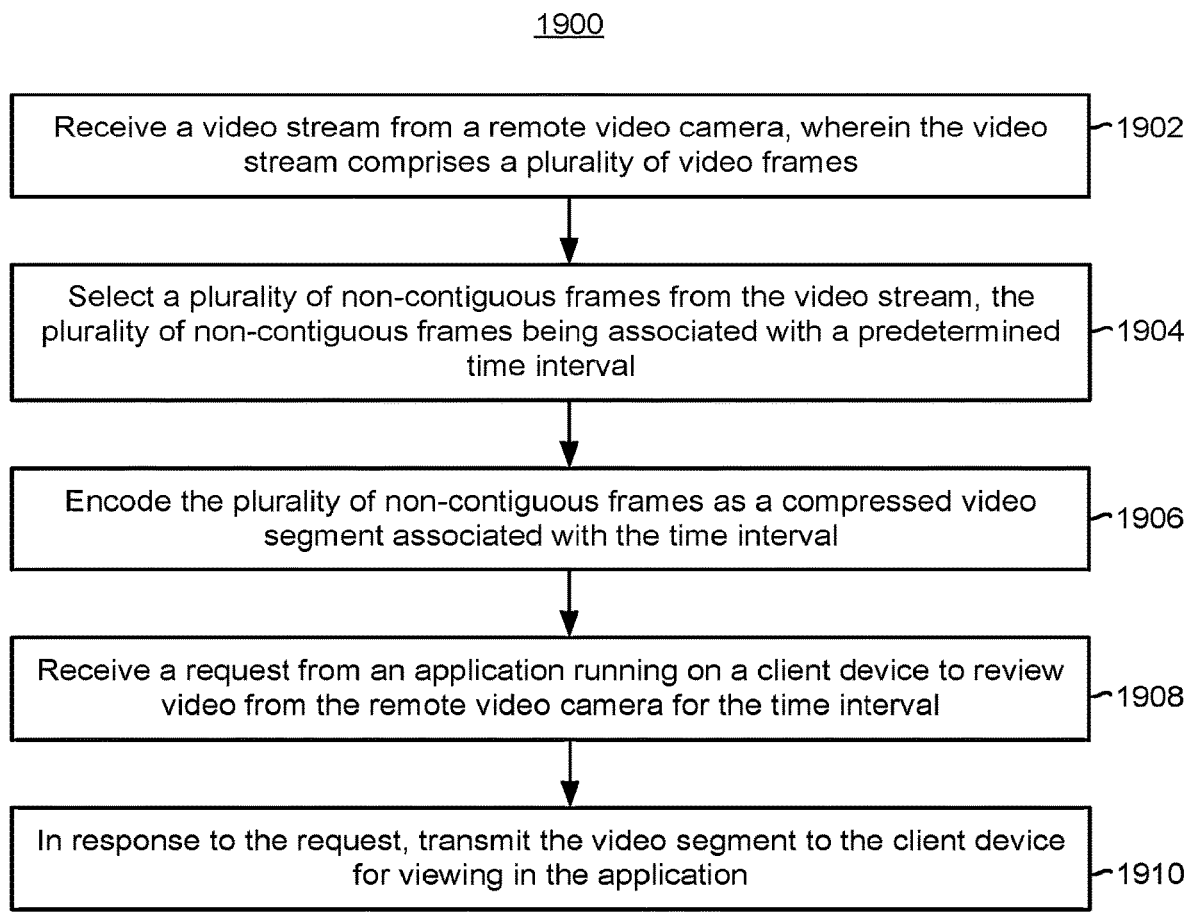
FIG. 19 is a flow diagram illustrating a method of generating and transmitting video for viewing at a client device, in accordance with some implementations.

FIG. 19 is a flow diagram illustrating a method 1900 of generating and transmitting video for viewing at a client device, in accordance with some implementations. In some implementations, the method 1900 is implemented at a server system 1501 in an operating environment 1500.

The server system receives (1902) a video stream from a remote video camera, where the video stream comprises a plurality of video frames. The server system 1502 (e.g., the front end 1508) receives a video feed (e.g., captured video) from a camera 118. The video feed includes many video frames (e.g., the video feed received is 1080 P video at 24 frames per second). The server system 1501 also receives metadata from the camera 118 and other smart devices 1502.

The server system selects (1904) a plurality of non-contiguous frames from the video stream, the plurality of non-contiguous frames being associated with a predetermined time interval. The video processing system 1512 processes the video feed and metadata to select and identify certain frames within a time interval (e.g., the interval corresponding to the current live segment 1804; the interval is predetermined at least to the extent that the interval has a predefined maximum length and the interval corresponds to a particular interval of actual time and date) for extraction. The frames are identified in accordance of an average rate of 1 frame per minute. Thus, at least some of the identified frames are non-contiguous, in that the identified frames are frames that do not immediately succeed one another in sequence in the video feed. The video processing system 1512 generates frames information with the selected and identified frames.

The server system encodes (1906) the plurality of non-contiguous frames as a compressed video segment associated with the time interval. The frame extraction and encoding system 1516 extracts the selected frames from the video feed and encodes the extracted frames, using a video compression format (e.g., H.264), into an extracted-frames video. In some implementations, the extracted-frames video has a lower resolution than the original video feed (e.g., 360 P for the extracted-frames video vs. 1080 P for the original video feed). In some implementations, the extracted-frames video has the same resolution than the original video feed. In some implementations, multiple versions of the extracted-frames video are encoded—one version with lower resolution than the original video feed and one with the same resolution as the original video feed.

The server system receives (1908) a request from an application running on a client device to review video from the remote video camera for the time interval. The front end 1508 receives a request from the client-side module 1506 of a client device 1504 for extracted-frames video associated with the camera 118 for the time interval. In some implementations, the request is made through an API 1510.

In response to the request, the server system transmits (1910) the video segment to the client device for viewing in the application. The server system 1501 transmits the extracted-frames video to the client device 1504, where the client-side module 1506 can decode the extracted-frames video for display in a user interface of the module.

In some implementations, the predetermined time interval has a length of one hour. In some implementations, the predetermined time interval has a length of twenty minutes. The extracted-frames video corresponds to a segment of the video feed with a predefined length of 20 minutes or an hour (or up to that predefined length if the segment is the live segment).

In some implementations, the non-contiguous frames are spaced evenly. If the frames are extracted at a constant rate (i.e., the frame selection does not take into account whether a frame is in proximity to a detected event/cuepoint), then the selected frames will be evenly spaced.

In some implementations, the non-contiguous frames are variably spaced in time, with frames in proximity to an event occurring in the video segment being spaced more closely than frames not in proximity to an event. The event may be a motion event detected in the video feed by the video processing system 1512 and/or camera 118 or an alert event such as hazard alarm as indicated in metadata transmitted by a smart device 1502. Frames selected for extraction may be closer together if the frames are in proximity to a detected event/cuepoint (e.g., frame sets 1810 and 1814, FIG. 18B).

In some implementations, the server system, prior to the encoding, processes the video stream to identify events; and in accordance with the processing, identifies one or more events, identifies a first time interval that includes at least a portion of an identified event, and identifies a second time interval that does not include any of the identified events, where both the first time interval and the second time interval have the same length. The video processing system 1512 processes the video feed and the metadata to identify events associated with the video (e.g., motion events in the video). The identified events are correlated to segments of the video feed, and certain segments may have one or more events and other segments may have no events.

In some implementations, the server system, for the first time interval, encodes a first number of non-contiguous frames as a compressed video segment associated with the first time interval; and for the second time interval, encodes a second number of non-contiguous frames as a compressed video segment associated with the second time interval, where the second number is less than the first number. The frame extraction and encoding system 1516 encodes extracted-frames video for a segment with one or more events to include more frames than for a segment without an event. More generally, in some implementations, more frames are extracted from portions of the video feed with an alert event (e.g., in proximity to an event/cuepoint) than from portions with an alert event. Thus, the portion of the extracted-frames video corresponding to the video feed portion with the alert event will have more frames than the portion of the extracted-frames video corresponding to the video feed portion without the alert event.

In some implementations, the server system, for the first time interval, encodes a plurality of contiguous frames as a compressed video segment associated with the first time interval, and for the second time interval, encodes a plurality of non-contiguous frames as a compressed video segment associated with the second time interval.

In some implementations, the server system receives event information from one or more of: the remote video camera, and one or more smart devices, and identifying one or more events includes identifying one or more events in accordance with the processing and the received event information. The server system 1501 receives metadata from camera 118 and other smart devices 1502. The metadata include information that indicates detected events or markers of events in the video or otherwise associated with the video (e.g., markers of detected motion in the video, alerts triggered).

In some implementations, the server system, prior to the encoding, receives event information from the remote video camera, wherein the event information is generated by the remote video camera processing the video stream. The camera 118 may pre-process the video feed to detect motion, and transmit metadata indicating the detected motion to the server system 1501.

In some implementations, the server system, prior to the encoding, receives event information from one or more smart devices. Other smart devices 1502 in the operating environment 1500 transmit metadata indicating events (e.g., alerts triggered) to the server system 1501. The metadata from the camera 118 and smart devices 1502 are used by the video processing system 1512 to detect and identify events and to correlate them with the video feed.

In some implementations, transmitting the video segment to the client device includes transmitting frames of the video segment, a plurality of frames of an immediately preceding video segment, and a plurality of frames of an immediately succeeding video segment. The extracted-frames video may be requested by the client module 1506 in sliding windows; wherever the marked time on the timeline is based on the user's scrolling of the timeline, the client module 1506 requests extracted-frames video frames for the marked time and some number of frames immediately before and some number for frames immediately after. In some implementations, the extracted-frames video is requested independently of the user's scrolling of the timeline. For example, the client device 1504 may periodically or continuously request frames of the extracted-frames video.

In some implementations, transmitting the video segment to the client device includes transmitting the frames corresponding to the video segment associated with the requested time interval. The extracted-frames video may be requested by the client module 1506 on demand; wherever the marked time on the timeline is based on the user's scrolling of the timeline, the client module 1506 requests extracted-frames video frames for the marked time as the user scrolls the timeline.

In some implementations, the video segment (e.g., the extracted-frames video) is encoded using a H.264 video compression format, and the encoded video segment includes I-frames and P-frames. In some implementations, the original video feed is also encoded using the H.264 video compression format; the original video feed also includes I-frames and P-frames. The server system, in response to a user ceasing to manually scrub through the video from the remote video camera at the client device, transmits an I-frame and P-frames of the original video feed to the client device for resumption of playback of the video feed at the client device; playback of the original video feed resumes from approximately the time corresponding to where the user ceased scrubbing on the timeline by decoding the nearest I-frame before that time and continuing from there. For extracted-frames videos, the server system transmits I-frames and P-frames of the extracted-frames video by request of the client device (e.g., in a sliding window around the scrubbing position or independently of the scrubbing position). As the user continues scrubbing the video feed, I-frames and P-frames of the extracted-frames video are decoded for display. In some implementations, when scrubbing is stopped, an I-frame of the extracted-frames video that is close in time to an I-frame of the original video feed is displayed in the video region 12038 before playback of the video feed resumes, so that playback of the video feed can be smoothly resumed from the last shown scrubbing position.

In some implementations, if the frame for the marked time is a P-frame, the corresponding I-frame may be transmitted also since I-frame is needed for decoding of the P-frame.

In some implementations, frames in the extracted-frames video are encoded in reverse chronological order (i.e., from more recent to less recent). For example, in an extracted-frames video that is encoded in reverse order, the frame closest to the present time is encoded as an I-frame, and frames preceding that frame in time are encoded in the reverse chronological order as P-frames. In this way, the ordering of the I-frames and P-frames in the extracted-frames video is consistent with backwards-in-time scrubbing by a user, which may reduce the number of requests for frames in the extracted-frames video whenever the user scrubs backwards in time.

In some implementations, when the user scrubs the timeline, the initial extracted-frames video frame(s) that are requested and displayed in the video region 12038 to the user depends on the direction of the user scrubbing. The frames requested are behind the direction of the user scrubbing. For example, if the scrubbing is going forward in time, the frames requested are a sequence of frames nearest to the scrubbing position that are backwards in time from to the scrubbing position. If the scrubbing is going backwards in time, the frames requested are a sequence of frames nearest to the scrubbing position that are forward in time from to the scrubbing position.

As described above, the video processing system 1512 processes the video feed and received metadata to detect and identify events (e.g., cuepoints in the video feed indicative of events). Using the information on the detected events, the video processing system 1512 selects and identifies frames of the video feed for extraction by the frame extraction and encoding system 1516, as well as selecting frames from which event thumbnails are generated. In some implementations, the processing performed by the video processing system 1512 includes detecting specifically persons (e.g., detecting faces) and detecting particular objects, as well as detecting anomalies between frames. Individual frames may be scored based on these detections. Based on the scores, cuepoints and event thumbnail frames are identified.

In some implementations, frames that are extracted for encoding into extracted-frames video are I-frames in the original video feed (which in some implementations is also encoded in accordance with the H.264 format and thus includes I-frames and P-frames), and P-frames in the video feed are excluded from the extraction and encoding of the extracted-frames video. When the user stops scrubbing (e.g., ceases the scrubbing input), the video feed resumes playback from the video feed I-frame that was displayed as an extracted-frames video frame when the scrubbing ceased. In this way, resumption of video feed playback from a stop in the scrubbing is smoother.

In some implementations, the I-frames of the video feed are identified by the server system 508/552/1501 (e.g., video processing and event notification system 1512) for extraction by the frame extraction and encoding system 1516. The I-frames of the video feed are scored in isolation by the video processing and event notification system 1512 based on one or more criteria (e.g., detection of person, detection of object of interest, detection of motion, position of the person/object/motion in the frame, etc.). When frames are requested for extraction, the I-frames are identified for extraction based multiple criteria. In some implementations, the criteria for identifying frames for extraction include, in order of priority, (1) the best scoring I-frames, (2) even spacing (i.e., constant frame extraction rate), and (3) coverage of alert events/cuepoints (e.g., each alert event/cuepoint has at least one frame identified for extraction). In some implementations, the even spacing criterion may be traded off for higher frame rate in proximity or around an alert event/cuepoint.

In some implementations, the identification of frames for extraction is performed using a greedy algorithm that optimizes the identified frames under one or more constraints. In some implementations, the constraints include minimum delta between frame times (two frames has to be at least a certain amount of time apart), minimizing gaps between frames, maximizing quality (e.g., best scoring), selecting frames from cuepoints, and choosing available frames.

In some implementations, a thumbnail is cropped and zoomed-in to focus on content of interest in the thumbnail. Frames of the video feed may be scored based on detection of faces, persons, and objects of interest in the frames. The server system 508/552/1501 (e.g., a frame scoring module within the video server 554, not shown, event detection module 7306) scores frames of the video feed on faces, persons, and objects of interest detected in the frames. This may include detecting the face, person, or object in a frame, determining a bounding box around the face/person/object, and scoring the bounding box. The best scoring frame for an alert event is selected by the server system 508/552 for use as the thumbnail to be displayed with the corresponding alert event indicator, and the thumbnail may be cropped and zoomed-in to focus on the bounding box.

As described above, in some implementations, there is a limit to how many thumbnails can be displayed for alert event indicators (e.g., up to two thumbnails per one-hour increment on the timeline). Alert events/cuepoints may be scored for importance by the server system 508/552/1501 based on one or more criteria, and thumbnails are displayed for the alert event indicators for the highest-importance alert events in accordance with the limit to how many thumbnails can be displayed. In this way, the user can see in the timeline visualizations of the highest-importance alert events. In some implementations, importance of alert events/cuepoints may also be used for the issuance of alert event notifications (e.g., emphasize notifying on alert events with high importance).

In some implementations, the criteria for determining or scoring importance include one or more of:

recent importance scores (e.g., a cuepoint is less important if a recent cuepoint was important);
likelihood (e.g., how rare is a cuepoint at this time of the week);
face/person/object detected;
anomaly (e.g., how rare are appearances of persons for this device or camera view);
motion probability (e.g., how much motion there was, likelihood the detected motion is a true positive, confidence that the detected motion is a true positive);
whether a notification or alert was sent for the alert event;
user implicit feedback (e.g., more scrubbing and other interaction on certain cuepoints vs. others); and
user explicit feedback.

In some implementations, the server system 508/552/1501 has (e.g., in memory 722) profiles of cameras 118. The profile of a camera 118 includes an aggregation of historical data for the camera 118, including historical data for detection of persons and activity (e.g., motion), amount of activity, and time of activity. When scoring an alert event or cuepoint in video captured by the camera 118, the alert event or cuepoint may be compared to the profile to determine whether a person or activity is anomalous, and the alert event/cuepoint is scored accordingly. For example, if the profile for a camera 118 indicates that persons rarely enter into the view of the camera 118, then a person detected in a cuepoint may be determined to be anomalous.

In some implementations, a thumbnail is guaranteed to be displayed for certain types of alert events. For example, a hazard event (e.g., smoke, carbon monoxide) in the timeline may be guaranteed to have a thumbnail. In accordance with the limit on the number of thumbnails in a time increment, the guaranteed thumbnail may be displayed at the expense of a thumbnail for an alert event/cuepoint that was otherwise scored highly. Similar thumbnail guarantee priority may be assigned by device in the operating environment (e.g., to a particular camera 118, to a particular smart device). In some implementations, the thumbnail guarantee priority (whether it be by alert event type or by device) is configurable by the user.

In some implementations, in the timeline region 12040, the position, on the timeline, of a line connecting a thumbnail to an alert event indicator corresponds to a cuepoint associated with the alert event indicator. In some implementations, a thumbnail that is displayed in the timeline region 12040 may be displayed in a manner such that the thumbnail is centered (vertically if the timeline is vertical, horizontally if the timeline is horizontal) about a cuepoint (e.g., the line connecting the thumbnail to an associated alert event indicator). For example, in FIG. 12L, the position of the line 12122 on the timeline corresponds to a cuepoint, and the thumbnail 12116 is vertically centered about the line 12122 (i.e., the line 12122 and the vertical center of the thumbnail 12116 are aligned). As another example, in FIG. 12M, the position of the line 12238 on the timeline corresponds to a cuepoint, and the thumbnail 12220 is vertically centered about the line 12238 (i.e., the line 12238 and the vertical center of the thumbnail 12220 are aligned).

In some implementations, one or more of the thumbnails may be displayed in a manner such that they are not centered about their associated cuepoints (e.g., in FIG. 12M, line 12240 and the vertical center of thumbnail 12222 are not aligned), while the locations of the cuepoints are maintained. In this way, the likelihood of displayed thumbnails overlapping with each other due to the centering and other factors, such as screen size constraints and the density of cuepoints on the timeline, is reduced. The client device 504 (e.g., the client module 502) may use any of multiple strategies to adjust the centering (and/or other positioning parameters) of the thumbnails in the timeline region 12040 to reduce the likelihood of thumbnail overlap. For example, in some implementations, the client device 504 may maximize the number of thumbnails that are centered, and minimize the number of thumbnails that are not centered. In some implementations, the client device 504 may maximize the number of thumbnails that are centered and located at the edges of the screen or of the timeline region 12040, while allowing thumbnails in the middle of the screen or of the timeline region 12040 to float (e.g., be not centered). In some implementations, the client device 504 may adjust the positioning of the thumbnails so that they are equally spaced from one another regardless of whether they are centered. In some implementations, the client device 504 may optimize the positions of the thumbnails so that the thumbnails are equally spaced and are centered.

In some implementations, the detection of alert events/cuepoints includes generating a confidence level that expresses a measure of confidence that the detected event, motion, person, object, etc. is a true positive (e.g., for person detection, the confidence level expresses a measure of how confident the video processing system 1512 is that the detected person is detected correctly). The confidence level may be a criterion in the score for determining cuepoint importance.

In some implementations, a notification of an alert event includes an indication of the confidence level of detection of the alert event. For example, if the event is that a person is in the room, and the confidence level is very high (e.g., 99-100%), the notification may say "person in room," and if the confidence is lower (e.g., 80%), the notification may say "person may be in room."

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both types of user interfaces, but they are not the same user interface.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method comprising:
   detecting one or more alert events associated with a video feed;
   assigning one or more alert event indicators to at least portions of the video feed for each of the detected one or more alert events;
   displaying, via a display of an electronic device, a user interface having a first region and a second region, the first region of the user interface comprising the video feed, the second region of the user interface comprising:
   a timeline having time increment markers and at least one alert event indicator of the one or more alert event indicators, a size of a respective alert event indicator of the one or more alert event indicators based on a temporal length of a respective portion of the video feed to which the respective alert event indicator is assigned; and
   a time position marker that marks a time in the timeline to which the video feed corresponds;
   transitioning (i) the timeline with respect to the time position marker or (ii) the time position marker with respect to the timeline; and
   displaying, in response to the transitioning, one or more portions of the video feed in the second region of the user interface corresponding to the time in the timeline indicated by time position marker.

2. The method of claim 1, wherein:
   the timeline comprises a first time increment marker, a second time increment marker, and a third time increment marker; and
   the timeline comprises a first alert event indicator of the one or more alert event indicators assigned to a first portion of the video feed.

3. The method of claim 2, wherein:
   the first alert event indicator is positioned between the first time increment marker and the second time increment marker; and
   a spacing between the first time increment marker and the second time increment marker is greater than a spacing between the second time increment marker and the third time increment marker.

4. The method of claim 2, wherein:
   the first alert event indicator overlaps the second time increment marker such that the first alert event indicator is positioned between the first time increment marker and the third time increment marker; and
   a spacing between the first time increment marker and the second time increment marker is equal to a spacing between the second time increment marker and the third time increment marker.

5. The method of claim 2, wherein:
   the timeline comprises a second alert event indicator of the one or more alert event indicators assigned to a second portion of the video feed, the second portion of the video feed being longer than the first portion of the video feed and the second alert event indicator being greater in size than the first alert event indicator;

the first alert event indicator is positioned between the first time increment marker and the second time increment marker;

the second alert event indicator is positioned between the second time increment marker and the third time increment marker; and a spacing between the first time increment marker and the second time increment marker is less than a spacing between the second time increment marker and the third time increment marker.

6. The method of claim 5, wherein:

the timelines comprises a fourth time increment marker;

a spacing between the third time increment marker and the fourth time increment marker is less than a spacing between the first time increment marker and the second time increment marker.

7. The method of claim 1, wherein:

the transitioning is based on user input, the user input comprising a touch input sliding gesture or scrolling gesture; and a spacing between the time increment markers is based on a presence and the size of one or more alert event indicators.

8. The method of claim 1, wherein:

wherein the alert events include alert events of one or more alert event types, the types including one or more of the group consisting of: motion events in a defined zone, motion events not in a defined zone, hazard events, sound events, thermostat events, and door events; and the size of the respective alert event indicator of the one or more alert event indicators is further based on a type of alert event.

9. The method of claim 8, wherein an alert event indicator for an alert event of a first type of the alert event types differs from an alert event indicator for an alert event of a second type of the alert event types in at least one visual characteristic.

10. The method of claim 8, wherein:

alert event indicators for alert events of a first type of the alert event types are arranged along a first linear path, parallel to the timeline, in the second region;

alert event indicators for alert events of a second type of the alert event types are arranged along a second linear path, parallel to the first linear path and to the timeline, in the second region; and the first linear path and the second linear path are parallel to each other and to the timeline.

11. An electronic device comprising:

a display;

one or more processors; and memory storing one or more programs to be executed by the one or more processors, the one or more programs comprising instructions for:

detecting one or more alert events associated with a video feed;

assigning one or more alert event indicators to at least portions of the video feed for each of the detected one or more alert events;

displaying, via the display, a user interface having a first region and a second region, the first region of the user interface comprising the video feed, the second region of the user interface comprising:

a timeline having time increment markers and at least one alert event indicator of the one or more alert event indicators, a size of a respective alert event indicator of the one or more alert event indicators based on a temporal length of a respective portion of the video feed to which the respective alert event indicator is assigned; and a time position marker that marks a time in the timeline to which the video feed corresponds;

transitioning (i) the timeline with respect to the time position marker or (ii) the time position marker with respect to the timeline; and displaying, in response to the transitioning, one or more portions of the video feed in the second region of the user interface corresponding to the time in the timeline indicated by time position marker.

12. The electronic device of claim 11, wherein:

the timeline comprises a first time increment marker, a second time increment marker, and a third time increment marker; and the timeline comprises a first alert event indicator of the one or more alert event indicators assigned to a first portion of the video feed.

13. The electronic device of claim 12, wherein:

the first alert event indicator is positioned between the first time increment marker and the second time increment marker; and a spacing between the first time increment marker and the second time increment marker is greater than a spacing between the second time increment marker and the third time increment marker.

14. The electronic device of claim 12, wherein:

the first alert event indicator overlaps the second time increment marker such that the first alert event indicator is positioned between the first time increment marker and the third time increment marker; and a spacing between the first time increment marker and the second time increment marker is equal to a spacing between the second time increment marker and the third time increment marker.

15. The electronic device of claim 12, wherein:

the timelines comprises a second alert event indicator of the one or more alert event indicators assigned to a second portion of the video feed, the second portion of the video feed being longer than the first portion of the video feed and the second alert event indicator being greater in size than the first alert event indicator;

the first alert event indicator is positioned between the first time increment marker and the second time increment marker;

the second alert event indicator is positioned between the second time increment marker and the third time increment marker; and a spacing between the first time increment marker and the second time increment marker is less than a spacing between the second time increment marker and the third time increment marker.

16. The electronic device of claim 15, wherein:

the timelines comprises a fourth time increment marker;

a spacing between the third time increment marker and the fourth time increment marker is less than a spacing between the first time increment marker and the second time increment marker.

17. The electronic device of claim 11, wherein:

the transitioning is based on user input, the user input comprising a touch input sliding gesture or scrolling gesture; and a spacing between the time increment markers is based on a presence and the size of one or more alert event indicators.

18. The electronic device of claim 11, wherein:
wherein the alert events include alert events of one or more alert event types, the types including one or more of the group consisting of: motion events in a defined zone, motion events not in a defined zone, hazard events, sound events, thermostat events, and door events; and
the size of the respective alert event indicator of the one or more alert event indicators is further based on a type of alert event.

19. The electronic device of claim 18, wherein an alert event indicator for an alert event of a first type of the alert event types differs from an alert event indicator for an alert event of a second type of the alert event types in at least one visual characteristic.

20. The electronic device of claim 18, wherein:
alert event indicators for alert events of a first type of the alert event types are arranged along a first linear path, parallel to the timeline, in the second region;
alert event indicators for alert events of a second type of the alert event types are arranged along a second linear path, parallel to the first linear path and to the timeline, in the second region; and
the first linear path and the second linear path are parallel to each other and to the timeline.

* * * * *